(12) United States Patent
Kawata et al.

(10) Patent No.: US 9,708,679 B2
(45) Date of Patent: *Jul. 18, 2017

(54) HIGH-STRENGTH HOT-DIP GALVANIZED STEEL SHEET AND HIGH-STRENGTH ALLOYED HOT-DIP GALVANIZED STEEL SHEET EXCELLENT IN MECHANICAL CUTTING PROPERTY, AND MANUFACTURING METHOD THEREOF

(71) Applicant: NIPPON STEEL & SUMITOMO METAL CORPORATION, Tokyo (JP)

(72) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP); Takuya Kuwayama, Tokyo (JP); Hiroyuki Ban, Tokyo (JP); Kaoru Hiramatsu, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 471 days.

This patent is subject to a terminal disclaimer.

(21) Appl. No.: 14/348,502

(22) PCT Filed: Sep. 28, 2012

(86) PCT No.: PCT/JP2012/075061
§ 371 (c)(1),
(2) Date: Mar. 28, 2014

(87) PCT Pub. No.: WO2013/047739
PCT Pub. Date: Apr. 4, 2013

(65) Prior Publication Data
US 2014/0287263 A1 Sep. 25, 2014

(30) Foreign Application Priority Data
Sep. 30, 2011 (JP) .................. 2011-218773

(51) Int. Cl.
| | |
|---|---|
| *C23C 2/02* | (2006.01) |
| *C21D 8/02* | (2006.01) |
| *C23C 2/06* | (2006.01) |
| *C23C 2/28* | (2006.01) |
| *C21D 9/46* | (2006.01) |

(Continued)

(52) U.S. Cl.
CPC .......... *C21D 8/0263* (2013.01); *B32B 15/013* (2013.01); *C21D 8/0278* (2013.01); *C21D 9/46* (2013.01); *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/58* (2013.01); *C23C 2/02* (2013.01); *C23C 2/06* (2013.01); *C23C 2/28* (2013.01); *C21D 8/0226* (2013.01); *C21D 8/0236* (2013.01); *C21D 2211/001* (2013.01); *C21D 2211/005* (2013.01); *Y10T 428/12799* (2015.01)

(58) Field of Classification Search
CPC ............................... C23C 2/02; C21D 8/0263
See application file for complete search history.

(56) References Cited

U.S. PATENT DOCUMENTS

| | | |
|---|---|---|
| 4,719,079 A | 1/1988 | Katayama et al. |
| 4,806,304 A | 2/1989 | Kimura et al. |

(Continued)

FOREIGN PATENT DOCUMENTS

| | | |
|---|---|---|
| CA | 2 762 935 A1 | 12/2010 |
| CN | 101821419 A | 9/2010 |

(Continued)

OTHER PUBLICATIONS

International Preliminary Report on Patentability dated Apr. 10, 2014, issued in PCT/JP2012/075061 (Forms PCT/IB/338, PCT/IB/373 and PCT/ISA/237).
Tawainese Office Action and Search Report dated Feb. 4, 2015, for Tawainese Application No. 101135878 with summary translation of cited references.
Extended European Search Report dated Oct. 29, 2015, issued in European Patent Application No. 12835930.4.

(Continued)

*Primary Examiner* — Jessee Roe
*Assistant Examiner* — Christopher Kessler
(74) *Attorney, Agent, or Firm* — Birch, Stewart, Kolasch & Birch, LLP

(57) ABSTRACT

There is provided a high-strength hot-dip galvanized steel sheet and the like excellent in mechanical cutting property, which are capable of obtaining high ductility while ensuring high strength with maximum tensile strength of 900 MPa or more. The high-strength hot-dip galvanized steel sheet has a sheet thickness of 0.6 to 5.0 mm and has a plating layer on a surface of a steel sheet with component compositions being set in appropriate ranges, in which the steel sheet structure contains a 40 to 90% ferrite phase and a 3% or more retained austenite phase by volume fraction. In the retained austenite phase, a solid solution carbon amount is 0.70 to 1.00%, an average grain diameter is 2.0 µm or less, an average distance between grains is 0.1 to 5.0 µm, a thickness of a decarburized layer in a steel sheet surface layer portion is 0.01 to 10.0 µm, an average grain diameter of oxides contained in the steel, sheet surface layer portion is 30 to 120 nm and an average density thereof is $1.0 \times 10^{12}$ oxides/m² or more, and moreover, a work hardening coefficient (n value) during a 3 to 7% plastic deformation is 0.080 or more on average.

7 Claims, No Drawings

(51) Int. Cl.
*C22C 18/04* (2006.01)
*C22C 38/00* (2006.01)
*C22C 38/06* (2006.01)
*C22C 38/58* (2006.01)
*B32B 15/01* (2006.01)
*C22C 38/02* (2006.01)
*C22C 38/04* (2006.01)

(56) References Cited

U.S. PATENT DOCUMENTS

| | | |
|---|---|---|
| 8,430,975 B2 | 4/2013 | Nakagaito et al. |
| 8,592,049 B2 | 11/2013 | Honda et al. |
| 8,993,120 B2 * | 3/2015 | Kawata .................. B21B 1/26 148/504 |
| 2004/0202889 A1 | 10/2004 | Fujita et al. |
| 2010/0218857 A1 | 9/2010 | Nakagaito et al. |
| 2010/0304183 A1 | 12/2010 | Honda et al. |
| 2011/0139315 A1 | 6/2011 | Nakagaito et al. |
| 2012/0279617 A1 | 11/2012 | Kawasaki et al. |
| 2014/0182748 A1 | 7/2014 | Nakagaito et al. |
| 2014/0335374 A1 | 11/2014 | Nakagaito et al. |

FOREIGN PATENT DOCUMENTS

| | | |
|---|---|---|
| EP | 2 224 033 A1 | 9/2010 |
| JP | 57-143435 A | 9/1982 |
| JP | 59-205453 A | 11/1984 |
| JP | 62-23970 A | 1/1987 |
| JP | 1-230715 A | 9/1989 |
| JP | 2005-256020 A | 9/2005 |
| JP | 2006-233333 A | 9/2006 |
| JP | 3870891 B2 | 1/2007 |
| JP | 2007-211279 A | 8/2007 |
| JP | 2010-43323 A | 2/2010 |
| JP | 2011-111673 A | 6/2011 |
| JP | 2011-111675 A | 6/2011 |
| JP | 2011-117041 A | 6/2011 |
| JP | 2011-153349 A | 8/2011 |
| JP | 2011-168878 A | 9/2011 |
| TW | 200940722 A1 | 10/2009 |

OTHER PUBLICATIONS

International Search Report, issued in PCT/JP2012/075061, dated Dec. 25, 2012.

Written Opinion of the International Search Authority, issued in PCT/JP2012/075061, dated Dec. 25, 2012.

* cited by examiner

HIGH-STRENGTH HOT-DIP GALVANIZED STEEL SHEET AND HIGH-STRENGTH ALLOYED HOT-DIP GALVANIZED STEEL SHEET EXCELLENT IN MECHANICAL CUTTING PROPERTY, AND MANUFACTURING METHOD THEREOF

TECHNICAL FIELD

The present invention relates to a high-strength hot-dip galvanized steel sheet and a high-strength alloyed hot-dip galvanized steel sheet excellent in mechanical cutting property, and a manufacturing method thereof.

BACKGROUND ART

In recent years, demands for increasing strength of steel sheets used in automobiles or the like have been increasing, and high-strength steel sheets with maximum tensile stress of 900 MPa or more are started to be used in particular for the purpose of improving collision safety and the like.

Generally, since formability of steel sheets deteriorates accompanying increasing strength, development of high-strength steel sheets is in progress whose formability does not deteriorate, that is, has good formability even when its strength is increased. For example, in the steel sheets described in Patent Literature 1, a steel sheet structure is constituted of ferrite and martensite so as to ensure high extension while having high strength. Moreover, a steel sheet constituted of ferrite, retained austenite and bainite structure described in Patent Literature 2 obtains even higher ductility by utilizing transformation-induced plasticity of retained austenite. Further, the steel sheets as described in Patent Literatures 1, 2 excel in collision energy absorptivity, and thus used in many members as automobile structural members.

On the other hand, in a conventional high-strength steel sheet, in addition to the above-described problems in shaping, deterioration of an apparatus processing these steel sheets has become a problem accompanying increasing strength of steel sheets. For example, in shear cutting or punching, as high-strength steel sheets are processed, problems such as abrasion and blade chipping of shear blades and punching tools are arising, and reduction of tool life is becoming a problem. Further, when these works are performed, cutting and punching loads are also high, and hence it is also inevitable to increase capability of machinery.

A cutting process during machine cutting and punching can be divided into three processes: a process of plastic deformation of a steel sheet, a crack forming process at a contact position between a shear or punch and the steel sheet or a contact position between a die and the steel sheet, and moreover a process of propagation and connection of these cracks. The processes of plastic deformation and crack propagation processes as described above fall under a ductile fracture at room temperature and at normal processing (strain) rate, and thus energy needed for crack propagation increases as the steel strength increases. As a result, increase in cutting load accompanying high strength has become inevitable.

As steel sheets with improved cutting property and machinability during machining as described above, for example, steel sheets described in Patent Literatures 3, 4 are known. In the steel sheets described in Patent Literatures 3, 4, the machinability during machining is improved by adding predetermined amounts of Pb, S, Al and dispersing MnS-based sulfide and/or $Al_2O_2$ in the steel. According to Patent Literatures 3, 4, the machinability is improved by dispersing inclusions with poor ductility such as MnS and/or $Al_2O_3$ in the steel, and allowing these inclusions to break during a cutting work. However, since the steel sheets of Patent Literatures 3, 4 include a large amount of inclusions (MnS-based sulfides, $Al_2O_3$) across the entire steel, they are inferior in formability which is essential for automobile steel sheets represented by press forming and hole expansion, and there has been a problem that they are difficult to be applied to members to be press formed. In addition, there is another problem that adding Pb is undesirable also in view of environmental problem.

Meanwhile, Patent Literature 5 discloses a steel sheet in which oxides are dispersed only in a surface layer of the steel sheet. The technology described in Patent Literature 5 is such that, by adding Si or Al in the steel and performing high-temperature rolling during hot rolling or performing an additional treatment on a hot rolled steel sheet, oxides of Si and/or Mn are formed in the steel sheet surface layer, thereby improving workability for machine cutting, punching, and the like.

However, in the series of reaction as described in Patent Literature 5, the oxides that facilitate crack formation are dispersed by performing an additional heat treatment in a hot rolling stage, and thus crack formation is also facilitated in the process of performing large plastic deformation such as cold rolling, where there is a possibility of inducing a sheet fracture. In addition, when the large amount of oxides which enable improvement of machine workability is formed, there is a problem such that a crack beginning at an oxide is formed during cold rolling accompanying a harder work, or an oxide peels off and gets stuck between the steel sheet and a roll during rolling, thereby causing a defect on a surface of the steel sheet. Further, in Patent Literature 5, it is not a structure intended to improve mechanical cutting property during cutting.

Further, Patent Literature 6 proposes a high-strength cold rolled steel sheet which contains oxides containing Si by a distribution of $2 \times 10^6$ (oxides/mm²) or more in either one or both of a crystal grain boundary of 4 µm or less of a surface layer of a steel sheet or insides of crystal grains on a surface layer of a steel sheet having steel components containing, by mass %, C, 0.07 to 0.25%, Si: 0.3 to 2.50%, Mn: 1.5 to 3.0%, Ti: 0.005 to 0.07%, B: 0.0001 to 0.01%, P: 0.001 to 0.03%, S: 0.0001 to 0.01%, Al: 0.60% or less, N, 0.0005 to 0.0100%, O: 0.0005 to 0.007%, and having a steel sheet structure mainly constituted of ferrite and martensite. In the high-strength cold rolled steel sheet described in Patent Literature 6, maximum tensile strength of 900 MPa or more is ensured, and it is assumed to have an excellent mechanical cutting property. However, the high-strength cold rolled steel sheet described in Patent Literature 6 has insufficient ductility, and there is a problem that forming a member with a complicated shape is difficult.

CITATION LIST

Patent Literature

Patent Literature 1: Japanese Laid-open Patent Publication No. 57-143435
Patent Literature 2: Japanese Laid-open Patent Publication No. 01-230715
Patent Literature 3: Japanese Laid-open Patent Publication No. 59-205453
Patent Literature 4: Japanese Laid-open Patent Publication No. 62-23970

Patent Literature 5: Japanese Patent No. 3870891
Patent Literature 6: Japanese Laid-open Patent Publication No. 2011-111673

SUMMARY OF INVENTION

Technical Problem

The present invention is made in view of the above problems, and an object thereof is to provide a high-strength hot-dip galvanized steel sheet and a high-strength alloyed hot-dip galvanized steel sheet excellent in mechanical cutting property, which are capable of obtaining high ductility while ensuring high strength with maximum tensile strength of 900 MPa or more, and a manufacturing method thereof.

Solution to Problem

The present inventors have conducted intensive studies in order to solve the above problems. As a result, the inventors found that by appropriately setting steel components, rolling conditions and annealing conditions after rolling, and the like, while controlling the ratio of a retained austenite phase in a steel sheet structure to a predetermined ratio or more, a solid solution carbon amount contained in the retained austenite phase, an average grain diameter, and an average intergrain distance can be limited to a predetermined range, and moreover, a thickness of a decarburized layer in a steel sheet surface layer portion, an average grain diameter and an average density of oxides can be limited to a predetermined range. Thus, the inventors found that in a high-strength hot-dip galvanized steel sheet, by appropriately setting a retained austenite phase in the steel sheet structure, excellent ductility and mechanical cutting property can be obtained while ensuring maximum tensile strength of 900 MPa or more, and moreover that, by appropriately setting the thickness of the decarburized layer in the steel sheet surface layer portion and sizes and the like of oxides, adhesiveness of a plating layer increases, thereby completing the present invention.

Specifically, the gist of the present invention is as follows.

[1] A high-strength hot-dip galvanized steel sheet excellent in mechanical cutting property, having a sheet thickness of 0.6 to 5.0 mm and having a plating layer on a surface of a steel sheet containing, by mass %, C, 0.075 to 0.400%, Si: 0.01 to 2.00%, Mn: 0.80 to 3.50%, P: 0.0001 to 0.100%, S: 0.0001 to 0.0100%, Al: 0.001 to 2.00%, N: 0.0001 to 0.0100%, and O: 0.0001 to 0.0100% with a balance being constituted of iron and inevitable impurities, wherein: in a range of 1/8 thickness to 3/8 thickness with 1/4 of the sheet thickness being a center from the surface of the steel sheet, the steel sheet structure contains at least a 40 to 90% ferrite phase and a 3% or more retained austenite phase by volume fraction; in the retained austenite phase, a solid solution carbon amount in the phase is 0.70 to 1.00%, an average grain diameter is 2.0 μm or less, and an average distance between grains is 0.1 to 5.0 μm; a thickness of a decarburized layer in a steel sheet surface layer portion is 0.01 to 10.0 μm, an average grain diameter of oxides contained in the steel sheet surface layer portion is 30 to 120 nm and an average density thereof is $1.0 \times 10^{12}$ oxides/m$^2$ or more; and moreover, a work hardening coefficient (n value) during a 3 to 7% plastic deformation is 0.080 or more on average.

[2] The high-strength hot-dip galvanized steel sheet excellent in mechanical cutting property according to above [1], further containing, by mass %, one or more of Ti: 0.001 to 0.150%, Nb: 0.001 to 0.100%, and V: 0.001 to 0.300%.

[3] The high-strength hot-dip galvanized steel sheet excellent in mechanical cutting property according to above [1] or [2] further containing, by mass %, one or more of Cr: 0.01 to 2.00%, Ni: 0.01 to 2.00%, Cu: 0.01 to 2.00%, Mo: 0.01 to 2.00%, B: 0.0001 to 0.0100%, and W: 0.01 to 2.00%.

[4] The high-strength hot-dip galvanized steel sheet excellent in mechanical cutting property according to any one of above [1] to [3] further containing, by mass %, 0.0001 to 0.0100% in total of one or more of Ca, Ce, Mg, Zr, La, and REM.

[5] A high-strength alloyed hot-dip galvanized steel sheet excellent in mechanical cutting property, formed by alloying the plating layer of the high-strength hot-dip galvanized steel sheet according to any one of above [1] to [4].

[6] A manufacturing method of a high-strength hot-dip galvanized steel sheet excellent in mechanical cutting property, the method including: a hot rolling step of heating to 1180° C. or more a slab having chemical components containing, by mass %, C, 0.075 to 0.400%, Si: 0.01 to 2.00%, Mn: 0.80 to 3.50%, P: 0.0001 to 0.100%, S: 0.0001 to 0.0100%, Al: 0.001 to 2.00%, N: 0.0001 to 0.0100%, and O: 0.0001 to 0.0100% with a balance being iron and inevitable impurities, directly or after cooled once and performing hot rolling in which rolling completion temperature is 850 to 950° C., thereafter rapidly cooling to 500 to 650° C. at an average cooling rate of 10° C./s or more, and thereafter coiling on a coil and slowly cooling to 400° C. by taking 1.0 hour or more; a cold rolling step of performing cold rolling so that a total reduction ratio is 30 to 75% after pickling subsequently to the hot rolling step; an annealing step of heating the steel sheet after the cold rolling step to 750° C. or more with an average heating rate between 600 and 750° C. being 20° C./s or less, then cooling with an average cooling rate between 750 and 650° C. being 1.0 to 15.0° C./s and cooling with an average cooling rate from 650° C. being 3.0° C./s or more, and performing, while retaining for 20 to 1000 seconds in the temperature range of 300 to 470° C. and while applying a tension of 5 to 100 MPa in this temperature range, one or more times of bending with a bending radius of 800 mm or less; a plating step of performing hot-dip galvanizing on surfaces of the steel sheet to form a plating layer by immersing after the annealing step the steel sheet in a galvanizing bath under the conditions of plating bath temperature: 450 to 470° C., steel sheet temperature at a time of entering the plating bath: 430 to 490° C., and effective Al amount in the plating bath: 0.01 to 0.18 mass %; and a cooling step of cooling at an average cooling rate of 0.5° C./s or more to 150° C. or less after the plating step, wherein the annealing step is such that in a preheating zone under the condition of an air ratio: 0.7 to 1.2 in a mixed gas of air and fuel gas used in a preheating burner, the air ratio being a ratio of a volume of air contained in the mixed gas in a unit volume and a volume of air logically needed for complete combustion of fuel gas contained in the mixed gas in the unit volume, oxides are generated in a steel sheet surface layer portion by passing through while heating to a steel sheet temperature of 400 to 800° C., then the oxides generated in the preheating zone are reduced by heating to 750° C. or more in a reduction zone with a partial pressure ratio $P(H_2O)/P(H_2)$ between water vapor ($H_2O$) and hydrogen ($H_2$): 0.0001 to 2.0, and thereafter cooling is performed.

[7] A manufacturing method of a high-strength alloyed hot-dip galvanized steel sheet excellent in mechanical cutting property, the method including, after the hot rolling step, the cold rolling step, the annealing step, and the plating step are performed by the method according to above [6], performing an alloying treatment on a plating layer formed in the plating step at temperatures of 470 to 620° C.

Note that the work hardening coefficient (n value) defined in the present invention is a characteristic value to be a reference of drawing property (ductility), and refers to an index n when an approximation is made of the relation between a stress σ and a strain ε in a plastic region equal to or more than a yield point. An approximate expression at this time is, although depending on the material, for example, a simplest n-th power hardening law, $\sigma = C\epsilon^n$, or besides this, a Swift expression or the like optimum for iron material can be used. The larger the n value, the larger the extension until a local contraction occurs, thereby improving ductility. On the other hand, there is a characteristic that the smaller the n value, the more the mechanical cutting property improves.

Advantageous Effects of Invention

The high-strength hot-dip galvanized steel sheet and the high-strength alloyed hot-dip galvanized steel sheet excellent in mechanical cutting property of the present invention employ a structure in which the steel components, the steel sheet structure, the thickness of the decarburized layer and the size and so on of oxides in the steel sheet surface layer portion, and so on are defined to appropriate ranges as described above. That is, by containing a predetermined amount or more of retained austenite phase in the steel sheet structure, work hardening ability is increased, and thereby strength and ductility of the steel sheet can be improved, and meanwhile by increasing density by limiting the solid solution carbon amount in the retained austenite phase and suppressing the average grain diameter, the mechanical cutting property when processing the steel sheet (punching workability) improves. Moreover, by limiting the thickness of the decarburized layer and the average grain diameter and the average density of oxides in the steel sheet surface layer portion, adhesiveness of the plating layer improves. Therefore, while ensuring the maximum tensile strength of 900 MPa or more, the high-strength hot-dip galvanized steel sheet and the high-strength alloyed hot-dip galvanized steel sheet capable of obtaining excellent ductility and mechanical cutting property can be realized.

Further, the manufacturing method of the high-strength hot-dip galvanized steel sheet and the high-strength alloyed hot-dip galvanized steel sheet of the present invention employs a method which sets steel components to an appropriate range, and limits hot rolling and cold rolling and annealing conditions after rolling to predetermined ranges. Thus, the ratio of the retained austenite phase in the steel sheet structure can be controlled to a predetermined ratio or more, and an average grain diameter and an average intergrain distance can be limited to a predetermined range while limiting the solid solution carbon amount contained in the retained austenite phase, and thus it is possible to improve strength and ductility as well as mechanical cutting property of the steel sheet. Moreover, since the thickness of the decarburized layer, and the average grain diameter and average density of oxides in the steel sheet surface layer portion can be limited to a predetermined range, it is possible to improve adhesiveness of the plating layer. Therefore, while ensuring the maximum tensile strength of 900 MPa or more as described above, it is possible to manufacture the high-strength hot-dip galvanized steel sheet and the high-strength alloyed hot-dip galvanized steel sheet capable of obtaining excellent ductility and mechanical cutting property.

Therefore, by applying the high-strength hot-dip galvanized steel sheet and the high-strength alloyed hot-dip galvanized steel sheet excellent in mechanical cutting property, and the manufacturing method thereof of the present invention to the automotive field in particular, merits such as improvement in safety accompanying increase in strength of vehicle body, improvement in workability for processing a member, and the like can be enjoyed sufficiently, and their social contributions are immeasurable.

DESCRIPTION OF EMBODIMENTS

Hereinafter, a high-strength hot-dip galvanized steel sheet and high-strength alloyed hot-dip galvanized steel sheet excellent in mechanical cutting property, and a manufacturing method thereof which are an embodiment of the present invention will be described. Note that this embodiment is for detailed explanations to allow better understanding concepts of the high-strength hot-dip galvanized steel sheet and the high-strength alloyed hot-dip galvanized steel sheet excellent in mechanical cutting property, and the manufacturing method thereof of the present invention, and thus do not limit the invention unless specified particularly. Note that in the following description, "%" denotes "mass %" unless specified particularly.

[High-strength Hot-dip Galvanized Steel Sheet]

The high-strength hot-dip galvanized steel sheet excellent in mechanical cutting property of this embodiment (which hereinafter may be abbreviated simply to high-strength hot-dip galvanized steel sheet) is constituted to have a plating layer on a surface of a steel sheet containing, by mass %, C, 0.075 to 0.400%, Si: 0.01 to 2.00%, Mn: 0.80 to 3.50%, P: 0.0001 to 0.100%, S: 0.0001 to 0.0100%, Al: 0.001 to 2.00%, N: 0.0001 to 0.0100%, and O: 0.0001 to 0.0100% with a balance being constituted of iron and inevitable impurities. Further, the high-strength hot-dip galvanized steel sheet of this embodiment has a sheet thickness of 0.6 to 5.0 mm. Further, in the high-strength hot-dip galvanized steel sheet of this embodiment, in a range of ⅛ thickness to ⅜ thickness with ¼ of the sheet thickness being a center from the surface of the steel sheet, the steel sheet structure contains at least a 40 to 90% ferrite phase and a 3% or more retained austenite phase by volume fraction, and in this retained austenite phase, a solid solution carbon amount in the phase is 0.70 to 1.00%, an average grain diameter is 2.0 μm or less, and an average distance between grains is 0.1 to 5.0 μm. Moreover, in the high-strength hot-dip galvanized steel sheet of this embodiment, a thickness of a decarburized layer in a steel sheet surface layer portion is 0.01 to 10.0 μm, an average grain diameter of oxides contained in the steel sheet surface layer portion is 30 to 120 nm, and an average density thereof is $1.0 \times 10^{12}$ oxides/m² or more. Then, in the high-strength hot-dip galvanized steel sheet of this embodiment, a work hardening coefficient (n value) during a 3 to 7% plastic deformation is 0.080 or more on average.

Here, the range of ⅛ thickness to ⅜ thickness with ¼ of the sheet thickness from the surface of the steel sheet being a center means the range of ⅛ thickness with ¼ of the sheet thickness from the surface of the steel sheet being a center to ⅜ thickness with ¼ of the sheet thickness from the surface of the steel sheet being a center. Further, focusing on the structure of this range is because the structure of this range may be considered as representing the structure of the entire steel sheet excluding the decarburized layer of the steel sheet surface layer portion. That is, when it is a steel sheet structure as described above in the range of ⅛ thickness to ⅜ thickness, it can be judged that the entire steel sheet excluding the decarburized layer of the steel sheet surface layer portion is the structure as described above.

The present inventors and others have conducted intensive studies in order to realize high mechanical cutting property while ensuring excellent ductility in a high-strength hot-dip galvanized steel sheet with maximum tensile strength of 900 MPa or more. As a result, the inventors found that, by first limiting steel components to an appropriate range and making rolling conditions and annealing conditions after rolling be in appropriate ranges which will be described later, the ratio of a retained austenite phase in the steel sheet structure can be controlled to a predetermined ratio or more, and an average grain diameter and an average intergrain distance can be limited to a predetermined range while limiting the solid solution carbon amount contained in the retained austenite phase. It was found that both the ductility and mechanical cutting property of the high-strength hot-dip galvanized steel sheet can be improved thereby.

"Steel Sheet Thickness"

The sheet thickness of the high-strength hot-dip galvanized steel sheet of the present invention is 0.6 to 5.0 mm. When the sheet thickness is less than 0.6 mm, it is difficult to keep the shape of the steel sheet flat, which is not appropriate. Therefore, the sheet thickness is preferably 0.6 mm or more. Further, when it is more than 5.0 mm, a strain accompanying bending does not occur and fine dispersion of bainite is difficult, making it difficult to generate a predetermined steel sheet structure. Therefore, the sheet thickness is preferably 5.00 mm or less.

"Steel Sheet Structure"

In the steel sheet structure of the high-strength hot-dip galvanized steel sheet of the present invention, in a range of ⅛ thickness to ⅜ thickness with ¼ of the sheet thickness being a center from the surface of the steel sheet, the steel sheet structure contains at least a 40 to 90% ferrite phase and a 3% or more retained austenite phase by volume fraction. Further, in the retained austenite phase, a solid solution carbon amount in the phase is 0.70 to 1.00%, the average grain diameter is 2.0 μm or less, and the average distance between grains is 0.1 to 5.0 μm.

"Retained Austenite Phase"

The retained austenite phase is a structure which increases a work hardening ability and improves strength and ductility, and in the present invention, the volume fraction of the retained austenite phase is 3% or more. Further, in order to further increase the ductility, the volume fraction of the retained austenite phase is preferably 5% or more, more preferably 7% or more. On the other hand, to obtain the retained austenite phase exceeding 30%, it is necessary to add a large amount of austenite stabilizing elements such as C and Mn, which considerably deteriorates weldability. Therefore, in the present invention, the volume fraction of the retained austenite phase is preferably 30% or less. Further, in view of weldability, the volume fraction of the retained austenite phase is preferably 25% or less, more preferably 20% or less.

Note that regarding the volume fraction of retained austenite, an X-ray analysis is performed on an observation surface which is a surface in parallel to a sheet surface of the steel sheet and at ¼ of the sheet thickness from the surface of the steel sheet, and an area fraction is calculated, which can then be assumed as the volume fraction of the retained austenite in the ⅛ thickness to ⅜ thickness range. Note that as long as in parallel with the sheet surface of the steel sheet, the observation surface can be set to any position in the range of ⅛ thickness to ⅜ thickness with ¼ of the sheet thickness being a center from the surface of the sheet thickness.

In order to suppress deterioration of the mechanical cutting property by the retained austenite phase, a steel sheet which is easily cut by mechanical cutting can be made by suppressing strength of martensite after transformed by processing, limiting the solid solution carbon amount of the retained austenite phase to make it easily transformable by light processing, and by suppressing the average grain diameter of the retained austenite phase to increase density.

Moreover, the amount of elements to be solid solved in the retained austenite phase determines stability of the retained austenite phase, and changes a strain amount necessary for the retained austenite phase to transform into hard martensite. Thus, it is possible to control work hardening behavior by controlling the solid solution element amount of the retained austenite phase, thereby largely improving shape fixability, ductility and tensile strength.

The solid solution carbon amount in the retained austenite phase is 1.00% or less. When the solid solution carbon amount in the retained austenite phase exceeds 1.00%, the retained austenite phase becomes excessively stable. When such a steel sheet is cut, ductility of the surrounding ferrite structure deteriorates considerably and then transforms into martensite, and an interface between ferrite and martensite separate easily, which is hence not preferable. Further, when the retained austenite phase is transformed efficiently into martensite, the solid solution carbon amount in the retained austenite phase is preferably 0.96% or less. On the other hand, when the solid solution carbon amount in the retained austenite phase is lower than 0.70%, martensite transformation begins in the process of cooling to room temperature after an annealing step and the volume fraction of the retained austenite phase cannot be ensured, and hence the solid solution carbon amount is 0.70% or more. Further, in order to obtain a sufficient amount of retained austenite phase, the solid solution carbon amount is preferably 0.75% or more, more preferably 0.80% or more.

Note that the solid solution carbon amount (Cγ) in the retained austenite phase can be obtained by performing an X-ray diffraction test under the same conditions as the measurement of the area fraction of the retained austenite phase so as to obtain a lattice constant a of the retained austenite phase, and using the following equation (1). The equation (1) is disclosed in the document "Scripta Metallurgica et Materialia, vol. 24, 1990, p509-514".

[Equation 1]

$$C_\gamma = \frac{(a - 0.3556)}{0.00095} \times \frac{12.01}{55.84} \qquad (1)$$

Further, the method for measuring the solid solution carbon amount is not limited to the above method. For example, a direct observation using an EMA method, a three-dimensional atom probe (3D-AP), or the like may be performed so as to measure concentration of respective types of elements.

In the retained austenite phase contained in the steel sheet structure of the high-strength hot-dip galvanized steel sheet of the present invention, the solid solution carbon amount in the phase is 0.70 to 1.00%, the average grain diameter is 2.0 μm or less, and the average distance between grains is 0.1 to 5.0 μm.

When the crystal grain diameter of the retained austenite phase is coarse, a crack beginning at austenite occurs. Thus, in the present invention, the average grain diameter of the retained austenite phase is defined to be 2.0 µm or less. Further, the average grain diameter of the retained austenite phase is preferably 1.5 µm or less, more preferably 1.2 µm or less. Note that although a lower limit of the average grain diameter of the retained austenite phase is not particularly limited, special equipment such as a rolling machine or a rapid heating apparatus for applying a large strain becomes necessary and costs increase largely, and thus it is preferably 0.1 µm or more.

Further, when the distance between crystal grains of the retained austenite phase is excessively separate, a coarse crack occurs between austenite grains and the cutting property deteriorates, and thus it is necessary to make the austenite intergrain distance small to induce numerous micro cracks in order to improve the cutting property. Thus, according to the present invention, the average distance between grains of the retained austenite phase is defined to be 5.0 µm or less. Further, the average distance between grains of the retained austenite phase is more preferably 3.5 µm or less, furthermore preferably 2.5 µm or less. On the other hand, when the distance between crystal grains of the retained austenite phase is too narrow, a crack occurred by one austenite grain or martensite generated by transformation of austenite grain easily propagates to an adjacent austenite grain or martensite generated by transformation of austenite grain, and thus plural austenite grains gather and effectively work as one austenite grain. In order for separate austenite to act separately, it is necessary to have the average distance between grains of the retained austenite phase to be 0.1 µm or more. Further, the average distance between grains of the retained austenite phase is more preferably 0.3 µm or more, furthermore preferably 0.5 µm or more.

Note that the crystal grains of the retained austenite phase can be evaluated by performing, on a cross section in parallel with a rolling direction and perpendicular to a sheet surface, in the range of 1/8 thickness to 3/8 thickness with 1/4 of the sheet thickness being a center from the surface of the steel sheet, a high-resolution crystal orientation analysis by an EBSD (electron Back-Scattering Diffraction) method by using a field emission scanning electron microscope (FE-SEM). For example, with a measuring step being set to 0.1 µm, an area where ten or more points indicating a diffraction pattern of iron FCC gather and a crystal misorientation from each other is less than 10° is assumed as a crystal grain of retained austenite. Then, the average distance between grains can be measured in the range of 10000 µm$^2$ or more by setting {average distance L between grains=([observation area]/[number of crystal grains])$^{1/2}$} or measured in a range containing 150 or more retained austenite crystal grains. Further, the average grain diameter can be measured by obtaining an area of each crystal grain among randomly chosen 30 to 300 retained austenite crystal grains, and obtaining a grain diameter as a circle-equivalent diameter.

"Microstructure"

The steel sheet structure of the high-strength hot-dip galvanized steel sheet of the present invention preferably has, besides the above-described retained austenite phase, by volume fraction, ferrite phase: 40 to 90%, bainitic ferrite phase and/or bainite phase: 50% or less, tempered martensite phase: 50% or less, fresh martensite phase: 15% or less. The high-strength hot-dip galvanized steel sheet of the present invention becomes a steel sheet having more excellent formability by having such a steel sheet structure.

(Ferrite Phase)

The ferrite phase is a structure effective for improving ductility, and is preferably contained by 40 to 90% by volume fraction in the steel sheet structure. When the volume fraction of ferrite phase in the steel sheet structure is less than 40%, it is possible that sufficient ductility is not obtained. Further, regarding the volume fraction of ferrite phase contained in the steel sheet structure, it is contained more preferably by 45% or more, furthermore preferably by 50% or more in view of ductility. On the other hand, since the ferrite phase is a soft structure, when its volume fraction exceeds 90%, it is possible that sufficient strength cannot be obtained. Further, to sufficiently increase tensile strength of the steel sheet, the volume fraction of the ferrite phase contained in the steel sheet structure is more preferably 85% or less, furthermore preferably 75% or less.

(Bainitic Ferrite Phase and/or Bainite Phase)

The bainitic ferrite phase and/or bainite phase are/is a structure excellent in balance between strength and ductility, and are preferably contained by 10 to 50% by volume fraction in the steel sheet structure. Further, the bainitic ferrite phase and/or bainite phase have/has a microstructure having strength which is in the middle between the soft ferrite phase and the hard martensite phase, tempered martensite phase and retained austenite phase, and they are more preferably contained by 15% or more, furthermore preferably 20% or more in view of stretch flange formability. On the other hand, when the volume fraction of the bainitic ferrite phase and/or bainite phase exceeds 50%, yield stress increases excessively and shape fixability deteriorates, which is hence not preferable.

(Tempered Martensite Phase)

Tempered martensite phase is a structure which largely improves tensile strength, and may be contained by 50% or less by volume fraction in the steel sheet structure. In view of tensile strength, the volume fraction of tempered martensite is preferably 10% or more. On the other hand, when the volume fraction of tempered martensite contained in the steel sheet structure exceeds 50%, yield stress increases excessively and there is a concern of deteriorating shape fixability, which is hence not preferable.

(Fresh Martensite Phase)

The fresh martensite phase has an effect to largely improve tensile strength, but on the other hand, it becomes a starting point of destruction and largely deteriorates stretch flangeability. Accordingly, they are preferably limited to 15% or less by volume fraction in the steel sheet structure. In order to increase stretch flangeability, the volume fraction of fresh martensite phase in the steel sheet structure is more preferably 10% or less, furthermore preferably 5% or less.

(Other Micro Structure)

The steel sheet structure of the high-strength hot-dip galvanized steel sheet of the present invention may further contain a structure such as a perlite phase and/or coarse cementite phase other than the above-described structures. However, when there is a large amount of perlite phase and/or coarse cementite phase in the steel sheet structure of the high-strength steel sheet, there arises a problem that ductility deteriorates. Thus, the volume fraction of perlite phase and/or coarse cementite phase contained in the steel sheet structure is preferably 10% or less, more preferably 5% or less in total.

"Measurement Method of Steel Sheet Structure"

The volume fraction of respective structures contained in the steel sheet structure of the high-strength steel sheet of the present invention can be measured by, for example, a method described below.

When measuring the volume fractions of ferrite phase, bainitic ferrite phase, bainite phase, tempered martensite phase, and fresh martensite phase contained in the steel sheet structure of the high-strength hot-dip galvanized steel sheet of the present invention, first, a sample is collected from an observation surface which is a cross section in parallel with the rolling direction and perpendicular to the sheet surface of the steel sheet. Then, this observation surface of the sample is polished and nital etched, and the range of ⅛ thickness to ⅜ thickness with ¼ of the sheet thickness being a center from the surface of the steel sheet is observed with a field emission scanning electron microscope and area fractions are measured, which can be assumed as the volume fractions of respective structures.

"Chemical Component Composition"

Next, chemical components (composition) of the high-strength hot-dip galvanized steel sheet of the present invention will be described. Note that [%] in the following description represents [mass %] unless specified particularly.

"C: 0.075 to 0.400%"

C is contained for increasing strength of the high-strength steel sheet. However, when the content of C exceeds 0.400%, weldability becomes insufficient, and thus it is preferably 0.400% or less. Further, in view of weldability, the content of C is preferably 0.250% or less, more preferably 0.220% or less. On the other hand, when the content of C is less than 0.075%, the strength decreases and it becomes difficult to ensure the maximum tensile strength of 900 MPa or more. From this viewpoint, in order to further increase the strength of the steel sheet, the content of C is more preferably 0.085% or more, furthermore preferably 0.100% or more.

"Si: 0.01 to 2.00%"

Si is an element which suppresses generation of iron-based carbide in the steel sheet, and increases strength and formability. However, when the content of Si exceeds 2.00%, the steel sheet becomes brittle and ductility deteriorates, which makes cold rolling difficult. In view of ductility, the content of Si is preferably 1.80% or less, more preferably 1.50% or less. On the other hand, when the content of Si is less than 0.01%, it becomes difficult to sufficiently disperse oxides in the decarburized layer. In view of this, the lower limit value of Si is more preferably 0.20% or more, furthermore preferably 0.50% or more.

"Mn: 0.80 to 3.50%"

Mn is added for increasing strength of the steel sheet. However, when the content of Mn exceeds 3.50%, a coarse Mn concentrated portion occurs in a sheet thickness center portion of the steel sheet, embrittlement occurs easily, and a trouble such as breaking of a cast slab occurs easily. Further, when the content of Mn exceeds 3.50%, weldability also deteriorates. Therefore, the content of Mn needs to be 3.50% or less. Further, in view of weldability, the content of Mn is more preferably 3.00% or less, furthermore preferably 2.70% or less. On the other hand, when the content of Mn is less than 0.80%, a large amount of soft structures is formed during cooling after annealing, and thus it becomes difficult to ensure the maximum tensile strength of 900 MPa or more. Thus, the content of Mn needs to be 0.80% or more. Also, in order to further increase the strength, the content of Mn is more preferably 1.00% or more, furthermore preferably 1.30% or more.

"P: 0.0001 to 0.100%"

P tends to segregate in the sheet thickness center portion of the steel sheet, and embrittles a weld zone. When the content of P exceeds 0.100%, the weld zone becomes quite brittle, and thus the upper limit of the content of P is 0.100%. In view of avoiding embrittlement of weld zone, the upper limit of the content of P is more preferably 0.030% or less. On the other hand, setting the content of P to less than 0.0001% accompanies large increase in manufacturing costs, and thus 0.0001% is set as the lower limit value. Also, the content of P in view of further reducing manufacturing costs is preferably 0.0010% or more.

"S: 0.0001 to 0.0100%"

S adversely affects weldability and manufacturability during casting and hot rolling, and thus the upper limit value of the content of S is 0.0100% or less. Further, S couples with Mn to form coarse MnS and decreases ductility and stretch flangeability, and thus it is more preferably 0.0050% or less, furthermore preferably 0.0030% or less. On the other hand, setting the content of S to less than 0.0001% accompanies large increase in manufacturing costs, and thus 0.0001% is set as the lower limit value. Further, the content of S in view of reducing manufacturing costs is more preferably 0.0005% or more, furthermore preferably 0.0010% or more.

"Al: 0.001% to 2.00%"

Al suppresses generation of iron-based carbide to increase strength and formability of the steel sheet. However, when the content of Al exceeds 2.00%, weldability worsens, and thus the upper limit of Al content is 2.00%. Further, from this viewpoint, the content of Al is more preferably 1.50% or less, furthermore preferably 1.20% or less. Although effects of the present invention are exhibited without particularly setting the lower limit of the content of Al, Al is inevitable impurity existing in a small amount in a raw material, and setting the content thereof to less than 0.001% accompanies large increase in manufacturing costs. Thus, the content of Al is 0.001%. Al is also an effective element as a deoxidizing material, and the content of Al is more preferably 0.010% or more in order to obtain the effect of deoxidization more sufficiently.

"N: 0.0001 to 0.0100%"

N forms a coarse nitride and deteriorates ductility and stretch flangeability, and thus its added amount should be suppressed. When the content of N exceeds 0.0100%, this tendency becomes significant, and thus the upper limit of N content is 0.0100%. Further, from this viewpoint, the content of N is more preferably 0.0070% or less, furthermore preferably 0.0050% or less. N also causes generation of blow hole during welding, and thus the content thereof is smaller the better. Although effects of the present invention are exhibited without particularly setting the lower limit of the content of N, setting the content of N to less than 0.0001% accompanies large increase in manufacturing costs, and thus it is 0.0001% or more. Further, the content of N in view of reducing manufacturing costs is more preferably 0.0005% or more, furthermore preferably 0.0010% or more.

"O: 0.0001 to 0.0100%"

O forms an oxide and deteriorates ductility and stretch flangeability, and thus its content needs to be suppressed. When the content of O exceeds 0.0100%, deterioration of stretch flangeability becomes significant, and thus the upper limit of O content is 0.0100%. Moreover, the content of O is more preferably 0.0070% or less, furthermore preferably 0.0050% or less. Further, although effects of the present invention are exhibited without particularly setting the lower limit of the content of O, setting the content of O to less than 0.0001% accompanies large increase in manufacturing costs, and thus 0.0001% is set as the lower limit. Also, the content of O in view of further reducing manufacturing costs is more preferably 0.0003% or more, furthermore preferably 0.0005% or more.

The high-strength hot-dip galvanized steel sheet of the present invention may further employ a structure including the following elements as necessary.

"Cr: 0.01 to 2.00%"

Cr is an element which suppresses phase transformation at high temperature and is effective for increasing strength, and may be added in place of part of C and/or Mn. When the content of Cr exceeds 2.00%, workability during hot working is impaired and productivity decreases, and thus the content of Cr is preferably 2.00% or less. Note that although effects of the present invention are exhibited without particularly setting the lower limit of the content of Cr, the content is preferably 0.01% or more in order to sufficiently obtain the effect of strength increase by Cr.

"Ni: 0.01 to 2.00%"

Ni is an element which suppresses phase transformation at high temperature and is effective for increasing strength, and may be added in place of part of C and/or Mn. When the content of Ni exceeds 2.00%, weldability is impaired, and thus the content of Ni is preferably 2.00% or less. Note that although effects of the present invention are exhibited without particularly setting the lower limit of the content of Ni, the content is preferably 0.01% or more in order to sufficiently obtain the effect of strength increase by Ni.

"Cu: 0.01 to 2.00%"

Cu is an element which increases strength by existing as fine grains in steel, and can be added in place of part of C and/or Mn. When the content of Cu exceeds 2.00%, weldability is impaired, and thus the content is preferably 2.00% or less. Note that although effects of the present invention are exhibited without particularly setting the lower limit of the content of Cu, the content is preferably 0.01% or more in order to sufficiently obtain the effect of strength increase by Cu.

"Ti: 0.001 to 0.150%"

Ti is an element which contributes to strength increase of the steel sheet by precipitate strengthening, fine grain strengthening by growth suppression of ferrite crystal grains, and dislocation strengthening through suppression of recrystallization. However, when the content of Ti exceeds 0.150%, precipitation of the carbonitride increases and formability deteriorates, and thus the content of Ti is preferably 0.150% or less. Further, in view of formability, the content of Ti is more preferably 0.100% or less, furthermore preferably 0.070% or less. Note that although effects of the present invention are exhibited without particularly setting the lower limit of the content of Ti, the content of Ti is preferably 0.001% or more, furthermore preferably 0.005% or more in order to sufficiently obtain the strength increasing effect by Ti. Further, in order to increase strength of the steel sheet, the content of Ti is more preferably 0.010% or more, furthermore preferably 0.015% or more.

"Nb: 0.001 to 0.100%" Nb is an element which contributes to strength increase of the steel sheet by precipitate strengthening, fine grain strengthening by growth suppression of ferrite crystal grains, and dislocation strengthening through suppression of recrystallization. However, when the content of Nb exceeds 0.150%, precipitation of the carbonitride increases and formability deteriorates, and thus the content of Nb is preferably 0.150% or less. Further, in view of formability, the content of Nb is more preferably 0.100% or less, furthermore preferably 0.060% or less. Note that although effects of the present invention are exhibited without particularly setting the lower limit of the content of Nb, the content of Nb is preferably 0.001% or more, furthermore preferably 0.005% or more in order to sufficiently obtain the strength increasing effect by Nb. Further, to increase strength of the steel sheet, the content of Nb is more preferably 0.010% or more, furthermore preferably 0.015% or more.

"V: 0.001 to 0.300%"

V is an element which contributes to strength increase of the steel sheet by precipitate strengthening, fine grain strengthening by growth suppression of ferrite crystal grains, and dislocation strengthening through suppression of recrystallization. However, when the content of V exceeds 0.300%, precipitation of the carbonitride increases and formability deteriorates, and thus the content is preferably 0.300% or less. Note that although effects of the present invention are exhibited without particularly setting the lower limit of the content of V, the content is preferably 0.001% or more in order to sufficiently obtain the strength increasing effect by V.

"Mo: 0.01 to 2.00%"

Mo is an element which suppresses phase transformation at high temperature and is effective for increasing strength, and may be added in place of part of C and/or Mn. When the content of Mo exceeds 2.00%, workability during hot working is impaired and productivity decreases, and thus the content of Mo is preferably 2.00% or less, more preferably 1.00% or less. Note that although effects of the present invention are exhibited without particularly setting the lower limit of the content of Mo, the content is preferably 0.01% or more in order to sufficiently obtain the effect of strength increase by Mo.

"W: 0.01 to 2.00%"

W is an element which suppresses phase transformation at high temperature and is effective for increasing strength, and may be added in place of part of C and/or Mn. When the content of W exceeds 2.00%, workability during hot working is impaired and productivity decreases, and thus the content of W is preferably 2.00% or less, furthermore preferably 1.00% or less. Note that although effects of the present invention are exhibited without particularly setting the lower limit of the content of W, the content is preferably 0.01% or more in order to sufficiently obtain the effect of strength increase by W.

"B: 0.0001 to 0.0100%"

B is an element which suppresses phase transformation at high temperature and is effective for increasing strength, and may be added in place of part of C and/or Mn. When the content of B exceeds 0.0100%, workability during hot working is impaired and productivity decreases, and thus the content of B is preferably 0.0100% or less. Further, in view of productivity, the content of B is more preferably 0.0050% or less, furthermore preferably 0.0030% or less. Note that although effects of the present invention are exhibited without particularly setting the lower limit of the content of B, the content of B is preferably 0.0001% or more in order to sufficiently obtain the effect of strength increase by B. Also, in order to further increase strength of the steel sheet, the content of B is more preferably 0.0003% or more, more preferably 0.0005% or more.

"0.0001 to 0.0100% in total of one or more of Ca, Ce, Mg, Zr, La, and REM"

In the high-strength hot-dip galvanized steel sheet of the present invention, as other elements, 0.001 to 0.5000%, more preferably 0.0001 to 0.0100% in total of one or more of Ca, Ce, Mg, Zr, La, and REM may be added. The reasons for adding these elements are as follows.

Ca, Ce, Mg, Zr, La, and REM are elements effective for improving formability, and one or more of them may be added. However, when a total content of one or more of Ca, Ce, Mg, Zr, La, and REM exceeds 0.5000%, it is possible that ductility is impaired on the contrary, and thus the total content of the elements is preferably 0.5000% or less, more preferably 0.0100% or less. Effects of the present invention are exhibited without particularly setting the lower limit of the content of one or more of Ca, Ce, Mg, Zr, La, and REM, the total content of these elements is preferably 0.0001% or more in order to sufficiently obtain the effect of improving formability of the steel sheet. In view of formability, the total content of one or more of Ca, Ce, Mg, Zr, La, and REM is more preferably 0.0005% or more, furthermore preferably 0.0010% or more. Note that REM stands for Rare Earth Metal, and refers to an element belonging to the lanthanoid series. In the present invention, REM or Ce is often added in misch metal, and may contain elements of the lanthanoid series other than La and Ce in a complex form. Effects of the present invention are exhibited even when elements of the lanthanoid series other than La and Ce are contained as inevitable impurities. Further, effects of the present invention are exhibited even when metals La and Ce are added.

A balance of the above elements may be constituted of Fe and inevitable impurities. Note that regarding any one of Cr, Ni, Cu, Ti, Nb, V, Mo, W, B described above, containing a very small amount less than the above lower limit values as impurities is tolerated. Further, regarding Ca, Ce, Mg, Zr, La, and REM, containing an ultramicro amount less than the lower limit values of the total amounts thereof as impurities is tolerated.

"Steel Sheet Surface Layer Portion"

In the high-strength hot-dip galvanized steel sheet of the present invention, the thickness of the decarburized layer in the steel sheet surface layer portion is 0.01 to 10.0 μm, and the average grain diameter of oxides contained in the steel sheet surface layer portion is 30 to 120 nm and the average density thereof is $1.0 \times 10^{12}$ oxides/m$^2$ or more.

"Decarburized Layer"

In the present invention, in order to increase adhesiveness of a plating layer to be provided on the steel sheet surface, the steel sheet surface layer portion is a decarburized layer in which a hard structure is small. When the thickness of this decarburized layer is less than 0.01 μm, adhesiveness of the plating layer cannot be obtained sufficiently, and thus the thickness of the decarburized layer is 0.01 μm or more. In order to further improve adhesiveness of the plating layer, the thickness of the decarburized layer is more preferably 0.08 μm or more, furthermore preferably 0.15 μm or more. On the other hand, the decarburized layer which is excessively thick decreases tensile strength and fatigue strength of the steel sheet. From this viewpoint, the thickness of the decarburized layer in the steel sheet surface layer portion is 10.0 μm or less. Further, in view of fatigue strength, the thickness of the decarburized layer is more preferably 9.0 μm or less, furthermore preferably 8.0 μm or less.

Note that the decarburized layer described in the present invention refers to an area which is continuous from an uppermost surface of base iron, and in this area the fraction of a hard structure is half or less than the fraction of a hard structure at ¼ thickness. Further, regarding the thickness of the decarburized layer, a cross section in parallel with the rolling direction of the steel sheet and perpendicular to a sheet surface is mirror finished and observed using the FE-SEM, decarburized layer thicknesses of three or more positions are measured in one steel sheet, and the average value thereof is taken as the thickness of the decarburized layer. Note that the hard structure described in the present invention refers to a structure constituted of a phase harder than ferrite, that is, a structure mainly constituted of a phase of bainite, bainitic ferrite, martensite and tempered martensite, retained austenite, and/or the like. Further, the fraction thereof is by using a volume fraction.

"Oxides"

In the decarburized layer, oxides containing Si and/or Mn are dispersed in crystal grains and/or crystal grain boundary to increase the cutting property so that mechanical cutting can be performed easily. The higher the density of oxides, the more the cutting property is improved, and thus in the present invention, the density of oxides is $1.0 \times 10^{12}$ oxides/m$^2$ or more. Further, from the above viewpoint, the density of oxides is more preferably $3.0 \times 10^{12}$ oxides/m$^2$ or more, furthermore preferably $5.0 \times 10^{12}$ oxides/m$^2$ or more. On the other hand, when the density of oxides exceeds $1.0 \times 10^{16}$ oxides/m$^2$, the distance between oxides becomes excessively close, the steel sheet surface layer portion breaks by light processing, and moreover the plating layer is impaired. Thus, the density of oxides is preferably limited to $1.0 \times 10^{16}$ oxides/m$^2$ or less. Further, in order to ensure sufficient formability in the steel sheet surface layer portion, the density of oxides is more preferably $5.0 \times 10^{15}$ oxides/m$^2$ or less, furthermore preferably $1.0 \times 10^{15}$ oxides/m$^2$ or less.

Further, the oxides dispersed in the steel sheet surface layer portion do not contribute to improvement of cutting property when they are excessively minute, and thus the average grain diameter of the oxides is defined to be 30 nm or more in the present invention. On the other hand, when the oxides are excessively coarse, fracture characteristics such as ductility is impaired, and thus the average grain diameter of the oxides is 500 nm or less. Further, the average grain diameter of the oxides is more preferably 300 nm or less, furthermore preferably 120 nm or less, furthermore preferably 100 nm or less from the above viewpoint. Further, in order to make the average grain diameter of the oxides to be less than 30 nm, the treatment atmosphere and temperature need to be strictly controlled making it practically difficult, and thus it is preferably 30 nm or more.

Regarding the oxides in the steel sheet surface layer portion as described above, a cross section in parallel with the rolling direction of the steel sheet and perpendicular to a sheet surface is mirror finished and observed using the FE-SEM. The density of the oxides is obtained by observing the decarburized layer by an amount of 7 μm$^2$ and counting the number of oxides, or obtained by using an observation area which is needed until 1000 oxides are counted. Further, regarding the size of the oxides, randomly chosen 100 to 1000 circle-equivalent diameters are averaged, and the average grain diameter is taken.

"Plating Layer"

In the present invention, on the surface of the steel sheet having the above structure, a hot-dip galvanized layer or an alloyed hot-dip galvanized layer is formed, to thereby form a high-strength hot-dip galvanized steel sheet or a high-strength alloyed hot-dip galvanized steel sheet. By thus forming the hot-dip galvanized layer on the surface of the steel sheet, a high-strength hot-dip galvanized steel sheet having excellent corrosion resistance can be obtained. Further, by forming the alloyed hot-dip galvanized layer on the surface of the steel sheet, a high-strength alloyed hot-dip galvanized steel sheet which has excellent corrosion resistance and is excellent in adhesiveness of paint can be obtained.

"Mechanical Cutting Property"

The mechanical cutting property described in the present invention can be measured and evaluated by, for example, a method described below.

Generally, when shear cutting or punching with a punch is performed numerous times on the high-strength steel sheet, the shear blade or punch tip wears and the clearance increases. Thus, when the number of times of punching a steel sheet increases, burrs on a sheared end surface and punched end surface become large. Accordingly, as the method to evaluate the mechanical cutting property of the high-strength hot-dip galvanized steel sheet according to the present invention, a method can be employed which punches continuously and measures a burr height at every 50 times under the conditions of a steel sheet having a thickness of 1.2 mm, a die having a hole diameter of 10.3 mmφ, a punch material SKD11, a punch diameter 10 mmφ (clearance 12.5%).

In the evaluation by the above method, it has been found that when the number of times of punching the steel sheet increases, the punch tip wears and the clearance increases, and thus the burr height increases. However, as a result of repeating the measurement, depending on the case, there were seen cases where a burr height varies significantly at a specific end face of a steel sheet. Accordingly, punch holes are divided into four at positions of 0°, 90°, 180°, 270°, and at a point when the burr height in the direction of one of them exceeds 3.0 times the initial value, the test is finished and the number of times of punching at this point is defined as a limit number of times of punching. Describing more specifically, upon measuring the burr height of a punched hole, a maximum burr height in the range of 0° to 90° is h1, a maximum burr height in the range of 90° to 180° is h2, a maximum burr height in the range of 180° to 270° is h3, a maximum burr height in the range of 270° to 360° is h4. Assuming that the burr height when punched for the first time is h1*, h2*, h3*, h4*, the number of times of punching at a point when one or more of h1/h1*, h2/h2*, h3/h3*, h4/h4* exceeds 3.0 is the limit number of times of punching. Note that in the punching test, the test is performed so that relative directions in a cold-rolling direction of a punching punch, a die, and a steel sheet do not change, and a traveling direction of the cold rolling among rolling directions of the steel sheet is 0°. In the present invention, one on which the number of times of punching exceeds 600 times can be defined as a high-strength hot-dip galvanized steel sheet excellent in mechanical cutting property. More preferably, the limit number of times of punching is 800 times, furthermore preferably 1000 times.

"Work Hardening Coefficient (n Value)"

In the high-strength hot-dip galvanized steel sheet defined in this embodiment, a work hardening coefficient (n value) at a time of plastic deformation of 3 to 7% is 0.080 or more on average.

As described above, the work hardening coefficient (n value) defined in the present invention is a characteristic value to be a reference of drawing property (ductility), and the larger the n value, the larger the extension until a local contraction occurs, thereby improving ductility. However, on the other hand, there is a contradicting characteristic that the smaller the n value, the more the mechanical cutting property improves. In the present invention, the n value with which the ductility is improved is defined to 0.080 or more. On the other hand, although an upper limit of the n value is not particularly defined, in order to make the n value at a time of plastic deformation of 3 to 7% be over 0.250 on average, it is necessary to make the maximum tensile strength be less than 900 MPa or to add a C amount of 0.40%, which is hence not preferable. In this view point, the n value is preferably 0.200 or less, more preferably 0.18 or less in view of the tensile strength in particular. Note that the plastic deformation of 3 to 7% is in the range of plastic working of a steel sheet which is normally used frequently.

In the present invention, as described above, the work hardening ability is increased by containing the retained austenite phase in the steel sheet structure by 3% or more, and it has high ductility with the n value being 0.080 or more on average. On the other hand, in the present invention, the solid solution carbon amount in the retained austenite phase is limited to 0.70 to 1.00%, and the average grain diameter is suppressed to 2.0 µm or less and the average distance between grains is suppressed to 5.0 µm, so as to increase density and thereby improve the mechanical cutting property. Thus, it becomes possible to obtain both excellent ductility and mechanical cutting property while ensuring high tensile strength.

"Maximum Tensile Strength"

In the present invention, it is preferred that the maximum tensile strength is 900 MPa or more as steel sheet strength. This is because it is strength that makes tool deterioration significant when shear cutting or punching is performed on a high-strength steel sheet of 900 MPa or more. Further, even in a steel sheet of less than 900 MPa, the effect of mechanical cutting property improvement which is an effect of the present invention can be enjoyed, but the effect is small in a steel sheet with low tensile strength. Accordingly, in the present invention, together with the above effect, also in view of ensuring base material strength, application to a high-strength hot-dip galvanized steel sheet of 900 MPa or more is preferred.

[Manufacturing Method of the High-strength Hot-dip Galvanized Steel Sheet]

Next, a manufacturing method of the high-strength hot-dip galvanized steel sheet excellent in formability of the present invention will be described.

The manufacturing method of the high-strength hot-dip galvanized steel sheet of this embodiment first includes a hot rolling step of heating to 1180° C. or more a slab having the above-described chemical components directly or after cooled once and performing hot rolling in which rolling completion temperature is 850 to 950°, thereafter rapidly cooling to 500 to 650° C.: at an average cooling rate of 10° C./s or more, and thereafter coiling on a coil and slowly cooling to 400° C. by taking 1.0 hour or more, and a cold rolling step of performing cold rolling so that a total reduction ratio is 30 to 75% after pickling subsequently to the hot rolling step. Further, in this embodiment, there is also included an annealing step of heating the steel sheet after the cold rolling step to 750° C. or more with an average heating rate between 600 and 750° C. being 20° C./s or less, then cooling with an average cooling rate between 750 and 650° C. being 1.0 to 15.0° C./s and cooling with an average cooling rate from 650° C. being 3.0° C./s or more, and performing, while retaining for 20 to 1000 seconds in the temperature range of 300 to 470° C. and while applying a tension of 5 to 100 MPa in this temperature range, one or more times of bending with a bending radius of 800 mm or less. Moreover, in this embodiment, there is also included a plating step of performing hot-dip galvanizing on surfaces of the steel sheet to form a plating layer by immersing after the annealing step the steel sheet in a galvanizing bath under the conditions of plating bath temperature: 450 to 470° C., steel sheet temperature at a time of entering the plating bath: 430 to 490° C., and effective Al amount in the plating bath: 0.01 to 0.18 mass %. Moreover, in this embodiment, there is also included a cooling step of cooling at an average cooling rate of 0.5° C./s or more to 150° C. or less after the plating step. Then, in this embodiment, as the annealing step, there is employed a method such that, in a preheating zone under the condition of an air ratio: 0.7 to 1.2 in a mixed gas of air and fuel gas used in a preheating burner, the air ratio being a ratio of a volume of air contained in the mixed gas in a unit volume and a volume of air logically needed for complete combustion of fuel gas contained in the mixed gas in the unit volume, oxides are generated in a steel sheet surface layer portion by passing through while heating to a steel sheet temperature of 400 to 800° C., then the oxides generated in the preheating zone are reduced by heating to 750° C. or more in a reduction zone with a partial pressure ratio $P(H_2O)/P(H_2)$ between water vapor ($H_2O$) and hydrogen ($H_2$): 0.0001 to 2.0, and thereafter cooling is performed.

In order to manufacture the above-described high-strength steel sheet of the present invention, first, a slab having the above-described chemical components (composition) is cast.

As the slab to be subjected to the hot rolling, a continuously cast slab or a slab produced by a thin slab caster or the like can be used. The manufacturing method of the high-strength galvanized steel sheet of the present invention is compatible with a process like continuous casting-direct rolling (CC-DR) in which hot rolling is performed immediately after casting.

In the hot rolling step of this embodiment, to alleviate anisotropy of a crystal orientation due to casting, the heating temperature of the slab is 1180° C. or more. Further, the heating temperature of the slab is more preferably 1200° C. or more. An upper limit of this heating temperature of the slab is not particularly set, but the heating temperature is preferably 1300° C. or less because a large amount of energy is needed to be put in for heating over 1300° C.

After the slab is heated to the above temperature, hot rolling is performed. In the present invention, the rolling completion temperature of the hot rolling is 850 to 950° C. When this rolling completion temperature is less than 850° C., a rolling reaction is increased too much to increase a step load, and thus in the present invention this temperature is 850° C. or more, more preferably 870° C. or more. On the other hand, when the rolling completion temperature exceeds 950° C., a micro structure in the hot rolled steel becomes coarse, and a micro structure in the cold rolling and annealing steps thereafter becomes coarse as well. Thus, in the present invention, the rolling completion temperature is 950° C. or less, more preferably 930° C. or less.

After the hot rolling, it is rapidly cooled (rapid cooling). In the present invention, an average cooling rate when rapid cooling to 500 to 600° C. is preferably 10° C./s or more. This is for advancing transformation in lower temperatures to thereby micronize a grain diameter of the hot rolled steel sheet, and micronize an effective crystal grain diameter after the cold rolling and annealing. On the other hand, an upper limit of the average cooling rate is not particularly set, but when it exceeds 200° C./s, a special cooling medium is needed which is not preferable in terms of costs. Thus, it is preferably 200° C./s or less.

After the steel sheet is rapidly cooled, it is coiled as a hot rolled coil. In this step, "perlite" and/or "coarse cementite whose major axis exceeds 1 μm" are/is generated in the steel sheet after the hot rolling, to thereby randomize textures and modes of various types of transformed structure in the annealing step after the cold rolling, which will be described later. For generating perlite and/or coarse cementite in this manner, a cooling stop temperature of the rapid cooling after the hot rolling is 500° C. or more in the present invention. Further, in order to decrease anisotropy, the cooling stop temperature is more preferably 530° C. or more, furthermore preferably 550° C. or more. On the other hand, when the cooling stop temperature is too high, a scale layer of the steel sheet surface layer portion becomes excessively thick and surface quality is impaired, and thus the cooling stop temperature needs to be 650° C. or less in the present invention. Further, from the above viewpoint, the cooling stop temperature is preferably 630° C. or less. Then, in the present invention, the steel sheet for which the above cooling stop temperature is 500 to 650° C. is coiled as a hot rolled coil. Further, in order to sufficiently generate the perlite and/or coarse cementite and decrease anisotropy of delayed fracture resistance, retention for a sufficient time is needed in the temperature range in which cementite is generated after the rapid cooling is stopped. Accordingly, in the present invention, an elapsed time of slow cooling from cooling stop to 400° C. is 1.0 hour or more. Further, this elapsed time is more preferably 2.0 hours or more, furthermore preferably 3.0 hours or more. Further, an upper limit of the elapsed time is not particularly set, but retention over 24.0 hours needs special equipment which is not preferable in terms of costs. Thus, it is preferably 24.0 hours or less.

Next, in this embodiment, the hot rolled steel sheet produced under the above conditions is subjected to a pickling treatment. The pickling is able to remove oxides on the steel sheet surfaces, and thus is important from the point of improving galvanizing properties of the high-strength hot-dip galvanized steel sheet or high-strength alloyed hot-dip galvanized steel sheet as a final product. Further, the pickling may be only one treatment or may be performed through several separate treatments.

Next, the steel sheet after the pickling is rolled so that the total reduction ratio becomes 30% or more and 75% or less by cold rolling. At this time, the rolling is preferably performed through several paths, and the number of paths of the rolling and a distribution of reduction ratio to the paths are not in question. When the reduction ratio in the cold rolling becomes lower than 30%, a sufficient strain is not accumulated in the steel sheet, and thus recrystallization does not proceed sufficiently through an annealing step thereafter and a processed structure is left as it is, making the structure coarse. Thus, the average distance between grains of the retained austenite phase becomes large and the cutting property deteriorates. Further, in order to accumulate the strain sufficiently, the total reduction ratio is more preferably 33% or more, furthermore preferably 36% or more. On the other hand, when the total reduction ratio exceeds 75%, there are cases where the steel sheet fractures during the rolling, and thus the total reduction ratio in the cold rolling is 75% or less in the present invention. Further, from the above viewpoint, the total reduction ratio is more preferably 70% or less, furthermore preferably 65% or less.

Next, in the present invention, to the steel sheet rolled under the above conditions, an annealing treatment is performed in an annealing step under the following conditions, and thereafter a hot-dip galvanizing treatment is performed in a plating step. In the present invention, a continuous annealing and plating line having a preheating zone, a reduction zone, and a plating zone is preferably used for the annealing step and the plating step. Further, an atmosphere of the preheating zone may be any one of oxidation atmosphere, a non-oxidation atmosphere, and a direct reduction atmosphere.

As described above, when the continuous annealing and plating line is used for the annealing step and the plating step, as the annealing step under the above conditions, a method can be employed such that, in a preheating zone under the condition of an air ratio: 0.7 to 1.2 in a mixed gas of air and fuel gas used in a preheating burner, the air ratio being a ratio of a volume of air contained in the mixed gas in a unit volume and a volume of air logically needed for complete combustion of fuel gas contained in the mixed gas in the unit volume, oxides are generated in a steel sheet surface layer portion by passing through while heating to a steel sheet temperature of 400 to 800° C., then the oxides generated in the preheating zone are reduced by heating to 750° C. or more in a reduction zone with a partial pressure ratio $P(H_2O)/P(H_2)$ between $H_2O$ and $H_2$: 0.0001 to 2.0, and thereafter cooling is performed. Then, the plating step after the annealing step can be a method which performs the hot-dip galvanizing under the conditions that the steel sheet is immersed in a galvanizing bath under the conditions of plating bath temperature: 450 to 470° C., steel sheet temperature at a time of entering the plating bath: 430 to 490° C., and effective Al amount in the plating bath: 0.01 to 0.18 mass %.

The heating rate in the annealing step affects recrystallization behavior in the steel sheet. In particular, the heating rate at 600 to 750° C. is important, and by setting the average heating rate therein to 20° C./s or less, recrystallization proceeds sufficiently to make an isotropic and fine microstructure, thereby making crystal grains of austenite generated by reverse transformation be isotropic and fine. Also, in order for the recrystallization to proceed further, the average heating rate is more preferably 15° C./s or less, furthermore preferably 12° C./s or less. Note that a lower limit of the average heating rate is not particularly set, but productivity decreases significantly when the average heating rate is lower than 0.5° C./s, and thus it is preferably 0.5° C./s or more.

In the preheating zone, an oxidizing treatment is performed for forming an Fe-oxide coating film having an appropriate thickness in the steel sheet surface layer portion. At this time, the steel sheet temperature when passing through the preheating zone is set to 400 to 800° C., and by preheating under the condition that an air ratio {[ratio, in a mixed gas of air and fuel gas used in a preheating burner, of a volume of air contained in the mixed gas in a unit volume and a volume of air logically needed for complete combustion of fuel gas contained in the mixed gas in the unit volume]=[volume of air contained in the mixed gas in unit volume $(m^3)$]/[volume $(m^3)$ of air logically needed for complete combustion of fuel gas contained in the mixed gas in the unit volume]} is 0.7 to 1.2, the Fe-oxide coating film of 0.01 to 20 μm is formed on a surface layer of the steel sheet. When the air ratio is too large exceeding 1.2, a sufficient Fe-oxide coating film is not generated on the steel sheet surface layer portion. Further, since the oxide coating film operates as an oxygen supply source for generating oxides of Si and/or Mn in the reduction zone, when the air ratio is less than 0.7 which is too small, predetermined oxides cannot be obtained. Further, if the steel sheet temperature when passing through the preheating zone is less than 400° C., it is not possible to form a sufficient oxide coating film, or on the other hand, when it is a high temperature exceeding 800° C., the oxide coating film grows excessively, and thus it becomes difficult to make the thickness of the decarburized layer come within a predetermined range.

Further, when a maximum heating temperature in the annealing step is low, coarse cementite melts and remains, which significantly deteriorates ductility. In the present invention, in order to sufficiently solid-solve the cementite to ensure ductility, the maximum heating temperature is 750° C. or more, more preferably 760° C. or more. Note that the upper limit of the heating temperature is not particularly limited but heating over 1000° C. largely impairs surface quality and deteriorates wettability of plating, and thus the maximum heating temperature is preferably 1000° C. or less, more preferably 950° C. or less.

The maximum heating temperature (750° C. or more) in the annealing step is preferably reached in the reduction zone. In this reduction zone, the Fe-oxide coating film generated in the oxidizing zone is reduced to form the decarburized layer, and Si and/or Mn oxides are dispersed moderately. Thus, in the atmosphere of the reduction zone, the ratio between the water vapor partial pressure $P(H_2O)$ and the hydrogen partial pressure $P(H_2)$, $P(H_2O)/P(H_2)$, is preferably 0.0001 to 2.00. When $P(H_2O)/P(H_2)$ is less than 0.0001, the Si and/or Mn oxides are formed only on an uppermost surface layer, and it becomes difficult to disperse the Si and/or Mn oxides moderately inside the decarburized layer. On the other hand, when $P(H_2O)/P(H_2)$ exceeds 2.00, decarburization proceeds excessively, and it is possible that the thickness of the decarburized layer cannot be controlled in a predetermined range. Further, the $P(H_2O)/P(H_2)$ is more preferably in the range of 0.001 to 1.50, furthermore preferably in the range of 0.002 to 1.20.

The average cooling rate from the above-described maximum heating temperature is important for sufficiently generating ferrite. Accordingly in the present invention, the average cooling rate of 750 to 650° C. which is a temperature range in which the ferrite is generated is set to 1.0 to 15.0° C./s. When the average cooling rate from the maximum heating temperature exceeds 15.0° C./s, it is possible that sufficient amount of ferrite cannot be obtained, and ductility deteriorates. On the other hand, when the average cooling rate is lower than 1.0° C./s, a sufficient amount of hard structure cannot be obtained due to excessive generation of ferrite, generation of perlite, and/or the like, and strength deteriorates.

The average cooling rate until cooling is stopped for entering the plating bath from the steel temperature 650° C. is preferably 3.0° C./s or more. This is for obtaining a hard structure with a more random crystal orientation by further decreasing the transformation temperature to the hard structure. From this viewpoint, the average cooling rate is more preferably 5.0° C./s or more. Further, although an upper limit of the average cooling rate is not particularly set, having an average cooling rate exceeding 200° C./s needs special cooling equipment, and thus it is preferably 200° C./s or less.

Next, the plating step of immersing the steel sheet after the annealing step in the plating bath is performed. Components of the plating bath is mainly constituted of zinc, and the effective Al amount, which is a value obtained by subtracting the total Fe amount from the total Al amount in the bath, is preferably 0.01 to 0.20 mass %, more preferably 0.01 to 0.18 mass %. Particularly, when an alloying treatment is performed, in order to control proceeding of alloying of the plating layer, the effective Al amount in the bath is more preferably 0.07 to 0.12 mass %. Further, when the plating layer is not alloyed, the effective Al amount in the bath may be in the range of 0.18 to 0.20 mass %.

Further, when one or more of Pb, Sb, Si, Sn, Mg, Mn, Ni, Cr, Co, Ca, Cu, Li, Ti, Be, Bi, Sr, I, Cs, Sr, REM is or are mixed in the galvanizing bath, the effect of the present invention is not impaired, and there may even be cases where they improve corrosion resistance, workability, and/or the like depending on their amounts and hence are preferable.

The plating bath temperature is preferably 450° C. to 470° C. When the plating bath temperature is less than 450° C., the viscosity of the plating bath increases excessively, it becomes difficult to control the thickness of the plating layer, and the appearance of the steel sheet is impaired. On the other hand, when the plating bath temperature exceeds 470° C. a large amount of fume is generated making safe manufacturing difficult, and hence the plating bath temperature is preferably 470° C. or less.

Further, in order to stabilize the plating bath temperature, the entering temperature of the steel sheet in the plating bath is preferably 430° C. to 490° C. If the steel sheet temperature when the steel sheet enters the plating bath is lower than 430° C., it becomes necessary to give a large heat quantity to the plating bath in order to stabilize the plating bath temperature to 450° C. or more, and thus is practically inappropriate. On the other hand, if the steel sheet temperature when the steel sheet enters the plating bath is higher than 490° C., it is necessary to introduce equipment to remove a large heat quantity from the plating bath for stabilizing the plating bath temperature to 470° C. or less, and thus is inappropriate in terms of manufacturing costs.

In the present invention, to obtain the retained austenite sufficiently, before and/or after immersing in the plating bath, the steel sheet is retained in the range of 300 to 470° C., so as to make bainite transformation proceed. This retention time in the range of 300 to 470° C. is 20 to 1000 seconds including the time of immersing in the plating bath. When this retention time is less than 20 seconds, the bainite transformation does not proceed sufficiently, and concentration of carbon to the retained austenite becomes insufficient. Further, to further increase bake hardenability, the retention time is more preferably 35 seconds or more, furthermore preferably 50 seconds or more. On the other hand, when the above retention time exceeds 1000 seconds, carbon concentrates excessively in the retained austenite, or generation of cementite begins and predetermined characteristics cannot be obtained. Further, in order to control carbon concentration in the retained austenite to obtain high bake hardenability, the retention time is preferably 600 seconds or less, more preferably 450 seconds or less.

Moreover, in order to micronize the crystal grain diameter of the retained austenite, it is effective to facilitate nucleation of bainite and/or bainitic ferrite to cause nucleation from respective portions of the steel sheet, so as to finely divide austenite in the base phase. For this, bend deformation is performed in a state that tensile stress is applied to the steel sheet between 300 and 470° C., thereby facilitating nucleation of a large amount of bainite and/or bainitic ferrite. As the stress at this time, a stress of 3 to 100 MPa is applied with the rolling direction being a tensile axis. When the load stress is less than 3 MPa, the effect of facilitating nucleation cannot be recognized and thus it is taken as a lower limit. Also, in order to further facilitate nucleation to micronize the effective crystal grain diameter, the load stress is more preferably 5 MPa or more, furthermore preferably 7 MPa or more. On the other hand, when the load stress exceeds 100 MPa, the steel sheet may largely deform, and thus the load stress is 100 MPa or less. Further, to make deformation of the steel sheet further smaller, the load stress is more preferably 70 MPa or less, furthermore preferably 50 MPa or less.

The strain giving and heat history from the hot rolling step to the annealing step and the strain giving during the aforementioned bainite transformation, the solid solution carbon amount in the retained austenite phase can be 0.70 to 1.00%, the average grain diameter can be 2.0 μm or less in addition, and the average distance between grains can be 0.1 to 5.0 μm. Moreover, the work hardening coefficient can be 0.080 or more on average during plastic deformation of 3 to 7%.

By further performing bend deformation in a state that the tensile stress of the above condition is applied, the nucleation is largely facilitated, and thus in the present invention, one or more times of bending with a bending radius of 800 mm or less is or are performed. Further, the larger the degree of processing, the more the nucleation is facilitated, and thus the bending radius is preferably 650 mm or less. On the other hand, a lower limit of the bending radius is not particularly set. However, since it is difficult to homogeneously bend the entire area of the steel sheet with an excessively small radius, the bending radius is preferably 50 mm or more, more preferably 100 mm or more.

Further, the number of times of bending is one or more, and moreover, it is preferably twice or more because the larger the degree of processing the more the nucleation is facilitated. Note that although an upper limit of the number of times of processing is not particularly set, it is difficult to perform 20 times or more bending in the retention time in the temperature range, and thus the number of times of processing is preferably 20 times or less.

In the present invention, after the above hot-dip galvanizing treatment is performed, an alloying treatment of the plating layer of the steel sheet surface may further be performed at temperatures of 470 to 620° C. By performing such an alloying treatment, a Zn—Fe alloy formed by alloying the hot-dip galvanized layer is formed on the surface, thereby obtaining a high-strength alloyed hot-dip galvanized steel sheet excellent in rust prevention.

To alloy the plating layer, the alloying treatment temperature is 470° C. or more because alloying does not proceed sufficiently when it is less than 470° C. Further, when the alloying treatment temperature exceeds 620° C., coarse cementite is generated and strength decreases significantly, and thus it is 620° C. or less in the present invention. Further, the alloying treatment temperature is more preferably 480 to 600° C., furthermore preferably 490 to 580° C.

Further, the alloying treatment time is not particularly limited, but needs to be two seconds or more for advancing alloying sufficiently and is more preferably 5 seconds or more. On the other hand, when the alloying treatment time exceeds 200 seconds, there is a concern that excessive alloying of the plating layer occurs and characteristics deteriorate. Thus, the treatment time is 200 seconds or less, preferably 100 seconds or less.

Note that although the alloying treatment is preferably performed immediately after immersing in the plating bath, it is also possible to let cool to a steel sheet temperature of 150° C. or less after the immersing, and then reheat to the alloying treatment temperature.

Further, when the average cooling rate when cooling to 150° C. or less after the plating treatment is lower than 0.5° C./s, coarse cementite is generated, and there is a concern that strength and/or ductility deteriorates. Thus, the average cooling rate is set to 0.5° C./s or more, more preferably 1.0° C./s or more. Note that although an upper limit of the average cooling rate is not particularly set, it is preferably 200° C./s or less, more preferably 50° C./s or less because having an average cooling rate exceeding 200° C./s needs special cooling equipment.

Further, when an alloying treatment of the plating layer is performed, the timing to perform the above-described bainite transformation process may be either before or after the alloying treatment.

Further, in the present invention, in middle of cooling or after cooling, reheating treatment may be performed for the purpose of tempering martensite. A reheating temperature for reheating is preferably 200° C. or more because tempering does not proceed sufficiently when it is less than 200° C. Further, when the heating temperature exceeds 620° C., strength deteriorates significantly, and thus it is preferably 620° C. or less, more preferably 550° C. or less.

Furthermore, in this embodiment, for shape correction, it is also possible to perform cold rolling with a reduction ratio of 3.00% or less on the high-strength hot-dip galvanized steel sheet or the high-strength alloyed hot-dip galvanized steel sheet which is cooled to room temperature.

Note that the manufacturing method of the present invention is not limited to the above-described example.

For example, in the present invention, a coating film constituted of a phosphorus oxide and/or a composite oxide containing phosphorus may be added to the surface of the plating layer of the high-strength hot-dip galvanized steel sheet obtained by the above-described method. Such a coating film constituted of a phosphorus oxide and/or a composite oxide containing phosphorus can function as a lubricant when a steel sheet is processed, and can protect the plating layer formed on the surface of a base steel sheet.

The high-strength hot-dip galvanized steel sheet and the high-strength alloyed hot-dip galvanized steel sheet excellent in mechanical cutting property according to the present invention as described above employ a structure in which the steel components, the steel sheet structure, the thickness of the decarburized layer and the size and so on of oxides in the steel sheet surface layer portion, and so on are defined to appropriate ranges as described above. That is, by containing a predetermined amount or more of retained austenite phase in the steel sheet structure, work hardening ability is increased, and thereby strength and ductility of the steel sheet can be improved, and meanwhile by increasing density by limiting the solid solution carbon amount in the retained austenite phase and suppressing the average grain diameter, the mechanical cutting property when processing the steel sheet (punching workability) improves. Moreover, by limiting the thickness of the decarburized layer and the average grain diameter and the average intergrain distance of oxides in the steel sheet surface layer portion, adhesiveness of the plating layer improves. Therefore, while ensuring the maximum tensile strength of 900 MPa or more, the high-strength hot-dip galvanized steel sheet and the high-strength alloyed hot-dip galvanized steel sheet capable of obtaining excellent ductility and mechanical cutting property can be realized.

Further, the manufacturing method of the high-strength hot-dip galvanized steel sheet and the high-strength alloyed hot-dip galvanized steel sheet according to the present invention employs a method which sets steel components to an appropriate range, and limits hot rolling and cold rolling and annealing conditions after rolling to predetermined ranges. Thus, the ratio of the retained austenite phase in the steel sheet structure can be controlled to a predetermined ratio or more, and an average grain diameter and an average intergrain distance can be limited to a predetermined range while limiting the solid solution carbon amount contained in the retained austenite phase, and thus it is possible to improve strength and ductility as well as mechanical cutting property of the steel sheet. Moreover, since the thickness of the decarburized layer, and the average grain diameter and average density of oxides in the steel sheet surface layer portion can be limited to a predetermined range, it is possible to improve adhesiveness of the plating layer. Therefore, while ensuring the maximum tensile strength of 900 MPa or more as described above, it is possible to manufacture the high-strength hot-dip galvanized steel sheet and the high-strength alloyed hot-dip galvanized steel sheet capable of obtaining excellent ductility and mechanical cutting property.

Therefore, by applying the high-strength hot-dip galvanized steel sheet and the high-strength alloyed hot-dip galvanized steel sheet excellent in mechanical cutting property, and the manufacturing method thereof of the present invention to the automotive field in particular, merits such as improvement in safety accompanying increase in strength of vehicle body, improvement in workability for processing a member, and the like can be enjoyed sufficiently, and their social contributions are immeasurable.

EXAMPLE

Hereinafter, the present invention will be described more specifically by using examples of the high-strength hot-dip galvanized steel sheet and the high-strength alloyed hot-dip galvanized steel sheet excellent in mechanical cutting property, and the manufacturing method thereof according to the present invention. However, the present invention is of course not limited to the examples below and can be implemented by appropriately adding changes within the range compatible to the gist described above and below, and they are all included in the technical scope of the present invention.

[Manufacturing Steel Sheets]

First, slabs having chemical components illustrated in Table 1 below were obtained by controlling deoxidation and desulfurization and chemical components of molten steel in a steelmaking step. Then, after casting, they were subjected immediately to hot rolling, cold rolling, coiling, pickling under the conditions illustrated in Tables 2 to 4 below, and moreover subjected to cold rolling. Thereafter, the obtained cold rolled steel sheets were passed through a continuous annealing and galvanizing line under the conditions illustrated in Tables 5 to 8 below, to thereby manufacture hot-dip galvanized steel sheets of experimental examples 1 to 128. Further, in part of these experimental examples 1 to 128, an alloying treatment of a plating layer was performed under the conditions illustrated in Tables 5 to 8, thereby making alloyed hot-dip galvanized steel sheets (GA). For the steel sheets other than them, the alloying treatment was not performed, or a treatment temperature was set to less than 470° C., thereby making hot-dip galvanized steel sheets (GI) whose plating layer is not alloyed.

TABLE 1

| | | | | CHEMICAL COMPONENT (MASS %) | | | | | | | | |
|---|---|---|---|---|---|---|---|---|---|---|---|---|
| No. | C | Si | Mn | P | S | Al | N | O | Ti | Nb | V | Cr |
| A | 0.117 | 1.39 | 1.57 | 0.0160 | 0.0015 | 0.033 | 0.0045 | 0.0008 | | | | |
| B | 0.238 | 0.83 | 1.51 | 0.0135 | 0.0018 | 0.039 | 0.0037 | 0.0014 | | | | |
| C | 0.201 | 1.67 | 1.92 | 0.0096 | 0.0023 | 0.056 | 0.0029 | 0.0010 | | | | |

TABLE 1-continued

CHEMICAL COMPONENT (MASS %)

| No. | | | | | | | | | | |
|---|---|---|---|---|---|---|---|---|---|---|
| D | 0.339 | 0.29 | 2.12 | 0.0064 | 0.0032 | 0.511 | 0.0030 | 0.0034 | | |
| E | 0.084 | 0.77 | 2.71 | 0.0107 | 0.0005 | 0.048 | 0.0045 | 0.0008 | | |
| F | 0.089 | 0.95 | 1.55 | 0.0121 | 0.0005 | 0.023 | 0.0069 | 0.0017 | 0.072 | |
| G | 0.279 | 0.68 | 1.35 | 0.0094 | 0.0050 | 0.258 | 0.0014 | 0.0016 | | 0.031 |
| H | 0.130 | 0.06 | 1.84 | 0.0064 | 0.0040 | 1.066 | 0.0031 | 0.0011 | | |
| I | 0.148 | 1.69 | 1.11 | 0.0122 | 0.0017 | 0.027 | 0.0041 | 0.0018 | | |
| J | 0.226 | 0.47 | 2.93 | 0.0068 | 0.0044 | 0.067 | 0.0069 | 0.0023 | | |
| K | 0.153 | 1.49 | 1.69 | 0.0051 | 0.0002 | 0.022 | 0.0007 | 0.0011 | | |
| L | 0.191 | 1.33 | 2.29 | 0.0171 | 0.0036 | 0.038 | 0.0030 | 0.0008 | | |
| M | 0.179 | 1.28 | 1.74 | 0.0088 | 0.0019 | 0.006 | 0.0025 | 0.0005 | | |
| N | 0.106 | 0.61 | 1.45 | 0.0211 | 0.0006 | 0.007 | 0.0025 | 0.0006 | | |
| O | 0.169 | 0.14 | 1.33 | 0.0120 | 0.0038 | 0.418 | 0.0051 | 0.0004 | | 0.73 |
| P | 0.160 | 0.71 | 1.88 | 0.0068 | 0.0062 | 0.060 | 0.0013 | 0.0012 | | |
| Q | 0.240 | 0.81 | 1.28 | 0.0084 | 0.0019 | 0.012 | 0.0054 | 0.0016 | | |
| R | 0.214 | 1.94 | 2.68 | 0.0186 | 0.0022 | 0.034 | 0.0048 | 0.0009 | | |
| S | 0.262 | 0.58 | 2.47 | 0.0061 | 0.0060 | 0.069 | 0.0038 | 0.0023 | 0.028 | |
| T | 0.240 | 1.29 | 0.84 | 0.0092 | 0.0003 | 0.014 | 0.0033 | 0.0008 | | 1.07 |
| U | 0.152 | 0.49 | 1.50 | 0.0074 | 0.0024 | 0.250 | 0.0030 | 0.0009 | 0.014 | 0.008 |
| V | 0.239 | 1.79 | 1.50 | 0.0119 | 0.0048 | 0.048 | 0.0042 | 0.0009 | | 0.115 |
| W | 0.098 | 0.97 | 2.30 | 0.0080 | 0.0011 | 0.105 | 0.0023 | 0.0045 | | |
| X | 0.201 | 1.11 | 2.63 | 0.0207 | 0.0010 | 0.003 | 0.0027 | 0.0009 | 0.007 | 0.024 |
| Y | 0.134 | 1.15 | 1.73 | 0.0121 | 0.0040 | 0.024 | 0.0021 | 0.0013 | | |
| Z | 0.220 | 1.57 | 1.32 | 0.0078 | 0.0011 | 0.068 | 0.0027 | 0.0014 | | |
| AA | 0.109 | 0.32 | 2.45 | 0.0081 | 0.0003 | 1.361 | 0.0063 | 0.0009 | | |
| AB | 0.208 | 1.65 | 1.97 | 0.0092 | 0.0048 | 0.012 | 0.0050 | 0.0018 | | |
| AC | 0.162 | 1.30 | 1.13 | 0.0081 | 0.0037 | 0.023 | 0.0015 | 0.0019 | | |
| AD | 0.155 | 1.27 | 2.80 | 0.0052 | 0.0048 | 0.064 | 0.0031 | 0.0007 | | |
| AE | 0.062 | 1.07 | 1.94 | 0.0103 | 0.0038 | 0.017 | 0.0041 | 0.0010 | | |
| AF | 0.493 | 1.07 | 1.95 | 0.0061 | 0.0041 | 0.019 | 0.0038 | 0.0015 | | |
| AG | 0.149 | 1.06 | 0.49 | 0.0099 | 0.0039 | 0.023 | 0.0045 | 0.0013 | | |
| AH | 0.190 | 2.75 | 2.39 | 0.012 | 0.0035 | 0.034 | 0.0039 | 0.0012 | | |
| AI | 0.151 | 0.00 | 2.18 | 0.008 | 0.0028 | 0.520 | 0.0048 | 0.0011 | | |
| AJ | 0.130 | 0.48 | 4.02 | 0.009 | 0.0024 | 0.074 | 0.0031 | 0.0017 | | |
| AK | 0.180 | 0.98 | 2.47 | 0.018 | 0.0027 | 2.63 | 0.0044 | 0.0021 | | |

| No. | Ni | Cu | Mo | B | W | Ca | Ce | Mg | Zr | La | REM | NOTE |
|---|---|---|---|---|---|---|---|---|---|---|---|---|
| A | | | | | | | | | | | | EXAMPLE |
| B | | | | | | | | | | | | EXAMPLE |
| C | | | | | | | | | | | | EXAMPLE |
| D | | | | | | | | | | | | EXAMPLE |
| E | | | | | | | | | | | | EXAMPLE |
| F | | | | | | | | | | | | EXAMPLE |
| G | | | | | | | | | | | | EXAMPLE |
| H | | | 0.09 | 0.0007 | | | | | | | | EXAMPLE |
| I | | | | | | | | | | | | EXAMPLE |
| J | 0.44 | 0.19 | | | | | | | | | | EXAMPLE |
| K | | | | 0.0021 | | | | | | | | EXAMPLE |
| L | | 0.37 | | | | | | | | | | EXAMPLE |
| M | | | | | | 0.0031 | 0.0010 | | | | | EXAMPLE |
| N | 0.80 | | | | | | | | | | | EXAMPLE |
| O | | | 0.04 | | | | | | | | | EXAMPLE |
| P | | | | | | | | 0.0046 | | | | EXAMPLE |
| Q | | | | | | | | | 0.0022 | | | EXAMPLE |
| R | | | | | | | | | | 0.0029 | | EXAMPLE |
| S | | | | 0.0025 | | | | | | | | EXAMPLE |
| T | | | | | | | 0.0012 | | | | | EXAMPLE |
| U | | | | 0.0035 | | | | 0.0028 | | | | EXAMPLE |
| V | | | | | | | | | | | | EXAMPLE |
| W | | | | | | | | | 0.0034 | | | EXAMPLE |
| X | | | | | | | | | | | 0.0013 | EXAMPLE |
| Y | | | | | | | | | | | | EXAMPLE |
| Z | | | | | | | 0.0017 | | | | | EXAMPLE |
| AA | | | 0.23 | | | | | | | | | EXAMPLE |
| AB | | | | | 0.30 | | | | | | | EXAMPLE |
| AC | 0.76 | 0.51 | | | | | | | | | | EXAMPLE |
| AD | | | | | | | | | | | | COMPARATIVE EXAMPLE |
| AE | | | | | | | | | | | | COMPARATIVE EXAMPLE |
| AF | | | | | | | | | | | | COMPARATIVE EXAMPLE |
| AG | | | | | | | | | | | | COMPARATIVE EXAMPLE |
| AH | | | | | | | | | | | | COMPARATIVE EXAMPLE |
| AI | | | | | | | | | | | | COMPARATIVE EXAMPLE |

TABLE 1-continued

| | CHEMICAL COMPONENT (MASS %) | |
|---|---|---|
| AJ | | COMPARATIVE EXAMPLE |
| AK | | COMPARATIVE EXAMPLE |

TABLE 2

| EXPERIMENTAL EXAMPLE | STEEL COMPONENT | HOT ROLLING STEP | | | | | COLD ROLLING STEP REDUCTION RATIO % | NOTE |
|---|---|---|---|---|---|---|---|---|
| | | SLAB HEATING TEMPERATURE °C. | ROLLING COMPLETION TEMPERATURE °C. | AVERAGE COOLING RATE °C./SECOND | COOLING STOP TEMPERATURE °C. | ELAPSED TIME UNTIL 400° C. TIME | | |
| 1 | A | 1240 | 886 | 33 | 605 | 8.3 | 50 | EXAMPLE |
| 2 | A | 1240 | 917 | 23 | 625 | 5.9 | 42 | EXAMPLE |
| 3 | A | 1210 | 885 | 28 | 580 | 5.0 | 53 | EXAMPLE |
| 4 | A | 1215 | 885 | 29 | 595 | 4.1 | 43 | COMPARATIVE EXAMPLE |
| 5 | B | 1235 | 887 | 34 | 602 | 2.9 | 52 | EXAMPLE |
| 6 | B | 1215 | 888 | 66 | 525 | 3.1 | 66 | EXAMPLE |
| 7 | B | 1210 | 925 | 57 | 579 | 8.1 | 40 | EXAMPLE |
| 8 | B | 1265 | 928 | 28 | 578 | 4.2 | 50 | COMPARATIVE EXAMPLE |
| 9 | C | 1205 | 914 | 52 | 574 | 7.4 | 45 | EXAMPLE |
| 10 | C | 1245 | 859 | 16 | 640 | 7.4 | 55 | EXAMPLE |
| 11 | C | 1240 | 873 | 45 | 619 | 6.8 | 43 | EXAMPLE |
| 12 | C | 1240 | 915 | 54 | 612 | 9.4 | 63 | COMPARATIVE EXAMPLE |
| 13 | D | 1230 | 908 | 41 | 599 | 10.6 | 46 | EXAMPLE |
| 14 | D | 1270 | 937 | 55 | 583 | 8.0 | 58 | EXAMPLE |
| 15 | D | 1220 | 922 | 35 | 608 | 7.3 | 54 | EXAMPLE |
| 16 | D | <u>1045</u> | 885 | 48 | 582 | 5.8 | 63 | COMPARATIVE EXAMPLE |
| 17 | E | 1235 | 896 | 38 | 623 | 11.3 | 58 | EXAMPLE |
| 18 | E | 1195 | 864 | 17 | 627 | 3.0 | 60 | EXAMPLE |
| 19 | E | 1275 | 898 | 30 | 598 | 7.1 | 60 | EXAMPLE |
| 20 | E | 1235 | 905 | <u>5</u> | 601 | 9.8 | 44 | COMPARATIVE EXAMPLE |
| 21 | F | 1280 | 905 | 34 | 594 | 7.5 | 52 | EXAMPLE |
| 22 | F | 1210 | 870 | 27 | 560 | 3.3 | 50 | EXAMPLE |
| 23 | F | 1255 | 926 | 51 | 592 | 3.8 | 44 | EXAMPLE |
| 24 | F | 1240 | 927 | 43 | 609 | 4.9 | 60 | COMPARATIVE EXAMPLE |
| 25 | G | 1200 | 908 | 42 | 588 | 4.6 | 53 | EXAMPLE |
| 26 | G | 1240 | 919 | 32 | 554 | 2.6 | 67 | EXAMPLE |
| 27 | G | 1220 | 910 | 35 | 593 | 6.4 | 35 | EXAMPLE |
| 28 | G | 1200 | 922 | 38 | 605 | 9.7 | 41 | COMPARATIVE EXAMPLE |
| 29 | H | 1250 | 886 | 47 | 571 | 5.4 | 50 | EXAMPLE |
| 30 | H | 1270 | 933 | 51 | 560 | 8.3 | 71 | EXAMPLE |
| 31 | H | 1205 | 893 | 27 | 607 | 5.0 | 35 | EXAMPLE |
| 32 | H | 1210 | 882 | 21 | 609 | 6.0 | 52 | EXAMPLE |
| 33 | I | 1225 | 885 | 28 | 560 | 7.2 | 50 | EXAMPLE |
| 34 | I | 1205 | 913 | 26 | 609 | 7.0 | 44 | EXAMPLE |
| 35 | I | 1240 | 878 | 47 | 557 | 4.4 | 31 | EXAMPLE |
| 36 | I | 1245 | 904 | 24 | 613 | 5.5 | 39 | COMPARATIVE EXAMPLE |
| 37 | J | 1260 | 887 | 28 | 597 | 6.1 | 44 | EXAMPLE |
| 38 | J | 1190 | 906 | 55 | 606 | 2.5 | 53 | EXAMPLE |
| 39 | J | 1235 | 854 | 49 | 574 | 3.7 | 43 | EXAMPLE |
| 40 | J | 1185 | 897 | 26 | 568 | 4.5 | 43 | COMPARATIVE EXAMPLE |

TABLE 3

| EXPERIMENTAL EXAMPLE | STEEL COMPONENT | HOT ROLLING STEP | | | | | COLD ROLLING | NOTE |
|---|---|---|---|---|---|---|---|---|
| | | SLAB HEATING TEMPERATURE °C. | ROLLING COMPLETION TEMPERATURE °C. | AVERAGE COOLING RATE °C./SECOND | COOLING STOP TEMPERATURE °C. | ELAPSED TIME UNTIL 400°C. TIME | STEP REDUCTION RATIO % | |
| 41 | K | 1220 | 923 | 54 | 578 | 6.4 | 41 | EXAMPLE |
| 42 | K | 1200 | 941 | 58 | 571 | 5.4 | 34 | EXAMPLE |
| 43 | K | 1200 | 888 | 31 | 613 | 6.5 | 38 | EXAMPLE |
| 44 | K | 1210 | 907 | 34 | <u>434</u> | 1.8 | 41 | COMPARATIVE EXAMPLE |
| 45 | L | 1210 | 880 | 39 | 567 | 5.0 | 50 | EXAMPLE |
| 46 | L | 1280 | 878 | 36 | 635 | 7.1 | 38 | EXAMPLE |
| 47 | L | 1265 | 882 | 33 | 593 | 4.3 | 52 | EXAMPLE |
| 48 | L | 1280 | 924 | 26 | 583 | 7.1 | 65 | COMPARATIVE EXAMPLE |
| 49 | M | 1280 | 887 | 31 | 564 | 3.6 | 41 | EXAMPLE |
| 50 | M | 1270 | 895 | 39 | 580 | 3.9 | 50 | EXAMPLE |
| 51 | M | 1255 | 890 | 33 | 600 | 6.1 | 35 | EXAMPLE |
| 52 | M | 1270 | 887 | 28 | 568 | 4.9 | 53 | COMPARATIVE EXAMPLE |
| 53 | N | 1280 | 881 | 39 | 610 | 5.8 | 52 | EXAMPLE |
| 54 | N | 1185 | 887 | 41 | 533 | 10.3 | 53 | EXAMPLE |
| 55 | N | 1200 | 912 | 41 | 590 | 6.8 | 56 | EXAMPLE |
| 56 | N | 1235 | 888 | 27 | 585 | 7.6 | 43 | COMPARATIVE EXAMPLE |
| 57 | O | 1205 | 896 | 42 | 593 | 5.3 | 40 | EXAMPLE |
| 58 | O | 1210 | 891 | 27 | 601 | 1.9 | 37 | EXAMPLE |
| 59 | O | 1275 | 887 | 49 | 598 | 5.2 | 72 | EXAMPLE |
| 60 | O | 1250 | 894 | 28 | 599 | 7.4 | 52 | COMPARATIVE EXAMPLE |
| 61 | P | 1225 | 905 | 53 | 602 | 4.1 | 53 | EXAMPLE |
| 62 | P | 1245 | 903 | 32 | 561 | 7.0 | 63 | EXAMPLE |
| 63 | P | 1210 | 902 | 54 | 573 | 8.3 | 47 | EXAMPLE |
| 64 | P | 1190 | <u>1010</u> | 57 | 628 | 4.8 | 37 | COMPARATIVE EXAMPLE |
| 65 | Q | 1270 | 913 | 52 | 614 | 9.0 | 50 | EXAMPLE |
| 66 | Q | 1220 | 906 | 34 | 554 | 7.0 | 58 | EXAMPLE |
| 67 | Q | 1280 | 911 | 34 | 517 | 1.8 | 40 | EXAMPLE |
| 68 | Q | 1275 | 912 | 22 | 628 | 7.4 | 52 | COMPARATIVE EXAMPLE |
| 69 | R | 1210 | 892 | 41 | 599 | 5.0 | 38 | EXAMPLE |
| 70 | R | 1280 | 892 | 29 | 607 | 4.5 | 42 | EXAMPLE |
| 71 | R | 1220 | 924 | 27 | 569 | 1.7 | 60 | EXAMPLE |
| 72 | R | 1265 | 889 | 50 | 597 | 5.7 | 44 | COMPARATIVE EXAMPLE |
| 73 | S | 1225 | 915 | 33 | 619 | 10.6 | 61 | EXAMPLE |
| 74 | S | 1265 | 922 | 49 | 572 | 3.2 | 43 | EXAMPLE |
| 75 | S | 1270 | 934 | 24 | 641 | 6.9 | 53 | EXAMPLE |
| 76 | S | 1245 | 928 | 34 | 581 | 5.3 | 61 | COMPARATIVE EXAMPLE |
| 77 | T | 1185 | 901 | 45 | 561 | 3.4 | 56 | EXAMPLE |
| 78 | T | 1260 | 882 | 45 | 572 | 5.7 | 50 | EXAMPLE |
| 79 | T | 1225 | 924 | 42 | 555 | 3.4 | 53 | EXAMPLE |
| 80 | T | 1205 | 915 | 16 | <u>712</u> | 7.0 | 36 | COMPARATIVE EXAMPLE |

TABLE 4

| EXPERIMENTAL EXAMPLE | STEEL COMPONENT | HOT ROLLING STEP | | | | | COLD ROLLING | NOTE |
|---|---|---|---|---|---|---|---|---|
| | | SLAB HEATING TEMPERATURE °C. | ROLLING COMPLETION TEMPERATURE °C. | AVERAGE COOLING RATE °C./SECOND | COOLING STOP TEMPERATURE °C. | ELAPSED TIME UNTIL 400°C. TIME | STEP REDUCTION RATIO % | |
| 81 | U | 1265 | 875 | 42 | 579 | 5.3 | 52 | EXAMPLE |
| 82 | U | 1235 | 898 | 35 | 540 | 4.4 | 68 | EXAMPLE |
| 83 | U | 1215 | 897 | 39 | 600 | 8.6 | 41 | EXAMPLE |
| 84 | U | 1245 | 894 | 42 | 598 | 4.3 | 34 | COMPARATIVE EXAMPLE |
| 85 | V | 1265 | 899 | 31 | 558 | 3.7 | 33 | EXAMPLE |

TABLE 4-continued

| | | HOT ROLLING STEP | | | | | COLD ROLLING | |
|---|---|---|---|---|---|---|---|---|
| EXPERIMENTAL EXAMPLE | STEEL COMPONENT | SLAB HEATING TEMPER- ATURE ° C. | ROLLING COMPLETION TEMPER- ATURE ° C. | AVERAGE COOLING RATE ° C./ SECOND | COOLING STOP TEMPER- ATURE ° C. | ELAPSED TIME UNTIL 400° C. TIME | STEP REDUC- TION RATIO % | NOTE |
| 86 | V | 1220 | 910 | 52 | 540 | 5.2 | 55 | EXAMPLE |
| 87 | V | 1265 | 863 | 32 | 561 | 7.2 | 50 | EXAMPLE |
| 88 | V | 1240 | 892 | 43 | 563 | 3.3 | 53 | COMPARATIVE EXAMPLE |
| 89 | W | 1225 | 894 | 31 | 626 | 5.5 | 46 | EXAMPLE |
| 90 | W | 1240 | 901 | 30 | 568 | 3.7 | 62 | EXAMPLE |
| 91 | W | 1220 | 915 | 48 | 539 | 3.3 | 40 | EXAMPLE |
| 92 | W | 1235 | 883 | 41 | 574 | 6.7 | 53 | COMPARATIVE EXAMPLE |
| 93 | X | 1195 | 922 | 31 | 623 | 5.5 | 50 | EXAMPLE |
| 94 | X | 1265 | 905 | 35 | 595 | 6.3 | 61 | EXAMPLE |
| 95 | X | 1230 | 920 | 45 | 524 | 2.5 | 35 | EXAMPLE |
| 96 | X | 1210 | 912 | 40 | 573 | 3.8 | 50 | COMPARATIVE EXAMPLE |
| 97 | Y | 1230 | 893 | 46 | 583 | 4.2 | 46 | EXAMPLE |
| 98 | Y | 1275 | 943 | 48 | 558 | 3.6 | 52 | EXAMPLE |
| 99 | Y | 1275 | 906 | 37 | 595 | 5.0 | 36 | EXAMPLE |
| 100 | Y | 1220 | 915 | 25 | 604 | 11.2 | 34 | COMPARATIVE EXAMPLE |
| 101 | Z | 1230 | 895 | 25 | 595 | 5.7 | 37 | EXAMPLE |
| 102 | Z | 1270 | 923 | 31 | 596 | 7.0 | 41 | EXAMPLE |
| 103 | Z | 1235 | 892 | 24 | 581 | 5.4 | 62 | EXAMPLE |
| 104 | Z | 1205 | 924 | 52 | 578 | 9.7 | 20 | COMPARATIVE EXAMPLE |
| 105 | AA | 1275 | 938 | 30 | 556 | 5.4 | 56 | EXAMPLE |
| 106 | AA | 1270 | 927 | 35 | 554 | 4.7 | 63 | EXAMPLE |
| 107 | AA | 1280 | 879 | 36 | 620 | 4.1 | 41 | EXAMPLE |
| 108 | AA | 1180 | 908 | 41 | 617 | 5.1 | 61 | COMPARATIVE EXAMPLE |
| 109 | AB | 1215 | 887 | 47 | 625 | 9.6 | 40 | EXAMPLE |
| 110 | AB | 1210 | 919 | 54 | 572 | 6.3 | 46 | EXAMPLE |
| 111 | AB | 1235 | 886 | 39 | 593 | 9.4 | 40 | EXAMPLE |
| 112 | AB | 1260 | 923 | 31 | 525 | 0.8 | 35 | COMPARATIVE EXAMPLE |
| 113 | AC | 1245 | 911 | 38 | 594 | 4.8 | 50 | EXAMPLE |
| 114 | AC | 1260 | 873 | 23 | 571 | 8.2 | 62 | EXAMPLE |
| 115 | AC | 1210 | 896 | 53 | 584 | 5.9 | 54 | EXAMPLE |
| 116 | AC | 1260 | 917 | 31 | 574 | 5.2 | 82 | COMPARATIVE EXAMPLE |
| 117 | AD | 1205 | 907 | 33 | 603 | 6.0 | 61 | EXAMPLE |
| 118 | AD | 1240 | 884 | 39 | 580 | 7.3 | 53 | EXAMPLE |
| 119 | AD | 1260 | 915 | 38 | 592 | 5.9 | 52 | EXAMPLE |
| 120 | AD | 1225 | 880 | 23 | 607 | 6.8 | 42 | COMPARATIVE EXAMPLE |
| 121 | AE | 1230 | 905 | 38 | 606 | 5.5 | 55 | COMPARATIVE EXAMPLE |
| 122 | AF | 1225 | 896 | 39 | 605 | 7.8 | 55 | COMPARATIVE EXAMPLE |
| 123 | AG | 1230 | 906 | 41 | 600 | 6.6 | 55 | COMPARATIVE EXAMPLE |
| 124 | A | 1195 | 901 | 22 | 599 | 8.3 | 53 | COMPARATIVE EXAMPLE |
| 125 | AH | 1220 | 920 | 20 | 609 | 6.3 | — | COMPARATIVE EXAMPLE |
| 126 | AI | 1240 | 916 | 39 | 596 | 7.7 | 73 | COMPARATIVE EXAMPLE |
| 127 | AJ | EXPERIMENT STOPPED DUE TO SLAB CRACK | | | | | | COMPARATIVE EXAMPLE |
| 128 | AK | 1225 | 906 | 20 | 619 | 4.1 | 53 | COMPARATIVE EXAMPLE |

TABLE 5

| | | | ANNEALING STEP-PLATING STEP ||||
| | | | HEATING STEP || FIRST COOLING STEP ||
| EXPERIMENTAL EXAMPLE | STEEL COMPONENT | STEEL TYPE | HEATING RATE AT 600 TO 750°C. °C./SECOND | HEATING TEMPERATURE °C. | COOLING RATE AT 750 TO 650°C. °C./SECOND | COOLING RATE FROM 650°C. °C./SECOND |
|---|---|---|---|---|---|---|
| 1 | A | GI | 4.7 | 827 | 1.5 | 6.2 |
| 2 | A | GA | 7.9 | 815 | 12.8 | 106.7 |
| 3 | A | GA | 1.5 | 830 | 6.2 | 14.8 |
| 4 | A | GI | 6. | 805 | 24.5 | 4.2 |
| 5 | B | GI | 3.5 | 828 | 2.8 | 59.9 |
| 6 | B | GA | 3.2 | 799 | 11.0 | 4.0 |
| 7 | B | GA | 1.1 | 785 | 6.7 | 4.0 |
| 8 | B | GI | 8.6 | 768 | 6.5 | 5.2 |
| 9 | C | GI | 4.7 | 847 | 1.7 | 3.8 |
| 10 | C | GA | 7.3 | 862 | 1.9 | 6.0 |
| 11 | C | GA | 13.4 | 853 | 2.1 | 22.2 |
| 12 | C | GI | 4.2 | 830 | 2.8 | 4.9 |
| 13 | D | GI | 3.6 | 780 | 3.0 | 4.8 |
| 14 | D | GA | 5.3 | 813 | 5.7 | 3.8 |
| 15 | D | GA | 8.1 | 781 | 3.8 | 74.7 |
| 16 | D | GI | 1.7 | 764 | 7.2 | 6.7 |
| 17 | E | GA | 8.9 | 810 | 4.6 | 4.2 |
| 18 | E | GI | 1.1 | 827 | 2.1 | 96.0 |
| 19 | E | GA | 3.1 | 793 | 3.8 | 4.7 |
| 20 | E | GI | 9.5 | 792 | 9.1 | 3.8 |
| 21 | F | GA | 3.9 | 874 | 2.8 | 5.4 |
| 22 | F | GI | 4.1 | 804 | 3.4 | 70.2 |
| 23 | F | GA | 0.7 | 830 | 5.8 | 7.4 |
| 24 | F | GI | 28.1 | 805 | 9.2 | 7.5 |
| 25 | G | GI | 6.0 | 799 | 3.7 | 5.6 |
| 26 | G | GI | 4.6 | 756 | 5.4 | 50.3 |
| 27 | G | GA | 0.8 | 800 | 2.4 | 7.2 |
| 28 | G | GI | 1.9 | 779 | 5.5 | 4.0 |
| 29 | H | GA | 7.4 | 844 | 2.4 | 5.6 |
| 30 | H | GI | 5.3 | 846 | 6.8 | 6.7 |
| 31 | H | GA | 7.7 | 834 | 5.7 | 19.5 |
| 32 | H | GI | 10.0 | 837 | 9.3 | 6.0 |
| 33 | I | GI | 9.6 | 879 | 2.1 | 38.4 |
| 34 | I | GA | 3.8 | 966 | 1.7 | 55.0 |
| 35 | I | GA | 8.6 | 821 | 7.2 | 5.5 |
| 36 | I | GI | 8.8 | 734 | 4.0 | 6.5 |
| 37 | J | GI | 4.3 | 798 | 8.0 | 6.3 |
| 38 | J | GA | 2.0 | 812 | 2.1 | 7.0 |
| 39 | J | GA | 3.8 | 829 | 6.3 | 60.5 |
| 40 | J | GI | 8.5 | 775 | 5.3 | 5.7 |

| | ANNEALING STEP-PLATING STEP |||||
| | BAINITE TRANSFORMATION PROCESS |||||
| EXPERIMENTAL EXAMPLE | RETENTION TIME AT 300 TO 470°C. SECOND | LOAD STRESS MPa | BENDING RADIUS mm | NUMBER OF TIMES OF PROCESSING TIMES | PRE-HEATING ZONE AIR RATIO | REDUCTION ZONE P(H$_2$O)/ P(H$_2$) |
|---|---|---|---|---|---|---|
| 1 | 56 | 8 | 200 | 4 | 0.033 | 1.0 |
| 2 | 44 | 6 | 200 | 4 | 0.035 | 0.9 |
| 3 | 143 | 24 | 200 | 4 | 0.033 | 1.0 |
| 4 | 75 | 8 | 200 | 4 | 0.087 | 1.0 |
| 5 | 56 | 9 | 450 | 3 | 0.014 | 1.2 |
| 6 | 98 | 44 | 450 | 3 | 0.010 | 0.9 |
| 7 | 48 | 18 | 450 | 3 | 0.891 | 1.1 |
| 8 | 1376 | 8 | 450 | 3 | 0.035 | 1.0 |
| 9 | 77 | 23 | 450 | 3 | 0.056 | 0.9 |
| 10 | 780 | 25 | 450 | 3 | 0.030 | 1.0 |
| 11 | 80 | 6 | 450 | 3 | 0.123 | 0.9 |
| 12 | 81 | 10 | 450 | 3 | 0.0000 | 1.0 |
| 13 | 58 | 25 | 200 | 2 | 0.054 | 1.1 |
| 14 | 71 | 9 | 200 | 2 | 0.004 | 1.0 |
| 15 | 114 | 10 | 200 | 2 | 0.144 | 1.1 |
| 16 | 80 | 25 | 200 | 2 | 0.134 | 0.8 |
| 17 | 58 | 16 | 500 | 2 | 0.020 | 1.1 |
| 18 | 80 | 10 | 200 | 8 | 0.141 | 0.9 |

TABLE 5-continued

| | | | | | | |
|---|---|---|---|---|---|---|
| 19 | 58 | 14 | 500 | 2 | 0.057 | 0.8 |
| 20 | 74 | 16 | 500 | 2 | 0.194 | 0.9 |
| 21 | 61 | 19 | 450 | 2 | 0.074 | 0.8 |
| 22 | 70 | 9 | 450 | 2 | 0.125 | 1.1 |
| 23 | 227 | 4 | 450 | 2 | 0.091 | 0.9 |
| 24 | 82 | 20 | 450 | 2 | 0.043 | 0.9 |
| 25 | 72 | 20 | 450 | 3 | 0.070 | 1.0 |
| 26 | 228 | 14 | 450 | 3 | 1.30 | 0.7 |
| 27 | 52 | 13 | 700 | 3 | 0.029 | 1.1 |
| 28 | 63 | 18 | 450 | 3 | 0.251 | 0.4 |
| 29 | 68 | 9 | 450 | 2 | 0.194 | 0.8 |
| 30 | 268 | 24 | 85 | 2 | 0.208 | 1.1 |
| 31 | 96 | 16 | 450 | 2 | 0.041 | 0.8 |
| 32 | 55 | 11 | 450 | 2 | 0.039 | 0.9 |
| 33 | 62 | 11 | 450 | 3 | 0.162 | 1.0 |
| 34 | 36 | 42 | 450 | 3 | 0.318 | 1.2 |
| 35 | 55 | 8 | 450 | 3 | 0.016 | 0.8 |
| 36 | 81 | 21 | 450 | 3 | 0.218 | 1.1 |
| 37 | 72 | 13 | 450 | 3 | 0.070 | 0.8 |
| 38 | 83 | 13 | 450 | 3 | 0.213 | 1.1 |
| 39 | 668 | 7 | 450 | 3 | 0.537 | 1.0 |
| 40 | 77 | 24 | 450 | 3 | 0.052 | 1.1 |

| | ANNEALING STEP-PLATING STEP | | | | |
|---|---|---|---|---|---|
| | PLATING ZONE | | | ALLOYING FURNACE | |
| EXPERIMENTAL EXAMPLE | EFFECTIVE Al AMOUNT MASS % | PLATING BATH TEMPERATURE °C. | ENTERING TEMPERATURE OF STEEL SHEET °C. | ALLOYING TEMPERATURE °C. | TREATMENT TIME SECOND |
| 1 | 0.08 | 458 | 468 | — | — |
| 2 | 0.11 | 457 | 453 | 492 | 19 |
| 3 | 0.09 | 469 | 454 | 486 | 11 |
| 4 | 0.11 | 461 | 459 | — | — |
| 5 | 0.09 | 466 | 474 | — | — |
| 6 | 0.08 | 462 | 464 | 533 | 24 |
| 7 | 0.10 | 468 | 465 | 494 | 30 |
| 8 | 0.09 | 454 | 447 | — | — |
| 9 | 0.14 | 462 | 458 | — | — |
| 10 | 0.10 | 453 | 481 | 507 | 12 |
| 11 | 0.10 | 461 | 456 | 522 | 8 |
| 12 | 0.08 | 461 | 448 | — | — |
| 13 | 0.11 | 459 | 451 | — | — |
| 14 | 0.08 | 467 | 454 | 503 | 13 |
| 15 | 0.07 | 459 | 467 | 497 | 46 |
| 16 | 0.10 | 467 | 470 | — | — |
| 17 | 0.11 | 464 | 455 | 548 | 16 |
| 18 | 0.10 | 456 | 450 | — | — |
| 19 | 0.08 | 460 | 458 | 529 | 7 |
| 20 | 0.09 | 468 | 439 | — | — |
| 21 | 0.10 | 485 | 477 | 506 | 24 |
| 22 | 0.08 | 468 | 456 | — | — |
| 23 | 0.10 | 463 | 472 | 519 | 12 |
| 24 | 0.08 | 464 | 482 | — | — |
| 25 | 0.09 | 455 | 454 | — | — |
| 26 | 0.08 | 451 | 453 | — | — |
| 27 | 0.08 | 454 | 446 | 555 | 14 |
| 28 | 0.11 | 468 | 481 | — | — |
| 29 | 0.08 | 458 | 467 | 509 | 15 |
| 30 | 0.10 | 453 | 455 | — | — |
| 31 | 0.10 | 467 | 460 | 494 | 98 |
| 32 | 0.08 | 465 | 457 | — | — |
| 33 | 0.10 | 454 | 459 | — | — |
| 34 | 0.11 | 466 | 471 | 491 | 17 |
| 35 | 0.12 | 465 | 473 | 481 | 30 |
| 36 | 0.10 | 464 | 458 | — | — |
| 37 | 0.09 | 462 | 479 | — | — |
| 38 | 0.08 | 453 | 472 | 593 | 4 |
| 39 | 0.09 | 460 | 458 | 531 | 19 |
| 40 | 0.24 | 463 | 460 | — | — |

TABLE 5-continued

| | COOLING-TEMPERING-CORRECTIVE ROLLING | | | |
|---|---|---|---|---|
| EXPERIMENTAL EXAMPLE | SECOND COOLING STEP COOLING RATE °C./SECOND | TEMPERING STEP TEMPERING TEMPERATURE °C. | COLD ROLLING REDUCTION RATIO % | NOTE |
| 1 | 2.8 | — | — | EXAMPLE |
| 2 | 1.6 | — | — | EXAMPLE |
| 3 | 4.6 | — | — | EXAMPLE |
| 4 | 5.2 | — | — | Comp. EX. |
| 5 | 2.3 | — | — | EXAMPLE |
| 6 | 4.5 | — | — | EXAMPLE |
| 7 | 1.8 | 350 | — | EXAMPLE |
| 8 | 3.3 | — | — | Comp. EX. |
| 9 | 5.1 | — | — | EXAMPLE |
| 10 | 2.1 | — | 0.45 | EXAMPLE |
| 11 | 2.9 | — | — | EXAMPLE |
| 12 | 2.8 | — | — | Comp. EX. |
| 13 | 3.0 | — | — | EXAMPLE |
| 14 | 4.7 | — | — | EXAMPLE |
| 15 | 2.0 | — | 1.10 | EXAMPLE |
| 16 | 3.1 | — | — | Comp. EX. |
| 17 | 4.0 | — | — | EXAMPLE |
| 18 | 0.8 | — | — | EXAMPLE |
| 19 | 3.1 | — | — | EXAMPLE |
| 20 | 3.0 | — | — | Comp. EX. |
| 21 | 5.1 | — | — | EXAMPLE |
| 22 | 1.4 | — | — | EXAMPLE |
| 23 | 4.3 | — | — | EXAMPLE |
| 24 | 1.4 | — | — | Comp. EX. |
| 25 | 3.0 | — | — | EXAMPLE |
| 26 | 4.4 | 380 | — | EXAMPLE |
| 27 | 3.5 | — | — | EXAMPLE |
| 28 | 2.8 | — | — | Comp. EX. |
| 29 | 3.7 | — | — | EXAMPLE |
| 30 | 1.4 | — | — | EXAMPLE |
| 31 | 2.4 | — | — | EXAMPLE |
| 32 | 3.5 | 410 | 0.15 | EXAMPLE |
| 33 | 2.4 | — | — | EXAMPLE |
| 34 | 1.8 | — | — | EXAMPLE |
| 35 | 1.1 | — | — | EXAMPLE |
| 36 | 3.3 | — | — | Comp. EX. |
| 37 | 2.3 | — | — | EXAMPLE |
| 38 | 5.2 | — | — | EXAMPLE |
| 39 | 4.5 | — | — | EXAMPLE |
| 40 | 1.9 | — | — | Comp. EX. |

TABLE 6

| | | | ANNEALING STEP-PLATING STEP | | | |
|---|---|---|---|---|---|---|
| | | | HEATING STEP | | FIRST COOLING STEP | |
| EXPERIMENTAL EXAMPLE | STEEL COMPONENT | STEEL TYPE | HEATING RATE AT 600 TO 750°C. °C./SECOND | HEATING TEMPERATURE °C. | COOLING RATE AT 750 TO 650°C. °C./SECOND | COOLING RATE FROM 650°C. °C./SECOND |
| 41 | K | GI | 10.8 | 769 | 5.4 | 7.5 |
| 42 | K | GI | 4.4 | 792 | 6.4 | 64.5 |
| 43 | K | GA | 3.5 | 784 | 1.3 | 5.8 |
| 44 | K | GI | 1.1 | 801 | 8.9 | 4.0 |
| 45 | L | GI | 2.6 | 86 | 2.4 | 64.7 |
| 46 | L | GI | 9.2 | 822 | 7.9 | 4.0 |
| 47 | L | GA | 5.5 | 820 | 3.1 | 7.5 |
| 48 | L | GA | 3.3 | 795 | 2.8 | 6.1 |
| 49 | M | GI | 1.6 | 831 | 2.1 | 5.8 |
| 50 | M | GI | 6.5 | 924 | 2.2 | 43.7 |
| 51 | M | GA | 16.4 | 945 | 9.2 | 6.2 |
| 52 | M | GI | 2.6 | 930 | 0.3 | 6.5 |
| 53 | N | GI | 3.9 | 926 | 4.8 | 6.8 |
| 54 | N | GI | 4.3 | 833 | 2.6 | 21.7 |
| 55 | N | GA | 5.7 | 800 | 7.1 | 3.8 |

TABLE 6-continued

| | | | | | | |
|---|---|---|---|---|---|---|
| 56 | N | GA | 8.3 | 813 | 5.4 | 6.9 |
| 57 | O | GI | 1.3 | 832 | 1.7 | 5.8 |
| 58 | O | GA | 2.6 | 886 | 5.6 | 4.8 |
| 59 | O | GA | 7.3 | 765 | 11.4 | 7.1 |
| 60 | O | GI | 3.7 | 826 | 6.5 | 5.4 |
| 61 | P | GA | 4.1 | 768 | 6.0 | 6.2 |
| 62 | P | GI | 4.3 | 822 | 3.5 | 34.9 |
| 63 | P | GA | 11.1 | 868 | 1.4 | 7.3 |
| 64 | P | GI | 8.4 | 794 | 8.5 | 5.8 |
| 65 | Q | GA | 2.4 | 801 | 6.0 | 7.4 |
| 66 | Q | GI | 7.0 | 776 | 1.8 | 42.6 |
| 67 | Q | GA | 10.3 | 829 | 10.9 | 25.4 |
| 68 | Q | GI | 5.0 | 774 | 9.4 | 6.1 |
| 69 | R | GI | 5.2 | 8121 | 2.5 | 20.5 |
| 70 | R | GA | 8.6 | 845 | 1.6 | 4.7 |
| 71 | R | GA | 5.8 | 810 | 6.3 | 48.6 |
| 72 | R | GA | 7.3 | 781 | 10.2 | 6.6 |
| 73 | S | GA | 1.5 | 773 | 2.9 | 6.0 |
| 74 | S | GI | 2.6 | 774 | 1.1 | 72.3 |
| 75 | S | GA | 0.7 | 754 | 2.0 | 7.1 |
| 76 | S | GI | 5.6 | 777 | 5.6 | 6.2 |
| 77 | T | GI | 3.6 | 769 | 10.0 | 6.0 |
| 78 | T | GI | 11.0 | 764 | 3.6 | 5.5 |
| 79 | T | GA | 4.4 | 773 | 3.0 | 21.2 |
| 80 | T | GI | 9.1 | 804 | 4.2 | 6.1 |

| | ANNEALING STEP-PLATING STEP | | | | | |
|---|---|---|---|---|---|---|
| | BAINITE TRANSFORMATION PROCESS | | | | | |
| EXPERIMENTAL EXAMPLE | RETENTION TIME AT 300 TO 470°C. SECOND | LOAD STRESS MPa | BENDING RADIUS mm | NUMBER OF TIMES OF PROCESSING TIMES | PRE-HEATING ZONE AIR RATIO | REDUCTION ZONE $P(H_2O)/P(H_2)$ |
| 41 | 63 | 14 | 200 | 5 | 0.052 | 1.1 |
| 42 | 108 | 35 | 200 | 5 | 0.114 | 1.0 |
| 43 | 75 | 8 | 200 | 5 | 0.144 | 1.0 |
| 44 | 68 | 22 | 200 | 5 | 0.052 | 0.9 |
| 45 | 59 | 23 | 200 | 2 | 0.0004 | 1.0 |
| 46 | 113 | 22 | 200 | 2 | 0.038 | 0.9 |
| 47 | 192 | 17 | 200 | 2 | 0.039 | 1.0 |
| 48 | 60 | 13 | 200 | 2 | 0.154 | 1.1 |
| 49 | 67 | 20 | 500 | 3 | 0.229 | 0.9 |
| 50 | 250 | 60 | 500 | 3 | 0.034 | 0.7 |
| 51 | 56 | 19 | 500 | 3 | 0.023 | 1.1 |
| 52 | 65 | 12 | 500 | 3 | 0.029 | 1.0 |
| 53 | 62 | 10 | 300 | 2 | 0.033 | 0.9 |
| 54 | 73 | 22 | 300 | 2 | 0.288 | 0.9 |
| 55 | 133 | 6 | 300 | 2 | 0.154 | 1.2 |
| 56 | 74 | 13 | 300 | 2 | 0.024 | 0.9 |
| 57 | 81 | 13 | 500 | 3 | 0.043 | 0.8 |
| 58 | 195 | 19 | 500 | 1 | 0.083 | 1.1 |
| 59 | 105 | 18 | 500 | 3 | 0.038 | 1.0 |
| 60 | 79 | 10 | 500 | 3 | 0.251 | 0.8 |
| 61 | 77 | 12 | 450 | 2 | 0.024 | 0.8 |
| 62 | 183 | 11 | 700 | 2 | 0.244 | 0.9 |
| 63 | 70 | 23 | 450 | 2 | 0.072 | 0.8 |
| 64 | 74 | 11 | 450 | 2 | 0.218 | 0.9 |
| 65 | 59 | 17 | 200 | 2 | 0.005 | 0.8 |
| 66 | 223 | 76 | 200 | 2 | 0.044 | 1.1 |
| 67 | 345 | 10 | 200 | 2 | 0.046 | 1.0 |
| 68 | 76 | 19 | 200 | 2 | 2.41 | 0.9 |
| 69 | 57 | 11 | 200 | 2 | 0.144 | 1.1 |
| 70 | 59 | 14 | 200 | 2 | 0.190 | 1.1 |
| 71 | 407 | 8 | 200 | 2 | 0.053 | 0.7 |
| 72 | 78 | 23 | 200 | 2 | 0.194 | 1.0 |
| 73 | 82 | 20 | 35 | 3 | 0.251 | 1.1 |
| 74 | 310 | 19 | 350 | 3 | 0.154 | 1.0 |
| 75 | 58 | 20 | 350 | 3 | 0.154 | 0.9 |
| 76 | 77 | 14 | — | 0 | 0.074 | 1.1 |
| 77 | 78 | 17 | 500 | 2 | 0.141 | 0.7 |
| 78 | 78 | 26 | 700 | 2 | 0.058 | 0.9 |
| 79 | 146 | 10 | 500 | 2 | 0.134 | 0.9 |
| 80 | 64 | 23 | 500 | 2 | 0.141 | 1.0 |

TABLE 6-continued

| | ANNEALING STEP-PLATING STEP | | | | |
|---|---|---|---|---|---|
| | PLATING ZONE | | | | |
| | | | ENTERING TEMPERATURE OF | ALLOYING FURNACE | |
| | EFFECTIVE Al | PLATING BATH | STEEL | ALLOYING | TREATMENT |
| EXPERIMENTAL EXAMPLE | AMOUNT MASS % | TEMPERATURE °C. | SHEET °C. | TEMPERATURE °C. | TIME SECOND |
| 41 | 0.08 | 456 | 450 | — | — |
| 42 | 0.11 | 459 | 443 | — | — |
| 43 | 0.08 | 461 | 469 | 496 | 23 |
| 44 | 0.10 | 457 | 468 | — | — |
| 45 | 0.10 | 465 | 472 | — | — |
| 46 | 0.09 | 453 | 461 | — | — |
| 47 | 0.11 | 462 | 457 | 537 | 17 |
| 48 | 0.10 | 457 | 461 | 519 | 340 |
| 49 | 0.07 | 466 | 448 | — | — |
| 50 | 0.08 | 467 | 481 | — | — |
| 51 | 0.08 | 463 | 456 | 560 | 10 |
| 52 | 0.09 | 467 | 457 | — | — |
| 53 | 0.09 | 455 | 472 | — | — |
| 54 | 0.10 | 458 | 487 | — | — |
| 55 | 0.11 | 468 | 467 | 519 | 12 |
| 56 | 0.09 | 466 | 459 | 492 | 1 |
| 57 | 0.08 | 459 | 471 | — | — |
| 58 | 0.10 | 456 | 460 | 603 | 5 |
| 59 | 0.11 | 467 | 456 | 555 | 18 |
| 60 | 0.11 | 460 | 459 | — | — |
| 61 | 0.10 | 455 | 465 | 574 | 10 |
| 62 | 0.10 | 467 | 462 | — | — |
| 63 | 0.10 | 467 | 469 | 549 | 23 |
| 64 | 0.09 | 467 | 466 | — | — |
| 65 | 0.13 | 462 | 478 | 549 | 10 |
| 66 | 0.09 | 452 | 471 | — | — |
| 67 | 0.08 | 464 | 470 | 492 | 28 |
| 68 | 0.11 | 453 | 447 | — | — |
| 69 | 0.11 | 467 | 478 | — | — |
| 70 | 0.08 | 462 | 465 | 472 | 102 |
| 71 | 0.12 | 461 | 456 | 493 | 39 |
| 72 | 0.10 | 462 | 452 | 645 | 13 |
| 73 | 0.10 | 453 | 462 | 507 | 12 |
| 74 | 0.09 | 455 | 475 | — | — |
| 75 | 0.09 | 453 | 453 | 511 | 17 |
| 76 | 0.10 | 457 | 469 | — | — |
| 77 | 0.10 | 461 | 469 | — | — |
| 78 | 0.09 | 468 | 482 | — | — |
| 79 | 0.10 | 467 | 462 | 506 | 15 |
| 80 | 0.11 | 458 | 483 | — | — |

| | COOLING-TEMPERING-CORRECTIVE ROLLING | | | |
|---|---|---|---|---|
| EXPERIMENTAL EXAMPLE | SECOND COOLING STEP COOLING RATE °C./SECOND | TEMPERING STEP TEMPERING TEMPERATURE °C. | COLD ROLLING REDUCTION RATIO % | NOTE |
| 41 | 4.7 | — | — | EXAMPLE |
| 42 | 4.2 | — | — | EXAMPLE |
| 43 | 1.5 | — | — | EXAMPLE |
| 44 | 3.6 | — | — | Comp. EX. |
| 45 | 1.3 | — | — | EXAMPLE |
| 46 | 4.5 | — | 1.00 | EXAMPLE |
| 47 | 1.9 | — | — | EXAMPLE |
| 48 | 4.4 | — | — | Comp. EX. |
| 49 | 2.2 | — | — | EXAMPLE |
| 50 | 4.8 | — | — | EXAMPLE |
| 51 | 5.2 | — | — | EXAMPLE |
| 52 | 3.7 | — | — | Comp. EX. |
| 53 | 3.1 | — | — | EXAMPLE |
| 54 | 8.6 | — | — | EXAMPLE |
| 55 | 4.6 | — | — | EXAMPLE |
| 56 | 2.8 | — | — | Comp. EX. |
| 57 | 1.9 | — | — | EXAMPLE |
| 58 | 2.3 | — | — | EXAMPLE |

TABLE 6-continued

| | | | | |
|---|---|---|---|---|
| 59 | 4.2 | — | — | EXAMPLE |
| 60 | 0.1 | — | — | Comp. EX. |
| 61 | 3.4 | — | — | EXAMPLE |
| 62 | 3.0 | — | — | EXAMPLE |
| 63 | 2.2 | — | — | EXAMPLE |
| 64 | 4.6 | — | — | Comp. EX. |
| 65 | 5.0 | — | — | EXAMPLE |
| 66 | 1.5 | — | — | EXAMPLE |
| 67 | 4.0 | — | — | EXAMPLE |
| 68 | 2.8 | — | — | Comp. EX. |
| 69 | 2.4 | — | — | EXAMPLE |
| 70 | 1.8 | — | — | EXAMPLE |
| 71 | 3.6 | — | — | EXAMPLE |
| 72 | 2.9 | — | — | Comp. EX. |
| 73 | 3.0 | — | — | EXAMPLE |
| 74 | 4.3 | — | — | EXAMPLE |
| 75 | 2.0 | 270 | — | EXAMPLE |
| 76 | 4.1 | — | — | Comp. EX. |
| 77 | 4.3 | — | — | EXAMPLE |
| 78 | 0.9 | — | — | EXAMPLE |
| 79 | 2.7 | — | — | EXAMPLE |
| 80 | 2.0 | — | — | Comp. EX. |

TABLE 7

| EXPERIMENTAL EXAMPLE | STEEL COMPONENT | STEEL TYPE | ANNEALING STEP-PLATING STEP ||||
|---|---|---|---|---|---|---|
| | | | HEATING STEP || FIRST COOLING STEP ||
| | | | HEATING RATE AT 600 TO 750°C. °C./SECOND | HEATING TEMPERATURE °C. | COOLING RATE AT 750 TO 650°C. °C./SECOND | COOLING RATE FROM 650°C. °C./SECOND |
| 81 | U | GI | 2.2 | 772 | 10.5 | 4.7 |
| 82 | U | GI | 1.2 | 763 | 4.1 | 117.5 |
| 83 | U | GA | 6.5 | 794 | 6.2 | 6.2 |
| 84 | U | GI | 1.3 | 816 | 7.3 | 4.1 |
| 85 | V | GI | 10.4 | 801 | 6.9 | 6.9 |
| 86 | V | GI | 3.4 | 826 | 1.4 | 5.4 |
| 87 | V | GA | 1.6 | 881 | 1.5 | 3.8 |
| 88 | V | GI | 7.8 | 781 | 2.9 | 4.6 |
| 89 | W | GI | 6.2 | 811 | 3.4 | 3.8 |
| 90 | W | GA | 10.9 | 848 | 6.1 | 7.2 |
| 91 | W | GA | 9.7 | 794 | 4.2 | 5.6 |
| 92 | W | GA | 1.4 | 815 | 8.1 | 4.9 |
| 93 | X | GI | 6.0 | 827 | 10.1 | 14.8 |
| 94 | X | GA | 6.6 | 824 | 2.4 | 5.6 |
| 95 | X | GI | 1.5 | 791 | 6.7 | 5.4 |
| 96 | X | GA | 4.5 | 811 | 11.0 | 4.4 |
| 97 | X | GI | 10.3 | 835 | 6.0 | 72.0 |
| 98 | Y | GI | 6.5 | 905 | 4.7 | 4.2 |
| 99 | Y | GA | 7.2 | 766 | 6.7 | 54.2 |
| 100 | Y | GI | 5.8 | 794 | 3.2 | 4.5 |
| 101 | Z | GI | 6.9 | 801 | 1.7 | 5.2 |
| 102 | Z | GI | 2.6 | 813 | 6.6 | 4.2 |
| 103 | Z | GA | 2.7 | 829 | 3.5 | 23.8 |
| 104 | AA | GI | 6.9 | 784 | 8.9 | 4.7 |
| 105 | AA | GI | 9.6 | 855 | 2.2 | 6.6 |
| 106 | AA | GI | 6.5 | 870 | 6.6 | 4.2 |
| 107 | AA | GA | 6.8 | 833 | 3.6 | 6.9 |
| 108 | AA | GI | 9.9 | 834 | 7.0 | 1.4 |
| 109 | AB | GI | 0.9 | 827 | 3.2 | 4.8 |
| 110 | AB | GI | 8.3 | 711 | 2.1 | 19.5 |
| 111 | AB | GA | 2.7 | 792 | 2.0 | 22.4 |
| 112 | AB | GI | 9.9 | 832 | 9.2 | 5.9 |
| 113 | AC | GI | 4.7 | 770 | 1.9 | 4.7 |
| 114 | AC | GA | 7.3 | 797 | 8.2 | 44.3 |
| 115 | AC | GA | 5.9 | 777 | 5.1 | 7.5 |
| 116 | AC | — | EXPERIMENT STOPPED DUE TO FRACTURE OF STEEL SHEET IN COLD ROLLING ||||
| 117 | AD | GA | 5.4 | 828 | 9.3 | 59.6 |
| 118 | AD | GI | 0.9 | 782 | 2.2 | 5.5 |
| 119 | AD | GA | 2.7 | 788 | 1.6 | 20.9 |
| 120 | AD | GI | 3.0 | 798 | 7.2 | 6.2 |

TABLE 7-continued

| EXPERIMENTAL EXAMPLE | ANNEALING STEP-PLATING STEP | | | | | |
|---|---|---|---|---|---|---|
| | BAINITE TRANSFORMATION PROCESS | | | NUMBER OF TIMES OF PROCESSING TIMES | PRE-HEATING ZONE AIR RATIO | REDUCTION ZONE $P(H_2O)/P(H_2)$ |
| | RETENTION TIME AT 300 TO 470°C. SECOND | LOAD STRESS MPa | BENDING RADIUS mm | | | |
| 81 | 69 | 21 | 450 | 4 | 0.001 | 1.1 |
| 82 | 47 | 8 | 450 | 4 | 0.128 | 0.8 |
| 83 | 87 | 33 | 450 | 4 | 0.616 | 1.2 |
| 84 | 58 | 23 | 450 | 4 | 0.070 | 1.8 |
| 85 | 64 | 17 | 450 | 3 | 0.114 | 0.8 |
| 86 | 70 | 16 | 450 | 3 | 0.040 | 0.9 |
| 87 | 44 | 19 | 450 | 3 | 0.077 | 0.8 |
| 88 | 60 | 14 | 1200 | 3 | 0.097 | 0.9 |
| 89 | 75 | 16 | 450 | 3 | 0.151 | 0.9 |
| 90 | 43 | 8 | 85 | 2 | 0.158 | 1.0 |
| 91 | 306 | 17 | 450 | 2 | 0.120 | 1.0 |
| 92 | 1138 | 16 | 450 | 2 | 0.074 | 0.8 |
| 93 | 54 | 19 | 450 | 3 | 0.057 | 0.9 |
| 94 | 288 | 14 | 450 | 1 | 1.02 | 1.1 |
| 95 | 70 | 10 | 450 | 3 | 0.117 | 1.0 |
| 96 | 11 | 11 | 450 | 3 | 0.158 | 1.1 |
| 97 | 76 | 21 | 450 | 2 | 0.233 | 0.9 |
| 98 | 48 | 21 | 150 | 2 | 0.030 | 1.1 |
| 99 | 69 | 13 | 450 | 2 | 0.131 | 0.9 |
| 100 | 58 | 0 | 450 | 3 | 0.074 | 0.9 |
| 101 | 79 | 7 | 450 | 3 | 0.097 | 1.0 |
| 102 | 93 | 17 | 450 | 3 | 0.026 | 0.9 |
| 103 | 164 | 25 | 85 | 3 | 0.002 | 1.2 |
| 104 | 64 | 12 | 450 | 3 | 0.023 | 0.8 |
| 105 | 89 | 16 | 250 | 3 | 0.204 | 0.8 |
| 106 | 62 | 13 | 250 | 3 | 0.109 | 0.9 |
| 107 | 47 | 13 | 250 | 2 | 0.089 | 1.1 |
| 108 | 76 | 17 | 250 | 2 | 0.107 | 0.9 |
| 109 | 61 | 14 | 250 | 2 | 0.022 | 0.9 |
| 110 | 170 | 4 | 250 | 1 | 0.190 | 0.9 |
| 111 | 40 | 20 | 250 | 2 | 0.006 | 0.9 |
| 112 | 67 | 14 | 250 | 2 | 0.030 | 0.8 |
| 113 | 71 | 18 | 500 | 2 | 0.177 | 0.9 |
| 114 | 118 | 10 | 500 | 2 | 0.436 | 0.8 |
| 115 | 70 | 11 | 500 | 2 | 0.058 | 1.0 |
| 116 | EXPERIMENT STOPPED DUE TO FRACTURE OF STEEL SHEET IN COLD ROLLING | | | | | |
| 117 | 59 | 15 | 450 | 4 | 0.026 | 0.8 |
| 118 | 43 | 10 | 450 | 4 | 0.112 | 0.7 |
| 119 | 136 | 15 | 450 | 4 | 0.025 | 0.8 |
| 120 | 66 | 25 | 450 | 4 | 0.056 | 1.0 |

TABLE 7-continued

| | | ANNEALING STEP-PLATING STEP | | | |
|---|---|---|---|---|---|
| | | PLATING ZONE | | ALLOYING FURNACE | |
| EXPERIMENTAL EXAMPLE | EFFECTIVE Al AMOUNT MASS % | PLATING BATH TEMPERATURE °C | ENTERING TEMPERATURE OF STEEL SHEET °C | ALLOYING TEMPERATURE °C | TREATMENT TIME SECOND |
| 81 | 0.11 | 458 | 435 | — | — |
| 82 | 0.11 | 461 | 461 | — | — |
| 83 | 0.09 | 464 | 462 | 510 | 17 |
| 84 | 0.10 | 466 | 470 | — | — |
| 85 | 0.11 | 461 | 456 | — | — |
| 86 | 0.08 | 455 | 479 | — | — |
| 87 | 0.09 | 458 | 448 | 493 | 27 |
| 88 | 0.09 | 461 | 461 | — | — |
| 89 | 0.08 | 455 | 463 | — | — |
| 90 | 0.04 | 452 | 432 | 546 | 9 |
| 91 | 0.08 | 458 | 453 | 530 | 32 |
| 92 | 0.08 | 464 | 448 | 588 | 4 |
| 93 | 0.08 | 468 | 460 | — | — |
| 94 | 0.10 | 453 | 462 | — | — |
| 95 | 0.09 | 469 | 443 | 501 | 8 |
| 96 | 0.10 | 462 | 449 | — | — |
| 97 | 0.09 | 462 | 476 | — | — |
| 98 | 0.06 | 459 | 452 | — | — |
| 99 | 0.09 | 463 | 451 | 505 | 10 |
| 100 | 0.11 | 465 | 457 | — | — |
| 101 | 0.09 | 462 | 465 | — | — |
| 102 | 0.17 | 460 | 455 | — | — |
| 103 | 0.08 | 460 | 443 | 497 | 24 |
| 104 | 0.11 | 459 | 474 | — | — |
| 105 | 0.09 | 468 | 473 | — | — |
| 106 | 0.07 | 455 | 455 | — | — |
| 107 | 0.11 | 466 | 460 | 597 | 40 |
| 108 | 0.08 | 458 | 478 | — | — |
| 109 | 0.10 | 460 | 451 | — | — |
| 110 | 0.08 | 458 | 459 | — | — |
| 111 | 0.07 | 458 | 451 | 505 | 18 |
| 112 | 0.08 | 462 | 460 | — | — |
| 113 | 0.11 | 468 | 482 | — | — |
| 114 | 0.11 | 455 | 459 | 512 | 23 |
| 115 | 0.11 | 453 | 447 | 493 | 12 |
| 116 | | EXPERIMENT STOPPED DUE TO FRACTURE OF STEEL SHEET IN COLD ROLLING | | | |
| 117 | 0.13 | 464 | 474 | 504 | 16 |
| 118 | 0.08 | 465 | 477 | — | — |
| 119 | 0.10 | 455 | 450 | 500 | 16 |
| 120 | 0.00 | 465 | 474 | — | — |

TABLE 7-continued

| EXPERIMENTAL EXAMPLE | SECOND COOLING STEP COOLING RATE °C./SECOND | TEMPERING STEP TEMPERING TEMPERATURE °C. | COLD ROLLING REDUCTION RATIO % | NOTE |
|---|---|---|---|---|
| 81 | 2.0 | — | — | EXAMPLE |
| 82 | 4.8 | — | — | EXAMPLE |
| 83 | 2.1 | — | — | EXAMPLE |
| 84 | 3.9 | — | — | Comp. EX. |
| 85 | 4.2 | — | — | EXAMPLE |
| 86 | 2.7 | 450 | — | EXAMPLE |
| 87 | 5.0 | — | — | EXAMPLE |
| 88 | 5.0 | — | — | Comp. EX. |
| 89 | 2.4 | — | — | EXAMPLE |
| 90 | 3.3 | — | — | EXAMPLE |
| 91 | 1.9 | — | — | EXAMPLE |
| 92 | 1.5 | — | — | Comp. EX. |
| 93 | 1.3 | — | — | EXAMPLE |
| 94 | 5.0 | — | — | EXAMPLE |
| 95 | 3.3 | — | — | EXAMPLE |
| 96 | 1.7 | — | — | Comp. EX. |
| 97 | 4.3 | — | — | EXAMPLE |
| 98 | 5.2 | — | — | EXAMPLE |
| 99 | 2.4 | — | — | EXAMPLE |
| 100 | 2.8 | — | — | Comp. EX. |
| 101 | 4.3 | — | — | EXAMPLE |
| 102 | 10.3 | — | 0.33 | EXAMPLE |
| 103 | 2.1 | — | — | EXAMPLE |
| 104 | 4.1 | — | — | Comp. EX. |
| 105 | 3.0 | — | — | EXAMPLE |
| 106 | 1.9 | — | — | EXAMPLE |
| 107 | 1.6 | — | — | EXAMPLE |
| 108 | 4.0 | — | — | Comp. EX. |
| 109 | 3.5 | — | — | EXAMPLE |
| 110 | 2.3 | — | — | EXAMPLE |
| 111 | 1.0 | — | — | EXAMPLE |
| 112 | 2.5 | — | — | Comp. EX. |
| 113 | 3.1 | — | — | EXAMPLE |
| 114 | 2.5 | — | — | EXAMPLE |
| 115 | 5.1 | — | — | EXAMPLE |
| 116 | EXPERIMENT STOPPED DUE TO FRACTURE OF STEEL SHEET IN COLD ROLLING | | | Comp. EX. |
| 117 | 4.6 | — | — | EXAMPLE |
| 118 | 2.5 | — | — | EXAMPLE |
| 119 | 4.0 | — | 0.14 | EXAMPLE |
| 120 | 2.2 | — | — | Comp. EX. |

TABLE 8

| EXPERIMENTAL EXAMPLE | STEEL COMPONENT | STEEL TYPE | ANNEALING STEP-PLATING STEP ||||||
|---|---|---|---|---|---|---|---|---|
| | | | HEATING STEP || FIRST COOLING STEP || BAINITE TRANSFORMATION PROCESS | |
| | | | HEATING RATE AT 800 TO 750° C. ° C./ SECOND | HEATING TEMPERATURE ° C. | COOLING RATE AT 750 TO 650° C. ° C./ SECOND | COOLING RATE FROM 650° C. ° C./ SECOND | RETENTION TIME AT 300 TO 470° C. SECOND | LOAD STRESS MPa |
| 121 | AE | GI | 3.2 | 787 | 3.7 | 7.0 | 74 | 13 |
| 122 | AF | GI | 3.2 | 771 | 3.5 | 6.9 | 70 | 17 |
| 123 | AG | GI | 3.4 | 768 | 3.8 | 6.8 | 68 | 15 |
| 124 | A | GA | 3.0 | 807 | 1.7 | 29.0 | 119 | 145 |
| 125 | AH | — | EXPERIMENT STOPPED DUE TO FRACTURE IN COLD ROLLING |||||  |
| 126 | AI | GA | 3.4 | 810 | 2.0 | 23.0 | 70 | 25 |
| 127 | AJ | — | EXPERIMENT STOPPED DUE TO SLAB CRACK |||||  |
| 128 | AX | — | EXPERIMENT STOPPED DUE TO WELD ZONE FRACTURE IN CONTINUOUS ANNEALING STEP |||||  |

| EXPERIMENTAL EXAMPLE | ANNEALING STEP-PLATING STEP |||||||
|---|---|---|---|---|---|---|---|
| | BAINITE TRANSFORMATION PROCESS | | PLATING ZONE |||| |
| | BENDING RADIUS mm | NUMBER OF TIMES OF PROCESSING TIMES | PREHEATING ZONE AIR RATIO | REDUCTION ZONE P(H$_2$O)/P(H$_2$) | EFFECTIVE Al AMOUNT MASS % | PLATING BATH TEMPERATURE ° C. | ENTERING TEMPERATURE OF STEEL SHEET ° C. |
| 121 | 450 | 3 | 1.1 | 0.061 | 0.09 | 465 | 454 |
| 122 | 450 | 3 | 1.0 | 0.023 | 0.10 | 457 | 457 |
| 123 | 450 | 3 | 1.0 | 0.069 | 0.08 | 467 | 467 |
| 124 | 300 | 4 | 0.9 | 0.055 | 0.10 | 482 | 456 |
| 125 | EXPERIMENT STOPPED DUE TO FRACTURE IN COLD ROLLING |||||| |
| 126 | 300 | 4 | 1.1 | 0.048 | 0.09 | 462 | 456 |
| 127 | EXPERIMENT STOPPED DUE TO SLAB CRACK |||||| |
| 128 | EXPERIMENT STOPPED DUE TO WELD ZONE FRACTURE IN CONTINUOUS ANNEALING STEP |||||| |

| EXPERIMENTAL EXAMPLE | ANNEALING STEP-PLATING STEP || COOLING-TEMPERING-CORRECTIVE ROLLING |||| NOTE |
|---|---|---|---|---|---|---|---|
| | ALLOYING FURNACE || SECOND COOLING STEP COOLING | TEMPERING STEP | COLD ROLLING | | |
| | ALLOYING TEMPERATURE ° C. | TREATMENT TIME SECOND | RATE ° C./ SECOND | TEMPERING TEMPERATURE ° C. | REDUCTION RATIO % | | |
| 121 | — | — | 2.6 | — | — | Comp. EX |
| 122 | — | — | 2.6 | — | — | Comp. EX |
| 123 | — | — | 2.9 | — | — | Comp. EX |
| 124 | 514 | 20 | 3.5 | — | — | Comp. EX |
| 125 | EXPERIMENT STOPPED DUE TO FRACTURE IN COLD ROLLING ||||| Comp. EX |
| 126 | 507 | 18 | 2.3 | — | — | Comp. EX |
| 127 | EXPERIMENT STOPPED DUE TO SLAB CRACK ||||| Comp. EX |
| 128 | EXPERIMENT STOPPED DUE TO WELD ZONE FRACTURE IN CONTINUOUS ANNEALING STEP ||||| Comp. EX |

[Evaluation Test]

Regarding the steel sheets of the experimental examples produced by the above method, an evaluation test as follows was performed, and results are presented in Tables 9 to 13 below.

[Steel Sheet Structure]

First, a structural observation of the steel sheets of the experimental examples was performed using a scanning electron microscope (SEM), structural fractions of the steel sheets and average distances and average grain diameters among grains of a retained austenite phase were measured, which are described in Table 9 to 13 below. Here, identification of ferrite, martensite, perlite, cementite, bainite, austenite, and a balance structure and observation of existing position and measurement of area fraction were such that with a nital reagent and a reagent disclosed in Japanese Laid-open Patent Publication No. 59-219473, a steel sheet rolling direction cross section or a rolling direction orthogonal direction cross section was corroded, and a ¼ thickness position of a sheet thickness was observed in magnifications of 1000 to 10000.

Next, the number of crystal grains of the retained austenite phase was measured using a high-resolution crystal orientation analysis by EBSD (Electron Back-Scattering Diffraction) method from the results of the above-described structural observation. Then, the average distance among crystal grains of the retained austenite phase was measured in the range of 10000 μm$^2$ or more by setting {average distance L between grains=([observation area]/[number of crystal grains])$^{1/2}$}. Further, the average grain diameter of the retained austenite phase was measured by obtaining an area of each crystal grain among randomly chosen 30 to 300 retained austenite crystal grains, and obtaining a grain diameter as a circle-equivalent diameter.

Further, the solid solution carbon amount in the retained austenite phase was obtained by performing an X-ray diffraction test under the same conditions as the above-described measurement of the area fraction of the retained austenite phase so as to obtain a lattice constant a of the retained austenite phase, and using the above-described equation (1).

[Thickness of a Decarburized Layer in a Steel Sheet Surface Layer Portion and an Average Density and Average Grain Diameter of Oxides]

Regarding the thickness of a decarburized layer in a steel sheet surface layer portion, a thicknesswise cross section in parallel with the rolling direction of each steel sheet was mirror finished and observed using the FE-SEM, decarburized layer thicknesses of three or more positions were measured in one steel sheet, and the average value thereof was taken as the thickness of the decarburized layer.

Further, regarding the oxides in the steel sheet surface layer portion, first, similarly to the above, a thicknesswise cross section in parallel with the rolling direction was mirror finished and observed using the FE-SEM, and thereafter, the density of the oxides was measured by observing the decarburized layer by an amount of 7 μm$^2$ and counting the number of oxides. Results are presented in Tables 9 to 13 below. Further, regarding the size of the oxides, circle-equivalent diameters of randomly chosen 100 to 1000 oxide grains were averaged, and this was taken as the average grain diameter.

"Appearance Inspection"

Regarding the steel sheets produced in the above-described procedure, an inspection of their appearances was conducted. At that time, regarding appearances of steel sheet surfaces, a visual judgment was visually made on the status of occurrence of unplating, and results are presented with "○" and "X" in Tables 9 to 13. Note that "X" presented in Tables 9 to 13 below denotes a steel sheet on which unplating of a diameter of 0.5 mm or more was observed and which deviates from a tolerance range of appearance, and "○" denotes other steel sheets having an appearance that is practically tolerable.

"Plating Peeling Test"

Regarding the steel sheets produced in the above procedure, a plating peeling test was performed according to the "Method of bend test for metallic materials" described in JIS Z 2248 for evaluating plating adhesiveness during processing in which a compressive stress is applied to a steel sheet. Specifically, as disclosed in the document "Hot-dip galvanized steel sheet manual, pp. 53-55", after a 60° V-bend test was performed using each steel sheet, a tape was put on the inside of a bent portion, and this tape was peeled off. Then, from the status of peeling of the plating layer peeled off with the tape, plating adhesiveness was evaluated, and results are presented in Tables 9 to 13 below. Note that "PRESENT" presented in Tables 9 to 13 below denotes steel sheet with a peeling width of 7.0 mm or more which is practically intolerable, and "-" denotes other steel sheets having adhesiveness that is practically tolerable. Here, "Cellotape" (registered trademark) made by Nichiban was used as the tape.

"Mechanical Cutting Property (Limit Number of Times of Punching)"

The steel sheet of each experimental example was cold rolled, annealed, and plated so that a thickness thereof is 1.2 mm to process a steel sheet having a sheet thickness of 1.2 mm, thereafter punching was performed continuously under the conditions of a die having a hole diameter of 10.3 mmφ, a punch material SKD11, a punch diameter of 10 mmφ (clearance 12.5%), and a burr height was measured at every 50 times. At this time, the punch hole was divided into four at positions of 0°, 90°, 180°, 270°, and the test is finished at a point when the burr height in any one direction exceeds 3.0 times of the initial value, and the number of times of punching at this point is defined as a limit number of times of punching. Note that in this example, in order to obtain various cold rolling ratios without changing the sheet thickness of product steel sheets, product steel sheets were produced while variously changing the thickness of the hot rolled steel sheets.

[Tensile Property]

From the steel sheet of each experimental example, a test piece No. 5 described in JIS Z 2201 was processed, tensile strength (MPa) and total elongation (%) were measured according to the test method described in JIS Z 2241, and further yield strength (MPa) was measured along a test method described in JIS G 0202.

Further, regarding the n value (work hardening coefficient), from test results of tensile strength, a nominal stress at a point where a nominal strain is 3% to 7% was read, the nominal stress and the nominal strain were converted into a true stress and a true strain, respectively, and the n value is obtained according to an equation $\{n=\log(\sigma_{7\%}/\sigma_{4\%})/\log(\epsilon_{7\%}/\epsilon_{4\%})\}$. However, regarding a steel sheet having an even elongation less than 7%, it was obtained according to the above equation from two points, the point of the nominal strain 3% and the point where a tensile stress is maximum.

Results of the above evaluation tests are presented in Tables 9 to 13 below.

TABLE 9

| EXPERIMENTAL EXAMPLE | STEEL COMPONENT | STEEL TYPE | STEEL SHEET STRUCTURE | | | | | | |
|---|---|---|---|---|---|---|---|---|---|
| | | | STRUCTURAL FRACTION | | | | | | |
| | | | FERRITE % | BAINITE % | BAINITIC FERRITE % | MARTENSITE % | TEMPERED MARTENSITE % | RETAINED AUSTENITE % | OTHERS % |
| 1 | A | GI | 75 | 3 | 9 | 5 | 0 | 8 | 0 |
| 2 | A | GA | 58 | 2 | 14 | 16 | 2 | 7 | 1 |
| 3 | A | GA | 57 | 2 | 28 | 5 | 0 | 7 | 1 |
| 4 | A | GI | 23 | 0 | 33 | 36 | 0 | 5 | 3 |
| 5 | B | GI | 48 | 4 | 27 | 6 | 0 | 13 | 2 |
| 6 | B | GA | 49 | 0 | 35 | 4 | 1 | 11 | 0 |
| 7 | B | GA | 41 | 2 | 30 | 10 | 5 | 11 | 1 |
| 8 | B | GI | 44 | 8 | 37 | 2 | 0 | 9 | 0 |
| 9 | C | GI | 60 | 4 | 21 | 4 | 0 | 11 | 0 |
| 10 | C | GA | 49 | 3 | 30 | 3 | 0 | 13 | 2 |
| 11 | C | GA | 50 | 2 | 30 | 8 | 0 | 10 | 0 |
| 12 | C | GI | 54 | 4 | 27 | 4 | 0 | 11 | 0 |
| 13 | D | GI | 46 | 5 | 30 | 4 | 0 | 13 | 2 |
| 14 | D | GA | 48 | 3 | 26 | 5 | 0 | 17 | 1 |
| 15 | D | GI | 46 | 13 | 28 | 4 | 0 | 9 | 0 |
| 16 | D | GI | 42 | 1 | 26 | 8 | 4 | 14 | 3 |
| 17 | E | GA | 65 | 8 | 18 | 2 | 0 | 7 | 0 |
| 18 | E | GI | 78 | 0 | 9 | 4 | 0 | 9 | 0 |
| 19 | E | GA | 69 | 8 | 17 | 2 | 0 | 4 | 1 |
| 20 | E | GI | 66 | 0 | 22 | 5 | 0 | 6 | 0 |
| 21 | F | GA | 73 | 2 | 13 | 4 | 0 | 8 | 0 |
| 22 | F | GI | 74 | 0 | 15 | 3 | 0 | 8 | 0 |
| 23 | F | GA | 81 | 0 | 14 | 0 | 0 | 5 | 0 |
| 24 | F | GI | 66 | 1 | 22 | 4 | 0 | 7 | 0 |
| 25 | G | GI | 47 | 7 | 23 | 8 | 0 | 15 | 0 |
| 26 | G | GI | 44 | 7 | 28 | 0 | 8 | 13 | 0 |
| 27 | G | GA | 48 | 21 | 17 | 3 | 0 | 11 | 0 |
| 28 | G | GI | 44 | 7 | 25 | 10 | 0 | 13 | 1 |
| 29 | H | GA | 64 | 11 | 12 | 8 | 0 | 5 | 1 |
| 30 | H | GI | 67 | 5 | 18 | 3 | 1 | 5 | 1 |

| EXPERIMENTAL EXAMPLE | STEEL SHEET STRUCTURE | | | STEEL SHEET SURFACE LAYER PORTION | | | APPEARANCE INSPECTION |
|---|---|---|---|---|---|---|---|
| | RETAINED AUSTENITE | | | | | | |
| | SOLID SOLUTION CARBON AMOUNT MASS % | AVERAGE INTERGRAIN DISTANCE μm | AVERAGE GRAIN DIAMETER μm | DECARBURIZED LAYER THICKNESS μm | OXIDE DENSITY OXDES/m² $^{2NM}$ | OXIDE AVERAGE GRAIN DIAMETER nm | |
| 1 | 0.90 | 2.2 | 0.7 | 1.05 | 1.6E+13 | 75 | ○ |
| 2 | 0.85 | 3.0 | 0.9 | 0.93 | 2.6E+13 | 68 | ○ |

TABLE 9-continued

| EXPERIMENTAL EXAMPLE | | | | | | | |
|---|---|---|---|---|---|---|---|
| 3 | 0.94 | 4.0 | 1.2 | 1.31 | 2.4E+13 | 64 | ○ |
| 4 | 0.92 | 3.3 | 0.8 | 2.80 | 3.7E+13 | 65 | ○ |
| 5 | 0.85 | 3.7 | 1.5 | 0.28 | 7.3E+12 | 69 | ○ |
| 6 | 0.90 | 2.0 | 0.8 | 0.59 | 1.9E+13 | 72 | ○ |
| 7 | 0.91 | 2.2 | 0.8 | 6.94 | 1.7E+13 | 92 | ○ |
| 8 | 1.16 | 2.7 | 0.9 | 1.52 | 8.7E+12 | 82 | ○ |
| 9 | 0.93 | 3.9 | 1.5 | 1.75 | 4.0E+13 | 49 | ○ |
| 10 | 0.95 | 1.5 | 0.6 | 0.95 | 3.0E+13 | 71 | ○ |
| 11 | 0.93 | 1.3 | 0.5 | 2.60 | 6.2E+13 | 42 | ○ |
| 12 | 0.90 | 2.1 | 0.8 | 0.00 | 4.3E+11 | 152 | × |
| 13 | 0.79 | 1.8 | 0.7 | 1.42 | 6.3E+12 | 76 | ○ |
| 14 | 0.81 | 3.3 | 1.5 | 1.03 | 9.6E+12 | 51 | ○ |
| 15 | 0.81 | 1.7 | 0.6 | 2.41 | 1.4E+13 | 81 | ○ |
| 16 | 0.88 | 2.2 | 0.9 | 2.91 | 1.3E+13 | 75 | ○ |
| 17 | 0.86 | 1.7 | 0.5 | 1.05 | 6.6E+13 | 58 | ○ |
| 18 | 0.90 | 3.1 | 1.1 | 3.13 | 8.3E+13 | 47 | ○ |
| 19 | 0.89 | 3.5 | 0.8 | 2.41 | 5.1E+13 | 56 | ○ |
| 20 | 0.81 | 9.6 | 2.6 | 2.12 | 2.6E+13 | 87 | ○ |
| 21 | 0.84 | 1.9 | 0.6 | 2.07 | 2.3E+13 | 50 | ○ |
| 22 | 0.83 | 2.8 | 0.9 | 1.91 | 2.4E+13 | 96 | ○ |
| 23 | 0.89 | 2.0 | 0.5 | 2.05 | 2.1E+13 | 74 | ○ |
| 24 | 0.81 | 12.9 | 3.7 | 2.21 | 1.7E+13 | 72 | ○ |
| 25 | 0.84 | 2.4 | 1.1 | 1.29 | 1.9E+13 | 96 | ○ |
| 26 | 0.80 | 1.4 | 0.6 | 5.11 | 1.8E+13 | 89 | ○ |
| 27 | 0.86 | 2.7 | 1.0 | 1.94 | 1.2E+13 | 94 | ○ |
| 28 | 0.94 | 1.5 | 0.6 | 0.05 | 6.1E+11 | 137 | ○ |
| 29 | 0.80 | 2.7 | 0.7 | 3.36 | 9.3E+12 | 82 | ○ |
| 30 | 0.82 | 4.3 | 1.1 | 1.90 | 8.7E+12 | 78 | ○ |

| | PROPERTY | | | | | | |
|---|---|---|---|---|---|---|---|
| | TENSILE PROPERTY | | | | | | |
| EXPERIMENTAL EXAMPLE | YIELD STESS MPa | TENSILE STRENGTH MPa | TOTAL ELONGATION % | n VALUE | PLATING PEELING TEST | LIMIT NUMBER OF TIMES OF PUNCHING TIMES | NOTE |
| 1 | 348 | 934 | 24 | 0.165 | — | 950 | EXAMPLE |
| 2 | 654 | 1179 | 17 | 0.103 | — | 900 | EXAMPLE |
| 3 | 611 | 1162 | 17 | 0.113 | — | 950 | EXAMPLE |
| 4 | 1063 | 1361 | 13 | 0.059 | — | 1100 | Comp. EX. |
| 5 | 655 | 1087 | 20 | 0.123 | — | 850 | EXAMPLE |
| 6 | 665 | 1141 | 18 | 0.113 | — | 900 | EXAMPLE |
| 7 | 854 | 1239 | 16 | 0.102 | — | 1150 | EXAMPLE |
| 8 | 743 | 1134 | 18 | 0.110 | — | 400 | Comp. EX. |
| 9 | 645 | 1198 | 17 | 0.127 | — | 1050 | EXAMPLE |
| 10 | 875 | 1285 | 15 | 0.104 | — | 950 | EXAMPLE |
| 11 | 873 | 1437 | 13 | 0.087 | — | 800 | EXAMPLE |
| 12 | 754 | 1353 | 14 | 0.086 | — | 300 | Comp. EX. |
| 13 | 774 | 1233 | 16 | 0.099 | — | 900 | EXAMPLE |
| 14 | 849 | 1428 | 13 | 0.097 | — | 850 | EXAMPLE |

TABLE 9-continued

| | | | | | |
|---|---|---|---|---|---|
| 15 | 919 | 1317 | 14 | 0.093 | 950 EXAMPLE |
| 16 | 976 | 1455 | 13 | 0.076 | 950 Comp. EX. |
| 17 | 434 | 958 | 23 | 0.163 | 1050 EXAMPLE |
| 18 | 334 | 910 | 25 | 0.196 | 1350 EXAMPLE |
| 19 | 419 | 925 | 24 | 0.163 | 1150 EXAMPLE |
| 20 | 485 | 1027 | 21 | 0.155 | 600 Comp. EX. |
| 21 | 574 | 942 | 24 | 0.177 | 1100 EXAMPLE |
| 22 | 542 | 936 | 24 | 0.170 | 1000 EXAMPLE |
| 23 | 510 | 911 | 24 | 0.177 | 1050 EXAMPLE |
| 24 | 598 | 952 | 23 | 0.145 | 600 Comp. EX. |
| 25 | 813 | 1164 | 18 | 0.126 | 900 EXAMPLE |
| 26 | 897 | 1151 | 18 | 0.107 | 1100 EXAMPLE |
| 27 | 818 | 1166 | 18 | 0.155 | 900 EXAMPLE |
| 28 | 952 | 1332 | 15 | 0.092 | 350 Comp. EX. |
| 29 | 510 | 1047 | 20 | 0.130 | 1000 EXAMPLE |
| 30 | 517 | 1067 | 19 | 0.133 | 950 EXAMPLE |

TABLE 10

| EXPERIMENTAL EXAMPLE | STEEL COMPONENT | STEEL TYPE | STEEL SHEET STRUCTURE | | | | | | |
|---|---|---|---|---|---|---|---|---|---|
| | | | STRUCTURAL FRACTION | | | | | | |
| | | | FERRITE % | BAINITE % | BAINITIC FERRITE % | MARTENSITE % | TEMPERED MARTENSITE % | RETAINED AUSTENITE % | OTHERS % |
| 31 | H | GA | 58 | 4 | 27 | 7 | 0 | 4 | 0 |
| 32 | H | GI | 56 | 6 | 20 | 0 | 10 | 6 | 2 |
| 33 | I | GI | 60 | 9 | 13 | 8 | 0 | 9 | 1 |
| 34 | I | GA | 55 | 3 | 15 | 15 | 2 | 10 | 0 |
| 35 | I | GA | 63 | 0 | 21 | 7 | 0 | 8 | 1 |
| 36 | I | GI | 91 | 0 | 0 | 0 | 0 | 3 | 6 |
| 37 | J | GI | 49 | 7 | 19 | 14 | 0 | 10 | 1 |
| 38 | J | GA | 55 | 19 | 20 | 0 | 2 | 4 | 0 |
| 39 | J | GI | 44 | 11 | 33 | 0 | 0 | 9 | 2 |
| 40 | J | GI | 53 | 8 | 21 | 7 | 0 | 11 | 0 |
| 41 | K | GI | 55 | 2 | 21 | 11 | 0 | 10 | 1 |
| 42 | K | GI | 55 | 6 | 19 | 6 | 0 | 11 | 3 |
| 43 | K | GA | 65 | 6 | 11 | 10 | 0 | 8 | 0 |
| 44 | K | GI | 53 | 4 | 23 | 11 | 3 | 9 | 0 |
| 45 | L | GI | 62 | 0 | 15 | 9 | 0 | 11 | 0 |
| 46 | L | GI | 51 | 6 | 25 | 5 | 0 | 13 | 0 |
| 47 | L | GA | 57 | 12 | 19 | 4 | 0 | 8 | 0 |
| 48 | L | GI | 57 | 7 | 14 | 10 | 0 | 11 | 1 |
| 49 | M | GI | 62 | 0 | 22 | 5 | 0 | 9 | 2 |
| 50 | M | GI | 53 | 5 | 31 | 0 | 3 | 8 | 0 |
| 51 | M | GA | 54 | 20 | 14 | 6 | 0 | 6 | 0 |
| 52 | M | GI | 58 | 26 | 16 | 0 | 0 | 0 | 0 |
| 53 | N | GI | 70 | 0 | 16 | 7 | 0 | 7 | 0 |
| 54 | N | GI | 76 | 2 | 9 | 6 | 0 | 7 | 0 |
| 55 | N | GA | 67 | 4 | 20 | 3 | 0 | 5 | 1 |
| 56 | N | GA | 65 | 3 | 19 | 7 | 0 | 6 | 0 |
| 57 | O | GI | 61 | 8 | 20 | 4 | 0 | 7 | 0 |
| 58 | O | GA | 60 | 23 | 5 | 2 | 0 | 6 | 4 |
| 59 | O | GA | 49 | 14 | 18 | 13 | 0 | 5 | 1 |
| 60 | O | GI | 47 | 18 | 23 | 1 | 0 | 1 | 10 |

| EXPERIMENTAL EXAMPLE | STEEL SHEET STRUCTURE | | | STEEL SHEET SURFACE LAYER PORTION | | | APPEARANCE INSPECTION |
|---|---|---|---|---|---|---|---|
| | RETAINED AUSTENITE | | | | | | |
| | SOLID SOLUTION CARBON AMOUNT MASS % | AVERAGE INTERGRAIN DISTANCE μm | AVERAGE GRAIN DIAMETER μm | DECARBURIZED LAYER THICKNESS μm | OXIDE DENSITY OXDES/m² $^{2NM}$ | OXIDE AVERAGE GRAIN DIAMETER nm | |
| 31 | 0.82 | 4.0 | 0.9 | 2.39 | 8.6E+12 | 67 | ○ |
| 32 | 0.77 | 4.9 | 1.4 | 1.31 | 4.6E+12 | 75 | ○ |

TABLE 10-continued

| EXPERIMENTAL EXAMPLE | | | | | |
|---|---|---|---|---|---|
| 33 | 0.96 | 1.4 | 2.60 | 4.4E+13 | ○ |
| 34 | 0.86 | 2.7 | 3.14 | 5.5E+13 | ○ |
| 35 | 0.85 | 2.5 | 0.98 | 1.5E+13 | ○ |
| 36 | 0.79 | 4.6 | 2.15 | 1.7E+13 | ○ |
| 37 | 0.89 | 1.6 | 1.90 | 3.3E+13 | ○ |
| 38 | 0.94 | 3.7 | 1.95 | 4.9E+13 | ○ |
| 39 | 0.94 | 4.2 | 4.15 | 6.6E+13 | ○ |
| 40 | 0.80 | 3.7 | 1.63 | 2.9E+13 | ○ |
| 41 | 0.83 | 2.3 | 1.07 | 2.3E+13 | ○ |
| 42 | 0.95 | 3.6 | 1.67 | 6.0E+13 | x |
| 43 | 0.90 | 3.3 | 2.79 | 3.6E+13 | ○ |
| 44 | 0.84 | 9.6 | 1.29 | 4.4E+13 | ○ |
| 45 | 0.90 | 4.6 | 0.12 | 1.4E+13 | ○ |
| 46 | 0.91 | 2.9 | 1.30 | 6.3E+13 | ○ |
| 47 | 0.90 | 4.1 | 1.36 | 2.8E+13 | ○ |
| 48 | 0.90 | 2.0 | 2.08 | 1.6E+14 | ○ |
| 49 | 0.84 | 3.0 | 3.54 | 6.5E+13 | ○ |
| 50 | 0.88 | 4.6 | 1.75 | 3.7E+13 | ○ |
| 51 | 0.91 | 3.9 | 0.68 | 2.2E+13 | ○ |
| 52 | 0.81 | | 1.31 | 3.0E+13 | ○ |
| 53 | 0.82 | 2.7 | 2.07 | 1.0E+13 | ○ |
| 54 | 0.84 | 3.7 | 3.47 | 1.5E+13 | ○ |
| 55 | 0.84 | 1.8 | 1.40 | 1.2E+13 | x |
| 56 | 0.93 | 2.1 | 1.80 | 1.4E+13 | ○ |
| 57 | 0.75 | 2.4 | 1.57 | 3.8E+12 | ○ |
| 58 | 0.81 | 4.0 | 2.00 | 7.2E+12 | ○ |
| 59 | 0.77 | 4.8 | 1.51 | 6.4E+12 | ○ |
| 60 | 0.73 | 8.2 | 3.70 | 5.8E+12 | ○ |

| | PROPERTY | | | | | | |
|---|---|---|---|---|---|---|---|
| | TENSILE PROPERTY | | | | | | |
| EXPERIMENTAL EXAMPLE | YIELD STESS MPa | TENSILE STRENGTH MPa | TOTAL ELONGATION % | n VALUE | PLATING PEELING TEST | LIMIT NUMBER OF TIMES OF PUNCHING TIMES | NOTE |
| 31 | 539 | 1004 | 21 | 0.144 | — | 1000 | EXAMPLE |
| 32 | 803 | 1214 | 16 | 0.113 | — | 850 | EXAMPLE |
| 33 | 678 | 1267 | 15 | 0.112 | — | 1100 | EXAMPLE |
| 34 | 822 | 1444 | 12 | 0.084 | — | 1150 | EXAMPLE |
| 35 | 618 | 1262 | 15 | 0.109 | — | 900 | Comp. EX. |
| 36 | 350 | 712 | 23 | 0.151 | — | 1100 | EXAMPLE |
| 37 | 868 | 1406 | 13 | 0.082 | — | 1050 | EXAMPLE |
| 38 | 570 | 1006 | 21 | 0.142 | — | 1100 | EXAMPLE |
| 39 | 806 | 1231 | 16 | 0.089 | — | 1300 | EXAMPLE |
| 40 | 711 | 1227 | 16 | 0.107 | — | 950 | Comp. EX. |
| 41 | 686 | 1271 | 15 | 0.094 | — | 900 | EXAMPLE |
| 42 | 779 | 1359 | 14 | 0.091 | — | 1100 | EXAMPLE |
| 43 | 673 | 1335 | 14 | 0.099 | — | 1150 | EXAMPLE |
| 44 | 734 | 1274 | 15 | 0.095 | — | 350 | Comp. EX. |

TABLE 10-continued

| | | | | | | |
|---|---|---|---|---|---|---|
| 45 | 735 | 1415 | 13 | 0.087 | — | 800 | EXAMPLE |
| 46 | 894 | 1384 | 14 | 0.089 | — | 1050 | EXAMPLE |
| 47 | 669 | 1207 | 17 | 0.106 | — | 1000 | EXAMPLE |
| 48 | 720 | 1389 | 13 | 0.081 | PRESENT | 1150 | Comp. EX. |
| 49 | 545 | 1065 | 20 | 0.123 | — | 1200 | EXAMPLE |
| 50 | 707 | 1214 | 16 | 0.102 | — | 1050 | EXAMPLE |
| 51 | 669 | 1162 | 17 | 0.106 | — | 900 | EXAMPLE |
| 52 | 427 | 842 | 16 | 0.116 | — | >2000 | Comp. EX. |
| 53 | 482 | 1115 | 18 | 0.133 | — | 950 | EXAMPLE |
| 54 | 343 | 994 | 22 | 0.178 | — | 1100 | EXAMPLE |
| 55 | 468 | 928 | 24 | 0.170 | — | 950 | EXAMPLE |
| 56 | 520 | 1140 | 18 | 0.126 | — | 950 | Comp. EX. |
| 57 | 551 | 1076 | 19 | 0.123 | — | 900 | EXAMPLE |
| 58 | 506 | 1002 | 21 | 0.137 | — | 950 | EXAMPLE |
| 59 | 698 | 1145 | 17 | 0.098 | — | 850 | EXAMPLE |
| 60 | 533 | 885 | 17 | 0.089 | — | 1000 | Comp. EX. |

TABLE 11

| EXPERIMENTAL EXAMPLE | STEEL COMPONENT | STEEL TYPE | STEEL SHEET STRUCTURE STRUCTURAL FRACTION | | | | | | |
|---|---|---|---|---|---|---|---|---|---|
| | | | FERRITE % | BAINITE % | BAINITIC FERRITE % | MARTEN-SITE % | TEMPERED MARTEN-SITE % | RETAINED AUS-TENITE % | OTHERS % |
| 61 | P | GA | 63 | 15 | 10 | 7 | 0 | 4 | 1 |
| 62 | P | GI | 58 | 6 | 24 | 2 | 3 | 7 | 0 |
| 63 | P | GA | 62 | 8 | 13 | 8 | 0 | 6 | 3 |
| 64 | P | GI | 48 | 9 | 23 | 12 | 0 | 8 | 0 |
| 65 | Q | GA | 45 | 33 | 0 | 12 | 0 | 8 | 2 |
| 66 | Q | GI | 53 | 2 | 31 | 1 | 0 | 12 | 1 |
| 67 | Q | GA | 40 | 12 | 33 | 0 | 3 | 12 | 0 |
| 68 | Q | GI | 45 | 9 | 23 | 8 | 0 | 14 | 1 |
| 69 | R | GI | 54 | 2 | 23 | 8 | 0 | 13 | 0 |
| 70 | R | GA | 56 | 6 | 17 | 5 | 0 | 15 | 1 |
| 71 | R | GA | 44 | 7 | 35 | 2 | 0 | 12 | 0 |
| 72 | R | GA | 51 | 18 | 14 | 0 | 0 | <u>1</u> | <u>16</u> |
| 73 | S | GA | 51 | 4 | 27 | 5 | 0 | 12 | 1 |
| 74 | S | GI | 52 | 8 | 30 | 3 | 0 | 9 | 0 |
| 75 | S | GA | 56 | 0 | 19 | 0 | 13 | 11 | 1 |
| 76 | S | GI | 44 | 8 | 23 | 9 | 0 | 14 | 2 |
| 77 | T | GI | 50 | 0 | 29 | 7 | 0 | 12 | 2 |
| 78 | T | GI | 46 | 6 | 27 | 7 | 0 | 13 | 1 |
| 79 | T | GA | 53 | 8 | 19 | 5 | 0 | 14 | 1 |
| 80 | T | GI | 45 | 8 | 24 | 11 | 0 | 12 | 0 |
| 81 | U | GI | 59 | 12 | 13 | 8 | 0 | 8 | 0 |
| 82 | U | GI | 59 | 9 | 11 | 12 | 0 | 7 | 2 |
| 83 | u | GA | 50 | 13 | 25 | 6 | 0 | 8 | 0 |
| 84 | U | GI | 50 | 4 | 22 | 14 | 2 | 8 | 0 |
| 85 | V | GI | 50 | 10 | 20 | 6 | 0 | 14 | 0 |
| 86 | V | GI | 48 | 3 | 18 | 0 | 21 | 10 | 0 |
| 87 | V | GA | 50 | 0 | 23 | 14 | 0 | 12 | 1 |
| 88 | V | GI | 55 | 5 | 17 | 8 | 0 | 15 | 0 |
| 89 | W | GI | 83 | 0 | 7 | 3 | 0 | 7 | 0 |
| 90 | W | GA | 67 | 0 | 16 | 11 | 0 | 5 | 1 |

| EXPERIMENTAL EXAMPLE | STEEL SHEET STRUCTURE RETAINED AUSTENITE | | | STEEL SHEET SURFACE LAYER PORTION | | |
|---|---|---|---|---|---|---|
| | SOLID SOLUTION CARBON AMOUNT MASS % | AVERAGE INTERGRAIN DISTANCE μm | AVERAGE GRAIN DIAMETER μm | DECARBURIZED LAYER THICKNESS μm | OXIDE DENSITY OXIDES/m² | OXIDE AVERAGE GRAIN DIAMETER nm |
| 61 | 0.79 | 3.3 | 0.8 | 0.51 | 1.3E+13 | 70 |
| 62 | 0.86 | 1.9 | 0.8 | 1.67 | 3.8E+13 | 76 |
| 63 | 0.89 | 2.9 | 0.8 | 2.21 | 1.8E+13 | 78 |
| 64 | 0.86 | <u>9.0</u> | <u>2.9</u> | 2.40 | 2.0E+13 | 86 |
| 65 | 0.93 | 2.5 | 0.8 | 0.46 | 1.1E+13 | 62 |
| 66 | 0.98 | 3.8 | 1.5 | 1.81 | 1.1E+13 | 80 |
| 67 | 0.89 | 3.5 | 1.4 | 1.40 | 1.3E+13 | 75 |
| 68 | 0.77 | 2.1 | 0.9 | <u>19.0</u> | 5.1E+13 | 87 |
| 69 | 0.92 | 1.7 | 0.7 | 1.63 | 1.9E+14 | 45 |
| 70 | 0.92 | 2.4 | 1.0 | 3.19 | 4.9E+14 | 37 |
| 71 | 0.99 | 4.4 | 1.7 | 2.40 | 6.0E+14 | 39 |
| 72 | 0.64 | <u>9.4</u> | 1.1 | 2.31 | 1.4E+14 | 33 |
| 73 | 0.83 | 3.5 | 1.4 | 3.36 | 3.2E+13 | 60 |
| 74 | 0.79 | 4.7 | 1.6 | 2.28 | 2.2E+13 | 86 |
| 75 | 0.81 | 2.5 | 0.9 | 2.81 | 1.7E+13 | 68 |
| 76 | 0.81 | <u>8.0</u> | <u>3.3</u> | 2.17 | 2.6E+13 | 62 |
| 77 | 0.93 | 2.0 | 0.8 | 2.19 | 1.9E+13 | 77 |
| 78 | 0.87 | 3.8 | 1.6 | 1.83 | 2.1E+13 | 84 |
| 79 | 0.98 | 2.4 | 1.0 | 3.43 | 3.0E+13 | 71 |
| 80 | 0.84 | <u>6.9</u> | <u>2.7</u> | 2.18 | 3.1E+13 | 100 |
| 81 | 0.81 | 1.9 | 0.6 | 0.14 | 3.1E+12 | 53 |
| 82 | 0.79 | 4.6 | 1.3 | 1.27 | 5.4E+12 | 85 |
| 83 | 0.96 | 2.5 | 0.7 | 2.65 | 1.5E+13 | 89 |
| 84 | 0.88 | 3.5 | 1.1 | <u>11.5</u> | 2.9E+13 | 83 |
| 85 | 0.90 | 3.3 | 1.4 | 2.64 | 1.6E+14 | 75 |
| 86 | 0.89 | 2.0 | 0.7 | 2.82 | 1.5E+14 | 55 |
| 87 | 0.88 | 4.0 | 1.5 | 1.98 | 1.1E+14 | 58 |
| 88 | 0.97 | <u>5.8</u> | <u>2.5</u> | 2.48 | 4.1E+13 | 73 |
| 89 | 0.93 | 3.1 | 0.9 | 2.61 | 9.7E+13 | 63 |
| 90 | 0.89 | 4.1 | 1.0 | 2.29 | 4.4E+13 | 54 |

TABLE 11-continued

| EXPERIMENTAL EXAMPLE | APPEARANCE INSPECTION | PROPERTY | | | | | LIMIT | NOTE |
|---|---|---|---|---|---|---|---|---|
| | | TENSILE PROPERTY | | | | | | |
| | | YIELD STRESS MPa | TENSILE STRENGTH MPa | TOTAL ELONGATION % | n VALUE | PLATING PEELING TEST | NUMBER OF TIMES OF PUNCHING TIMES | |
| 61 | ○ | 565 | 1110 | 18 | 0.118 | — | 850 | EXAMPLE |
| 62 | ○ | 657 | 1146 | 18 | 0.123 | — | 1000 | EXAMPLE |
| 63 | ○ | 514 | 993 | 22 | 0.141 | — | 1000 | EXAMPLE |
| 64 | ○ | 747 | 1226 | 16 | 0.097 | — | 250 | Comp. EX |
| 65 | ○ | 866 | 1384 | 13 | 0.081 | — | 950 | EXAMPLE |
| 66 | ○ | 624 | 1115 | 19 | 0.126 | — | 900 | EXAMPLE |
| 67 | ○ | 820 | 1214 | 17 | 0.104 | — | 900 | EXAMPLE |
| 68 | ○ | 672 | 1151 | 18 | 0.121 | — | 1200 | Comp. EX |
| 69 | ○ | 733 | 1282 | 15 | 0.097 | — | 1300 | EXAMPLE |
| 70 | ○ | 724 | 1301 | 15 | 0.099 | — | 900 | EXAMPLE |
| 71 | ○ | 826 | 1312 | 15 | 0.090 | — | 1200 | EXAMPLE |
| 72 | x | 531 | 860 | 26 | 0.161 | PRESENT | 1450 | Comp. EX |
| 73 | ○ | 846 | 1292 | 15 | 0.098 | — | 1150 | EXAMPLE |
| 74 | ○ | 850 | 1319 | 14 | 0.083 | — | 950 | EXAMPLE |
| 75 | ○ | 1089 | 1409 | 13 | 0.094 | — | 1000 | EXAMPLE |
| 76 | ○ | 957 | 1408 | 13 | 0.091 | — | 500 | Comp. EX |
| 77 | ○ | 717 | 1248 | 16 | 0.107 | — | 1000 | EXAMPLE |
| 78 | ○ | 926 | 1420 | 13 | 0.088 | — | 900 | EXAMPLE |
| 79 | ○ | 787 | 1305 | 15 | 0.108 | — | 1100 | EXAMPLE |
| 80 | ○ | 880 | 1390 | 13 | 0.083 | — | 350 | Comp. EX |
| 81 | ○ | 650 | 1091 | 19 | 0.130 | — | 850 | EXAMPLE |
| 82 | ○ | 760 | 1292 | 14 | 0.082 | — | 850 | EXAMPLE |
| 83 | ○ | 774 | 1163 | 17 | 0.111 | — | 1000 | EXAMPLE |
| 84 | x | 790 | 1192 | 17 | 0.107 | — | 400 | Comp. EX |
| 85 | ○ | 739 | 1263 | 16 | 0.105 | — | 1250 | EXAMPLE |
| 86 | ○ | 978 | 1215 | 16 | 0.109 | — | 1350 | EXAMPLE |
| 87 | ○ | 775 | 1366 | 14 | 0.083 | — | 1150 | EXAMPLE |
| 88 | ○ | 702 | 1270 | 16 | 0.102 | — | 550 | Comp. EX |
| 89 | ○ | 278 | 928 | 24 | 0.186 | — | 1250 | EXAMPLE |
| 90 | ○ | 516 | 1081 | 19 | 0.132 | — | 1150 | EXAMPLE |

TABLE 12

| | | | STEEL SHEET STRUCTURE | | | | | | |
|---|---|---|---|---|---|---|---|---|---|
| | | | STRUCTURAL FRACTION | | | | | | |
| EXPERIMENTAL EXAMPLE | STEEL COMPONENT | STEEL TYPE | FERRITE % | BAINITE % | BAINITIC FERRITE % | MARTENSITE % | TEMPERED MARTENSITE % | RETAINED AUSTENITE % | OTHERS % |
| 91 | W | GA | 62 | 6 | 24 | 0 | 0 | 8 | 0 |
| 92 | W | GA | 64 | 11 | 19 | 0 | 0 | 6 | 0 |
| 93 | X | GI | 49 | 10 | 21 | 7 | 0 | 11 | 2 |
| 94 | X | GI | 54 | 10 | 23 | 0 | 0 | 13 | 0 |
| 95 | X | GA | 54 | 13 | 15 | 6 | 2 | 10 | 0 |
| 96 | X | GI | 50 | 3 | 14 | 25 | 7 | 1 | 0 |
| 97 | Y | GI | 57 | 7 | 25 | 4 | 0 | 7 | 0 |
| 98 | Y | GI | 62 | 0 | 16 | 12 | 2 | 8 | 0 |
| 99 | Y | GA | 66 | 5 | 13 | 7 | 0 | 9 | 0 |
| 100 | Y | GI | 69 | 3 | 10 | 8 | 0 | 8 | 2 |
| 101 | Z | GI | 58 | 3 | 18 | 7 | 0 | 12 | 2 |
| 102 | Z | GI | 46 | 8 | 28 | 4 | 0 | 14 | 0 |
| 103 | Z | GA | 49 | 9 | 23 | 2 | 0 | 16 | 1 |
| 104 | Z | GI | 53 | 5 | 23 | 6 | 0 | 12 | 1 |
| 105 | AA | GI | 66 | 0 | 25 | 2 | 0 | 6 | 1 |
| 106 | AA | GI | 56 | 13 | 18 | 8 | 0 | 4 | 0 |
| 107 | AA | GA | 62 | 4 | 16 | 11 | 0 | 7 | 6 |
| 108 | AA | GI | 64 | 15 | 14 | 1 | 0 | 0 | 0 |
| 109 | AB | GI | 58 | 18 | 7 | 5 | 0 | 12 | 1 |
| 110 | AB | GI | 55 | 3 | 25 | 3 | 0 | 14 | 0 |
| 111 | AB | GA | 64 | 0 | 13 | 13 | 0 | 9 | 0 |
| 112 | AB | GI | 50 | 11 | 17 | 8 | 0 | 13 | 1 |
| 113 | AC | GI | 68 | 5 | 14 | 3 | 0 | 10 | 0 |
| 114 | AC | GA | 49 | 12 | 23 | 1 | 2 | 12 | 1 |
| 115 | AC | GA | 53 | 7 | 25 | 5 | 0 | 9 | 1 |
| 116 | AC | — | EXPERIMENT STOPPED DUE TO FRACTURE OF STEEL SHEET IN COLD ROLLING | | | | | | |
| 117 | AD | GA | 47 | 6 | 15 | 19 | 3 | 8 | 2 |
| 118 | AD | GI | 66 | 0 | 12 | 10 | 0 | 10 | 2 |
| 119 | AD | GA | 63 | 2 | 21 | 6 | 0 | 8 | 0 |
| 120 | AD | GI | 59 | 9 | 13 | 11 | 0 | 9 | 0 |

| | STEEL SHEET STRUCTURE | | | STEEL SHEET SURFACE LAYER PORTION | | | |
|---|---|---|---|---|---|---|---|
| | RETAINED AUSTENITE | | | | | | |
| EXPERIMENTAL EXAMPLE | SOLID SOLUTION CARBON AMOUNT MASS % | AVERAGE INTERGRAIN DISTANCE μm | AVERAGE GRAIN DIAMETER μm | DECARBURIZED LAYER THICKNESS μm | OXIDE DENSITY OXIDES/m$^{2NM}$ | OXIDE AVERAGE GRAIN DIAMETER nm | APPEARANCE INSPECTION |
| 91 | 0.95 | 3.9 | 1.3 | 3.48 | 9.5E+13 | 61 | ○ |
| 92 | 1.09 | 1.4 | 0.4 | 1.80 | 3.5E+13 | 65 | ○ |

TABLE 12-continued

| | | | | | | |
|---|---|---|---|---|---|---|
| 93 | 0.78 | 3.2 | 1.2 | 2.87 | 8.0E+13 | 45 | ○ |
| 94 | 0.94 | 1.6 | 0.7 | 5.08 | 5.2E+13 | 61 | ○ |
| 95 | 0.86 | 3.5 | 1.2 | 2.05 | 3.6E+13 | 51 | ○ |
| 96 | 0.61 | 8.0 | 0.7 | 1.88 | 1.3E+14 | 72 | ○ |
| 97 | 0.90 | 4.5 | 1.3 | 2.97 | 2.0E+13 | 84 | ○ |
| 98 | 0.81 | 3.3 | 1.1 | 1.30 | 1.9E+13 | 44 | ○ |
| 99 | 0.81 | 2.3 | 0.8 | 2.40 | 2.6E+13 | 57 | ○ |
| 100 | 0.92 | 9.0 | 2.9 | 1.83 | 3.1E+13 | 73 | ○ |
| 101 | 0.88 | 2.9 | 1.1 | 1.10 | 2.2E+13 | 80 | ○ |
| 102 | 0.93 | 2.7 | 1.1 | 0.53 | 4.2E+13 | 51 | ○ |
| 103 | 0.92 | 1.2 | 0.6 | 0.06 | 1.8E+13 | 69 | ○ |
| 104 | 0.91 | 6.5 | 2.5 | 1.81 | 5.4E+13 | 40 | ○ |
| 105 | 0.88 | 2.6 | 0.7 | 3.05 | 4.9E+13 | 70 | ○ |
| 106 | 0.81 | 3.9 | 0.9 | 2.07 | 2.2E+13 | 72 | ○ |
| 107 | 0.82 | 4.9 | 1.4 | 1.38 | 3.1E+13 | 88 | ○ |
| 108 | 0.91 | 3.8 | 0.8 | 2.24 | 3.5E+13 | 66 | ○ |
| 109 | 0.94 | 2.0 | 0.8 | 1.54 | 7.4E+13 | 53 | ○ |
| 110 | 0.90 | 2.4 | 1.0 | 2.82 | 8.6E+13 | 55 | ○ |
| 111 | 0.85 | 3.1 | 1.0 | 0.81 | 9.8E+13 | 57 | ○ |
| 112 | 0.93 | 11.8 | 4.9 | 1.43 | 8.0E+13 | 39 | ○ |
| 113 | 0.88 | 1.6 | 0.6 | 2.87 | 3.0E+13 | 83 | ○ |
| 114 | 0.92 | 3.3 | 1.3 | 8.23 | 6.7E+13 | 89 | ○ |
| 115 | 0.84 | 1.3 | 0.4 | 1.58 | 1.6E+13 | 71 | ○ |
| 116 | EXPERIMENT STOPPED DUE TO FRACTURE OF STEEL SHEET IN COLD ROLLING | | | | | | |
| 117 | 0.86 | 1.7 | 0.5 | 1.34 | 7.1E+13 | 38 | ○ |
| 118 | 0.93 | 2.2 | 0.8 | 2.83 | 8.1E+13 | 63 | ○ |
| 119 | 0.90 | 3.3 | 1.1 | 1.87 | 7.3E+13 | 55 | ○ |
| 120 | 0.82 | 2.8 | 1.0 | 1.41 | 1.1E+14 | 55 | ○ |

| EXPERIMENTAL EXAMPLE | PROPERTY | | | | | | |
|---|---|---|---|---|---|---|---|
| | TENSILE PROPERTY | | | | PLATING PEELING TEST | LIMIT NUMBER OF TIMES OF PUNCHING TIMES | NOTE |
| | YIELD STESS MPa | TENSILE STRENGTH MPa | TOTAL ELONGATION % | n VALUE | | | |
| 91 | 511 | 987 | 22 | 0.151 | — | 1300 | EXAMPLE |
| 92 | 432 | 908 | 25 | 0.171 | — | 350 | Comp. EX. |
| 93 | 878 | 1256 | 16 | 0.095 | — | 1300 | EXAMPLE |
| 94 | 820 | 1240 | 16 | 0.112 | — | 1350 | EXAMPLE |
| 95 | 975 | 1407 | 13 | 0.082 | — | 1050 | EXAMPLE |
| 96 | 1087 | 1459 | 11 | 0.060 | — | 900 | Comp. EX. |
| 97 | 614 | 1093 | 19 | 0.122 | — | 1000 | EXAMPLE |
| 98 | 638 | 1192 | 17 | 0.111 | — | 1000 | EXAMPLE |
| 99 | 515 | 1096 | 19 | 0.125 | — | 1100 | EXAMPLE |
| 100 | 469 | 1082 | 19 | 0.140 | — | 500 | Comp. EX. |
| 101 | 590 | 1139 | 18 | 0.130 | — | 900 | EXAMPLE |
| 102 | 1009 | 1453 | 13 | 0.082 | — | 850 | EXAMPLE |
| 103 | 762 | 1242 | 17 | 0.112 | — | 850 | EXAMPLE |
| 104 | 707 | 1194 | 17 | 0.114 | — | 450 | Comp. EX. |

TABLE 12-continued

| | | | | | | |
|---|---|---|---|---|---|---|
| 105 | 520 | 1098 | 19 | 0.132 | 1150 | EXAMPLE |
| 106 | 642 | 1191 | 16 | 0.095 | 1000 | EXAMPLE |
| 107 | 571 | 1131 | 18 | 0.132 | 950 | EXAMPLE |
| 108 | 443 | 844 | 16 | 0.076 | 1100 | Comp. EX. |
| 109 | 693 | 1394 | 13 | 0.097 | 1100 | EXAMPLE |
| 110 | 699 | 1271 | 16 | 0.116 | 1250 | EXAMPLE |
| 111 | 649 | 1368 | 13 | 0.098 | 950 | EXAMPLE |
| 112 | 773 | 1319 | 15 | 0.103 | 350 | Comp. EX. |
| 113 | 498 | 1033 | 21 | 0.137 | 1100 | EXAMPLE |
| 114 | 798 | 1276 | 15 | 0.093 | 900 | EXAMPLE |
| 115 | 764 | 1279 | 15 | 0.088 | 950 | EXAMPLE |
| 116 | EXPERIMENT STOPPED DUE TO FRACTURE OF STEEL SHEET IN COLD ROLLING | | | | | Comp. EX. |
| 117 | 807 | 1296 | 15 | 0.098 | 950 | EXAMPLE |
| 118 | 550 | 1212 | 17 | 0.120 | 1100 | EXAMPLE |
| 119 | 611 | 1124 | 18 | 0.120 | 1000 | EXAMPLE |
| 120 | 665 | 1269 | 15 | 0.095 PRESENT | 1100 | Comp. EX. |

TABLE 13

| | | | STEEL SHEET STRUCTURE | | | |
|---|---|---|---|---|---|---|
| | | | | STRUCTURAL FRACTION | | |
| EXPERIMENTAL EXAMPLE | STEEL COMPONENT | PORTION STEEL TYPE | FERRITE % | BAINITE % | BAINITIC FERRITE % | MARTENSITE % |
| 121 | AE | GI | 88 | 0 | 5 | 3 |
| 122 | AF | GI | 31 | 3 | 33 | 7 |
| 123 | AG | GI | 87 | 0 | 3 | 1 |
| 124 | A | GA | EXPERIMENT STOPPED DUE TO SHEET THICKNESS DEVIATION | | | |
| 125 | AH | — | EXPERIMENT STOPPED DUE TO FRACTURE IN COLD ROLLING | | | |
| 126 | AI | GA | 61 | 11 | 15 | 5 |
| 127 | AJ | — | EXPERIMENT STOPPED DUE TO SLAB CRACK | | | |
| 128 | AK | — | EXPERIMENT STOPPED DUE TO WELD ZONE FRACTURE IN CONTINUOUS ANNEALING STEP | | | |

| | STEEL SHEET STRUCTURE | | | | | |
|---|---|---|---|---|---|---|
| | STRUCTURAL FRACTION | | | | RETAINED AUSTENITE | |
| EXPERIMENTAL EXAMPLE | TEMPERED MARTENSITE % | RETAINED AUSTENITE % | OTHERS | SOLID SOLUTION CARBON AMOUNT MASS % | AVERAGE INTERGRAIN DISTANCE μm | AVERAGE GRAIN DIAMETER μm |
| 121 | 0 | 4 | 0 | 0.82 | 4.4 | 1.0 |
| 122 | 0 | 26 | 0 | 0.84 | 1.4 | 0.8 |
| 123 | 0 | 9 | 0 | 0.86 | 0.9 | 0.3 |
| 124 | EXPERIMENT STOPPED DUE TO SHEET THICKNESS DEVIATION | | | | | |
| 125 | EXPERIMENT STOPPED DUE TO FRACTURE IN COLD ROLLING | | | | | |
| 126 | 0 | 6 | 2 | 0.84 | 1.9 | 0.8 |
| 127 | EXPERIMENT STOPPED DUE TO SLAB CRACK | | | | | |
| 128 | EXPERIMENT STOPPED DUE TO WELD ZONE FRACTURE IN CONTINUOUS ANNEALING STEP | | | | | |

| | STEEL SHEET SURFACE LAYER PROPERTY | | | | PROPERTY | |
|---|---|---|---|---|---|---|
| | | OXIDE | | | TENSILE PROPERTY | |
| EXPERIMENTAL EXAMPLE | DECARBURIZED LAYER THICKNESS μm | OXIDE DENSITY OXIDES/$m^2$ | AVERAGE GRAIN DIAMETER nm | APPEARANCE INSPECTION | YIELD STRESS MPa | TENSILE STRENGTH MPa |
| 121 | 1.54 | 1.7E+13 | 67 | ○ | 371 | 755 |
| 122 | 1.07 | 5.2E+13 | 63 | ○ | 1327 | 1814 |
| 123 | 1.70 | 8.9E+12 | 74 | ○ | 460 | 829 |
| 124 | EXPERIMENT STOPPED DUE TO SHEET THICKNESS DEVIATION | | | | | |
| 125 | EXPERIMENT STOPPED DUE TO FRACTURE IN COLD ROLLING | | | | | |
| 126 | 2.58 | 1.2E+11 | 212 | ○ | 421 | 930 |
| 127 | EXPERIMENT STOPPED DUE TO SLAB CRACK | | | | | |
| 128 | EXPERIMENT STOPPED DUE TO WELD ZONE FRACTURE IN CONTINUOUS ANNEALING STEP | | | | | |

| | PROPERTY | | | | |
|---|---|---|---|---|---|
| | TENSILE STRENGTH | | | | |
| EXPERIMENTAL EXAMPLE | TOTAL ELONGATION % | n VALUE | PLATING PEELING TEST | LIMIT NUMBER OF TIMES OF PUNCHING TIMES | NOTE |
| 121 | 31 | 0.239 | — | 1000 | Comp. EX. |
| 122 | 11 | 0.073 | — | 950 | Comp. EX. |
| 123 | 29 | 0.234 | — | 1050 | Comp. EX. |
| 124 | EXPERIMENT STOPPED DUE TO SHEET THICKNESS DEVIATION | | | | Comp. EX. |
| 125 | EXPERIMENT STOPPED DUE TO FRACTURE | | | | Comp. EX. |

TABLE 13-continued

| | | IN COLD ROLLING | | | |
|---|---|---|---|---|---|
| 126 | 21 | 0.153 | — | 400 | Comp. EX. |
| 127 | EXPERIMENT STOPPED DUE TO SLAB CRACK | | | | Comp. EX. |
| 128 | EXPERIMENT STOPPED DUE TO WELD ZONE FRACTURE IN CONTINUOUS ANNEALING STEP | | | | Comp. EX. |

[Evaluation Results]

As illustrated in Tables 9 to 13, in the high-strength hot-dip galvanized steel sheets and the high-strength alloyed hot-dip galvanized steel sheets of the examples having the steel components defined in the present invention and produced by the manufacturing conditions defined in the present invention (present invention examples: see the note column in Tables 1 to 13), the volume fraction of ferrite phase and retained austenite phase in the steel sheet structure, the solid solution carbon amount, the average grain diameter, and the average distance between grains in the retained austenite phase, and the thickness of decarburized layer, the average grain diameter, and average density of oxides in the steel sheet surface layer portion, as well as the work hardening coefficient (n value) were all in the ranges defined in claim 1 of the present invention. Then, the steel sheets of the present invention excel in appearance property of plating surface and peeling property and excel in tensile properties of yield stress, tensile strength, total elongation, and n value, and moreover the limit number of times of punching is all 650 times or more, which proves that they excel in mechanical cutting property. Therefore, from these evaluation results, it was found that the high-strength hot-dip galvanized steel sheet and the high-strength alloyed hot-dip galvanized steel sheet of the present invention examples have excellent ductility and mechanical cutting property simultaneously while ensuring the maximum tensile strength of 900 MPa.

On the other hand, the hot-dip galvanized steel sheet and the alloyed hot-dip galvanized steel sheet of the comparative examples do not satisfy any of the steel components and manufacturing conditions defined in the present invention, and do not satisfy one or more of the steel sheet properties defined in the present invention. Thus, the comparative examples, as will be described below, results in that any item of the tensile properties or either item of the steel sheet appearance and plating peeling property do not satisfy target properties.

In the hot-dip galvanized steel sheet of experimental example 4, the average cooling rate at 750 to 650° C. in the annealing step exceeds the defined range of the present invention, and the volume fraction of the ferrite phase in the steel sheet structure is lower than the defined range of the present invention. Thus, it resulted in a low n value of 0.059, which proves that it has inferior ductility.

In the hot-dip galvanized steel sheet of experimental example 8, the retention time at 300 to 470° C. in the annealing step largely exceeds the defined range of the present invention, and the solid solution carbon amount in the retained austenite phase largely exceeds the defined range of the present invention. Thus, it resulted in a low limit number of times of punching, 400 times, which proves that it has inferior mechanical cutting property.

The hot-dip galvanized steel sheet of experimental example 12 is through an atmosphere in which the partial pressure ratio {P(H$_2$O)/P(H$_2$)} between water vapor and hydrogen in the reduction zone in the annealing step is zero and water vapor is scarcely contained, and the decarburized layer is not generated in the steel sheet surface layer portion. Further, since the average grain diameter of oxides is large, the density of oxides is low. The thickness of the decarburized layer, the average grain diameter of oxides, and the density of oxides all deviate from the defined ranges of the present invention, and it resulted in a significantly low limit number of times of punching, 300 times, which proves that it has inferior mechanical cutting property.

In the hot-dip galvanized steel sheet of experimental example 16, the maximum heating temperature of the slab in the hot rolling step is lower than the defined range of the present invention, and this results in an n value of 0.076 which is lower than the defined range of the present invention, which proves that it has inferior ductility.

In the hot-dip galvanized steel sheet of experimental example 20, the average cooling rate in the annealing step is lower than the defined ranges of the present invention, and the average grain diameter and the average distance between grains of the retained austenite phase both exceed the defined ranges of the present invention. Thus, it resulted in a low limit number of times of punching, 600 times, which proves that it has inferior mechanical cutting property.

In the hot-dip galvanized steel sheet of experimental example 24, the average heating rate at 600 to 750° C. in the annealing step largely exceeds the defined range of the present invention, and the average grain diameter and the average intergrain distance of the retained austenite phase both exceed the defined ranges of the present invention. Thus, it resulted in a low limit number of times of punching, 600 times, which proves that it has inferior mechanical cutting property.

In the hot-dip galvanized steel sheet of experimental example 28, the amount of air is small because the air ratio of the preheating zone in the annealing step is 0.4 which is lower than the defined range of the present invention, and thus generation of oxides in the steel sheet surface layer portion does not become appropriate. That is, the average grain diameter of oxides is large, and thus the density of oxides is low, which both deviate from the defined range of the present invention. Thus, it resulted in a significantly low limit number of times of punching, 350 times, which proves that it has inferior mechanical cutting property.

In the hot-dip galvanized steel sheet of experimental example 36, the maximum heating temperature in the annealing step is lower than the defined range of the present invention, and thus the volume fraction of the ferrite phase in the steel sheet structure is 91%, which exceeds the defined range of the present invention. Meanwhile, the volume fraction of other structure is very small. Thus, it resulted in very low yield stress and tensile strength among the tensile properties, which proves that it has inferior strength property.

In the hot-dip galvanized steel sheet of experimental example 40, the effective Al amount in the plating bath in the plating step exceeds the defined range of the present invention, and thus there are many positions where unplating occurred, resulting in "X" of the appearance test.

In the alloyed hot-dip galvanized steel sheet of experimental example 44, the cooling stop temperature in the hot rolling step is lower than the defined range of the present invention, and both the average grain diameter and the average distance between grains of the retained austenite phase both exceed the defined ranges of the present invention. Thus, it resulted in a significantly low limit number of times of punching, 350 times, which proves that it has inferior mechanical cutting property.

The alloyed hot-dip galvanized steel sheet of experimental example 48 is an example in which the treatment time when the alloying treatment is performed on the plating layer after the plating step is too long, and thus peeling of plating occurred in the plating peeling test.

In the hot-dip galvanized steel sheet of experimental example 52, the average cooling rate at 750 to 650° C. in the annealing step is lower than the defined range of the present invention, the volume fraction of the bainite phase and the bainitic ferrite phase in the steel sheet structure are large, and meanwhile the martensite phase, tempered martensite phase, retained austenite phase, and other phases are not generated. Thus, it resulted in low yield stress and tensile strength, which proves that it has inferior strength property.

The alloyed hot-dip galvanized steel sheet of experimental example 56 is an example in which the treatment time when the alloying treatment is performed on the plating layer after the plating step is too short, and thus unplating occurred at many positions, resulting in "X" of the appearance test.

In the hot-dip galvanized steel sheet of experimental example 60, the average cooling rate after the plating step is lower than the defined range of the present invention, and thus the volume fraction of the retained austenite phase in the steel sheet structure is lower than the defined range of the present invention. Meanwhile, the volume fraction of the other structure is high. Further, the average distance between grains of the retained austenite phase exceeds the defined range of the present invention. Thus, it resulted in low yield stress, tensile strength, and total elongation, which proves that it has inferior cutting property.

In the hot-dip galvanized steel sheet of experimental example 64, the rolling completion temperature in the hot rolling step exceeds the defined range of the present invention, and thus both the average grain diameter and the average intergrain distance of the retained austenite phase exceed the defined ranges of the present invention. Thus, it resulted in a significantly low limit number of times of punching, 250 times, which proves that it has inferior mechanical cutting property.

In the hot-dip galvanized steel sheet of experimental example 68, the partial pressure ratio $\{P(H_2O)/P(H_2)\}$ between water vapor and hydrogen in the reduction zone in the annealing step deviates from the defined range of the present invention, and the thickness of the decarburized layer in the steel sheet surface layer portion exceeds the defined range of the present invention. Thus, the steel sheet of experimental example 68 has quite low fatigue strength, becoming one which does not withstand practical use.

In the alloyed hot-dip galvanized steel sheet of experimental example 72, the treatment time when the alloying treatment is performed on the plating layer after the plating step exceeds the defined range of the present invention. Thus, the volume fraction of the retained austenite phase in the steel sheet structure is lower than the defined range of the present invention, and meanwhile the volume fraction of the other structures is high. Further, the solid solution carbon amount in the retained austenite phase is lower than the defined range of the present invention, and the average distance between grains exceeds the defined range of the present invention. Thus, it resulted in "X" of the appearance test, and peeling of plating occurred in the plating peeling test. Moreover, it resulted in low yield stress and tensile strength, which proves that it is inferior in all of strength, ductility, and mechanical cutting property.

In the hot-dip galvanized steel sheet of experimental example 76, bending in the annealing step was not performed, and thus the average grain diameter and the average distance between grains of the retained austenite phase all exceed the defined ranges of the present invention. Thus, it resulted in a low limit number of times of punching, 500 times, which proves that it has inferior mechanical cutting property.

In the hot-dip galvanized steel sheet of experimental example 80, the cooling stop temperature in the hot rolling step exceeds the defined range of the present invention, and hence the average grain diameter and the average distance between grains of the retained austenite phase all exceed the defined ranges of the present invention. Thus, it resulted in a significantly low limit number of times of punching, 350 times, which proves that it has inferior mechanical cutting property.

In the hot-dip galvanized steel sheet of experimental example 84, the amount of air is too much because the air ratio of the preheating zone in the annealing step exceeds the defined range of the present invention, and thus the thickness of the decarburized layer in the steel sheet surface layer portion exceeds the defined range of the present invention. Thus, it is inferior in plating property, the result of the appearance test is hence an evaluation of "X", and moreover, it resulted in a low limit number of times of punching, 400 times, which proves that it has inferior mechanical cutting property.

In the hot-dip galvanized steel sheet of experimental example 88, the bend radius of the bending in the annealing step exceeds the defined range of the present invention, and hence the average grain diameter and the average intergrain distance of the retained austenite phase both exceed the defined ranges of the present invention. Thus, it resulted in a low limit number of times of punching, 550 times, which proves that it has inferior mechanical cutting property.

In the alloyed hot-dip galvanized steel sheet of experimental example 92, the retention time at 300 to 470° C. in the annealing step largely exceeds the defined range of the present invention, and the solid solution carbon amount in the retained austenite phase largely exceeds the defined range of the present invention. Thus, it resulted in a significantly low limit number of times of punching, 350 times, which proves that it has inferior mechanical cutting property.

In the hot-dip galvanized steel sheet of experimental example 96, the retention time at 300 to 470° C. in the annealing step is lower than the defined ranges of the present invention, the volume fraction of the retained austenite phase is lower than the defined range of the present invention, and meanwhile the volume fraction of the martensite phase is high. Thus, the solid solution carbon amount in the retained austenite phase is lower than the defined range of the present invention, and the average intergrain distance exceeds the defined range of the present invention. Thus, it resulted in a low n value of 0.060, which proves that it has inferior mechanical cutting property.

In the hot-dip galvanized steel sheet of experimental example 100, tension in the temperature range of 300 to 470° C. was not applied in the annealing step, and hence both the average grain diameter and the average distance between grains of the retained austenite phase exceed the defined ranges of the present invention. Thus, it resulted in a low limit number of times of punching, 500 times, which proves that it has inferior mechanical cutting property.

In the hot-dip galvanized steel sheet of experimental example 104, the reduction ratio in the cold rolling step is lower than the defined range of the present invention, and hence both the average grain diameter and the average intergrain distance of the retained austenite phase exceed the defined ranges of the present invention. Thus, it resulted in a low limit number of times of punching, 450 times, which proves that it has inferior mechanical cutting property.

In the hot-dip galvanized steel sheet of experimental example 108, the average cooling rate from 650° C. in the annealing step is lower than the defined range of the present invention. It hence resulted in that the retained austenite phase is scarcely generated, and meanwhile many other structures are generated. Thus, the tensile strength is low and the n value is lower than the defined range of the present invention, which proves that it has inferior strength and ductility.

In the hot-dip galvanized steel sheet of experimental example 112, the time of slow cooling until 400° C. in the hot rolling step is lower than the defined range of the present invention, and both the average grain diameter and the average distance between grains of the retained austenite phase exceed the defined ranges of the present invention. Thus, it resulted in a significantly low limit number of times of punching, 350 times, which proves that it has inferior mechanical cutting property.

In experimental example 116, the steel sheet fractured because the reduction ratio in the cold rolling step is too large, and the hot-dip galvanized steel sheet could not be produced.

In the hot-dip galvanized steel sheet of experimental example 120, peeling of the plating layer occurred in the plating peeling test due to that the effective Al amount in the plating bath in the plating step is 0%.

The hot-dip galvanized steel sheets of experimental examples 121 to 123 are examples in which chemical components deviated predetermined ranges. Among others, in experimental example 121, the C amount is less than the lower limit defined in the present invention, and hence it resulted in that the ferrite phase is largely generated in the steel sheet structure and the tensile strength is low, which proves that it has inferior strength property. Further, in experimental example 122, the C amount exceeds the upper limit defined in the present invention, and hence it resulted in that a large amount of retained austenite phase is generated in the steel sheet structure, and the n value is low, which proves that it has inferior ductility. Also, in experimental example 123, the Mn amount is less than the lower limit defined in the present invention, and hence it resulted in that a large amount of ferrite phase is generated in the steel sheet structure, and the tensile strength is low, which proves that it has inferior strength property.

The alloyed hot-dip galvanized steel sheet of experimental example 124 is an example in which tension in the temperature range of 300 to 470° C. exceeded the defined range of the present invention in the annealing step. Here, it is an example in which the sheet thickness of the steel sheet after the annealing step decreased compared to the sheet thickness of the steel sheet before the annealing step, predetermined sheet thickness accuracy could not be obtained, and the experiment was stopped.

In experimental example 125, the Si content is large, the steel sheet fractured in the cold rolling step, and the experiment was stopped.

In the alloyed hot-dip galvanized steel sheet of experimental example 126, the Si content is small, generation of oxides in the steel sheet surface layer portion does not become appropriate, and the density of oxides deviates from the defined range of the present invention. Thus, it resulted in a low limit number of times of punching, 400 times, which proves that it has inferior mechanical cutting property.

In experimental example 127, the Mn content is large, the slab fractured until it is subjected to the hot rolling step after completion of casting, and the experiment was stopped.

In experimental example 128, the Al content is large, a welded portion to a front and a rear steel sheet fractured in the annealing step fractured, and the experiment was stopped.

From the results of examples as have been described, it is clear that the high-strength hot-dip galvanized steel sheet and the high-strength alloyed hot-dip galvanized steel sheet excellent in mechanical cutting property of the present invention have excellent ductility, do not deteriorate processing equipment or the like, and have high mechanical cutting property, while ensuring high strength with maximum tensile strength of 900 MPa or more.

INDUSTRIAL APPLICABILITY

According to the present invention, for example, in applications such as members obtained by shaping a steel sheet by pressing or the like, excellent ductility and mechanical cutting property are obtained and excellent strength and workability are obtained simultaneously, while ensuring high strength with maximum tensile strength of 900 MPa or more. Thus, by applying the present invention in the field of, for example, automobile member or the like in particular, merits such as improvement in safety accompanying increase in strength of vehicle body, improvement in workability for processing a member, and the like can be enjoyed sufficiently, and their social contributions are immeasurable.

The invention claimed is:

1. A high-strength hot-dip galvanized steel sheet, having a sheet thickness of 0.6 to 5.0 mm and comprising a plating layer on a surface of a steel sheet containing, by mass %,
C: 0.075 to 0.400%,
Si: 0.01 to 2.00%,
Mn: 0.80 to 3.50%,
P: 0.0001 to 0.100%,
S: 0.0001 to 0.0100%,
Al: 0.001 to 2.00%,
N: 0.0001 to 0.0100%, and
O: 0.0001 to 0.0100% with a balance being constituted of iron and inevitable impurities, wherein:
in a range of ⅛ thickness to ⅜ thickness with ¼ of the sheet thickness being a center from the surface of the steel sheet, the steel sheet has a structure comprising a ferrite phase that occupies 40-90% of the steel sheet and a retained austenite phase that occupies 3% or more of the steel sheet by volume fraction;
in the retained austenite phase, a solid solution carbon amount in the phase is 0.70 to 1.00%, an average grain diameter is 2.0 μm or less, and an average distance between grains is 0.1 to 5.0 μm;
a thickness of a decarburized layer in a steel sheet surface layer portion is 0.01 to 10.0 μm, an average grain diameter of oxides contained in the steel sheet surface layer portion is 30 to 120 nm and an average density thereof is $1.0 \times 10^{12}$ oxides/m² or more; and moreover, a work hardening coefficient (n value) during a 3 to 7% plastic deformation is 0.080 or more on average.

2. The high-strength hot-dip galvanized steel sheet according to claim 1, further containing, by mass %, one or more of Ti: 0.001 to 0.150%,
Nb: 0.001 to 0.100%, and
V: 0.001 to 0.300%.

3. The high-strength hot-dip galvanized steel sheet according to claim 1, further containing, by mass %, one or more of Cr: 0.01 to 2.00%,
Ni: 0.01 to 2.00%,
Cu: 0.01 to 2.00%,
Mo: 0.01 to 2.00%,
B: 0.0001 to 0.0100%, and
W: 0.01 to 2.00%.

4. The high-strength hot-dip galvanized steel sheet according to claim 1, further containing, by mass %, 0.0001 to 0.0100% in total of one or more of Ca, Ce, Mg, Zr, La, and REM.

5. A high-strength alloyed hot-dip galvanized steel sheet, formed by alloying the plating layer of the high-strength hot-dip galvanized steel sheet according to claim 1.

6. A manufacturing method of a high-strength hot-dip galvanized steel sheet according to claim 1, the method comprising:

a hot rolling step of heating to 1180° C. or more a slab having chemical components containing, by mass %, C: 0.075 to 0.400%,
Si: 0.01 to 2.00%,
Mn: 0.80 to 3.50%,
P: 0.0001 to 0.100%,
S: 0.0001 to 0.0100%,
Al: 0.001 to 2.00%,
N: 0.0001 to 0.0100%, and
O: 0.0001 to 0.0100% with a balance being iron and inevitable impurities, directly or after cooled once and performing hot rolling in which rolling completion temperature is 850 to 950° C., thereafter rapidly cooling to 500 to 650° C. at an average cooling rate of 10° C./s or more, and thereafter coiling on a coil and slowly cooling to 400° C. by taking 1.0 hour or more;

a cold rolling step of performing cold rolling so that a total reduction ratio is 30 to 75% after pickling subsequently to the hot rolling step;

an annealing step of heating the steel sheet after the cold rolling step to 750° C. or more with an average heating rate between 600 and 750° C. being 20° C/s or less, then cooling with an average cooling rate between 750 and 650° C. being 1.0 to 15.0° C/s and cooling with an average cooling rate from 650° C. being 3.0° C./s or more, and performing, while retaining for 20 to 1000 seconds in the temperature range of 300 to 470° C. and while applying a tension of 5 to 100 MPa in this temperature range, one or more times of bending with a bending radius of 800 mm or less;

a plating step of performing hot-dip galvanizing on surfaces of the steel sheet to form a plating layer by immersing after the annealing step the steel sheet in a galvanizing bath under the conditions of plating bath temperature: 450 to 470° C., steel sheet temperature at a time of entering the plating bath: 430 to 490° C., and effective Al amount in the plating bath: 0.01 to 0.18 mass %; and a cooling step of cooling at an average cooling rate of 0.5° C./s or more to 150° C. or less after the plating step, wherein the annealing step is such that in a preheating zone under the condition of an air ratio: 0.7 to 1.2 in a mixed gas of air and fuel gas used in a preheating burner, the air ratio being a ratio of a volume of air contained in the mixed gas in a unit volume and a volume of air logically needed for complete combustion of fuel gas contained in the mixed gas in the unit volume, oxides are generated in a steel sheet surface layer portion by passing through while heating to a steel sheet temperature of 400 to 800° C., then the oxides generated in the preheating zone are reduced by heating to 750° C. or more in a reduction zone with a partial pressure ratio $P(H_2O)/P(H_2)$ between water vapor ($H_2O$) and hydrogen ($H_2$): 0.0001 to 2.0, and thereafter cooling is performed.

7. The manufacturing method of a high-strength alloyed hot-dip galvanized steel sheet according to claim 6, the method comprising, after the hot rolling step, the cold rolling step, the annealing step, and the plating step are performed and before the cooling step, performing an alloying treatment on a plating layer formed in the plating step at temperatures of 470 to 620° C.

* * * * *